(12) United States Patent
Chiabrera et al.

(10) Patent No.: US 6,329,963 B1
(45) Date of Patent: Dec. 11, 2001

(54) THREE-DIMENSIONAL DISPLAY SYSTEM: APPARATUS AND METHOD

(75) Inventors: Alessandro Chiabrera; Bruno Bianco, both of Genoa (IT); Jonathan J. Kaufman, Brooklyn, NY (US)

(73) Assignee: CyberLogic, Inc., New York, NY (US)

( * ) Notice: Subject to any disclaimer, the term of this patent is extended or adjusted under 35 U.S.C. 154(b) by 0 days.

(21) Appl. No.: 09/140,912

(22) Filed: Aug. 27, 1998

Related U.S. Application Data

(63) Continuation-in-part of application No. 08/910,823, filed on Aug. 13, 1997, which is a continuation-in-part of application No. 08/655,257, filed on Jun. 5, 1996.

(51) Int. Cl.$^7$ ........................................ G09G 5/00
(52) U.S. Cl. .................. 345/6; 345/653; 345/589; 345/597; 348/751; 348/761; 348/51; 359/618
(58) Field of Search .................. 345/5, 6, 7, 11, 345/46, 87, 139, 419, 425, 20–24, 589–591, 619, 653, 433, 473, 757, 848, 782, 852, 530, 531, 690, 694, 697, 214; 382/276; 348/42, 51, 58, 761, 766, 790, 54; 358/450; 355/22; 359/11, 21, 465, 618, 559, 591; 395/502

(56) References Cited

U.S. PATENT DOCUMENTS

| Re. 35,029 | * | 8/1995 | Sandor | 355/22 |
|---|---|---|---|---|
| 5,028,138 | | 7/1991 | Wolff | 356/369 |
| 5,132,813 | * | 7/1992 | Caulfield | 359/11 |
| 5,255,362 | | 10/1993 | Brandstetter et al. | 395/163 |
| 5,455,689 | * | 10/1995 | Taylor | 358/450 |
| 5,537,144 | * | 7/1996 | Faris | 348/58 |
| 5,592,215 | * | 1/1997 | Kuga | 348/51 |
| 5,742,796 | * | 4/1998 | Huxley | 395/502 |
| 5,771,121 | | 6/1998 | Hentschke | 359/463 |
| 5,777,720 | * | 7/1998 | Shapiro | 351/237 |
| 5,802,222 | * | 9/1998 | Rasch | 358/1 |
| 5,825,337 | * | 10/1998 | Wiseman | 345/6 |
| 5,886,816 | * | 3/1999 | Faris | 359/464 |
| 5,936,774 | * | 8/1999 | Street | 359/630 |
| 5,982,549 | * | 11/1999 | Kubala | 359/618 |
| 5,991,073 | * | 11/1999 | Woodgate | 359/462 |
| 6,037,971 | * | 3/2000 | Mclaine | 348/42 |

\* cited by examiner

*Primary Examiner*—Jefferey Brier
*Assistant Examiner*—Wesner Sajous
(74) *Attorney, Agent, or Firm*—Dykema Gossett PLLC

(57) ABSTRACT

In a presently preferred embodiment of the invention, a three-dimensional scene is reproduced on a specialized light display which offers full multiviewpoint capability and auto-stereoscopic views. The displayed image is produced using a set of M two-dimensional images of the scene collected at a set of distinct spatial locations. These M two-dimensional images are processed through a specialized mathematical encoding scheme to obtain a set of N×K display-excitation electrical-input signals, where K is the number of pixels in the display, and N≦M is the number of individual light-radiating elements within one pixel. The display is thus comprised of a total of N×K light-radiating elements. Each of the K pixels is adapted for control of their associated radiance patterns. The display is connected for response to the set of N×K display-excitation electrical-input signals. In this manner, the display provides a multi-viewpoint and autostereoscopic three-dimensional image associated with the original three-dimensional scene. An alternative embodiment of the invention is utilized to provide efficient storage and display of 3D computer graphics images.

53 Claims, 26 Drawing Sheets

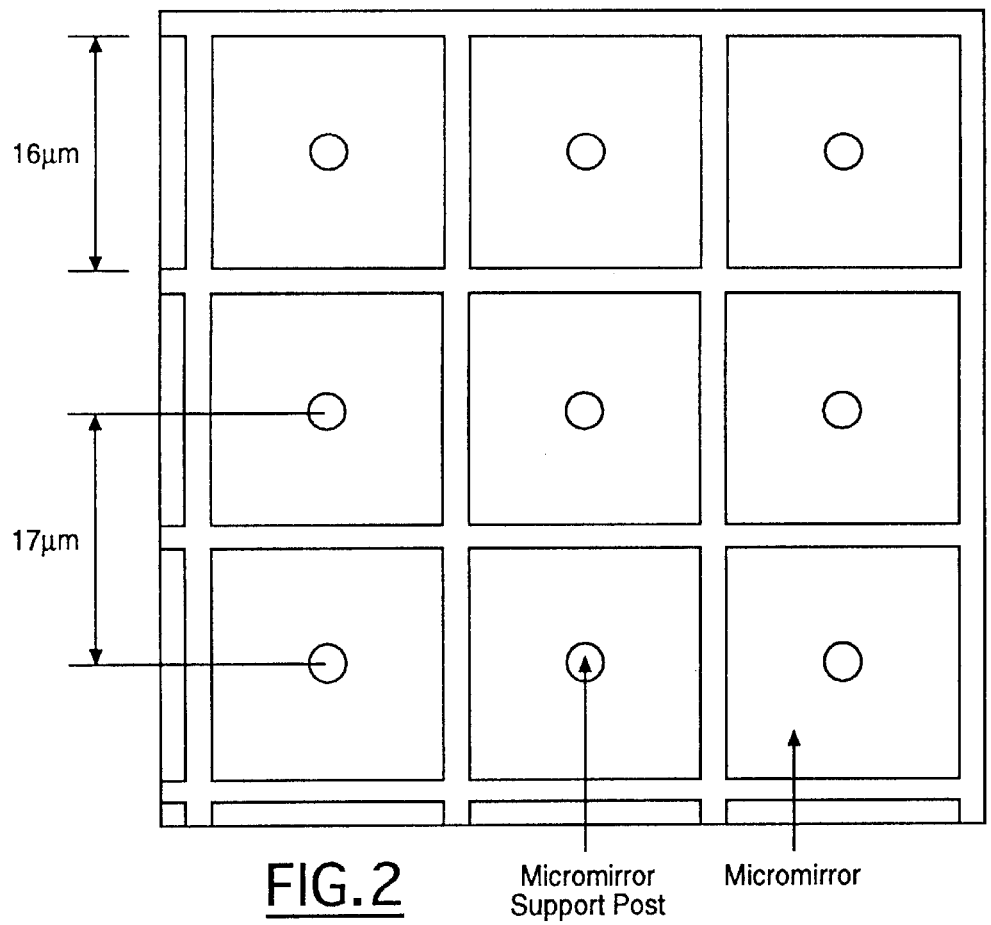
FIG.2    Micromirror Support Post    Micromirror
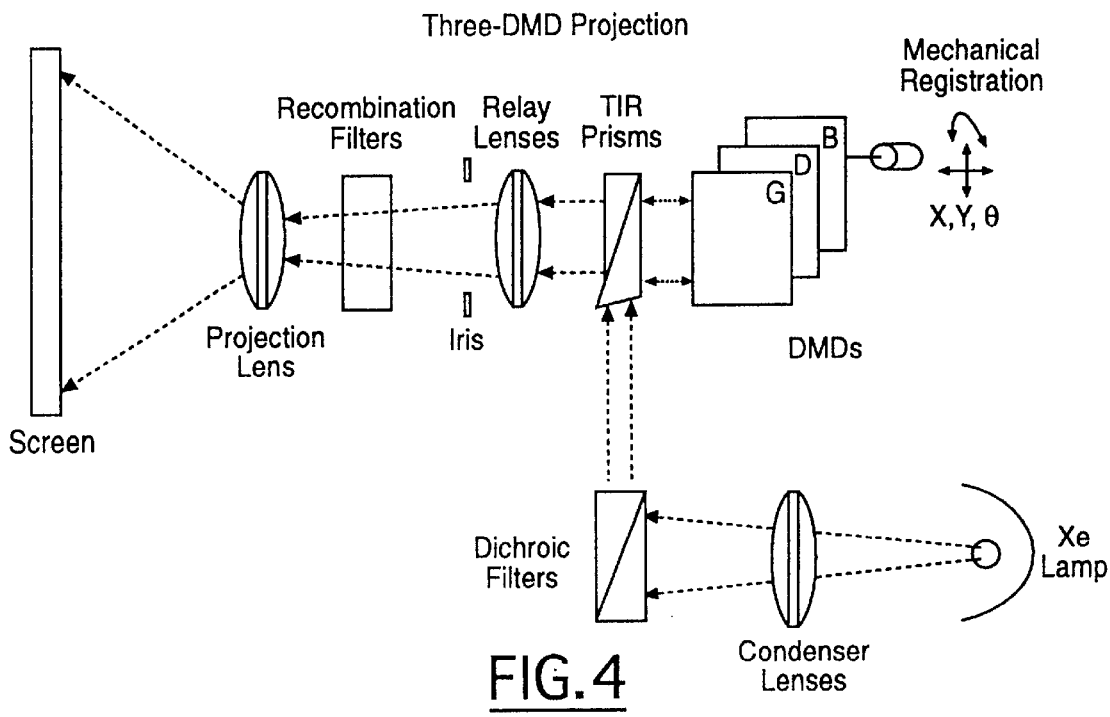
FIG.4

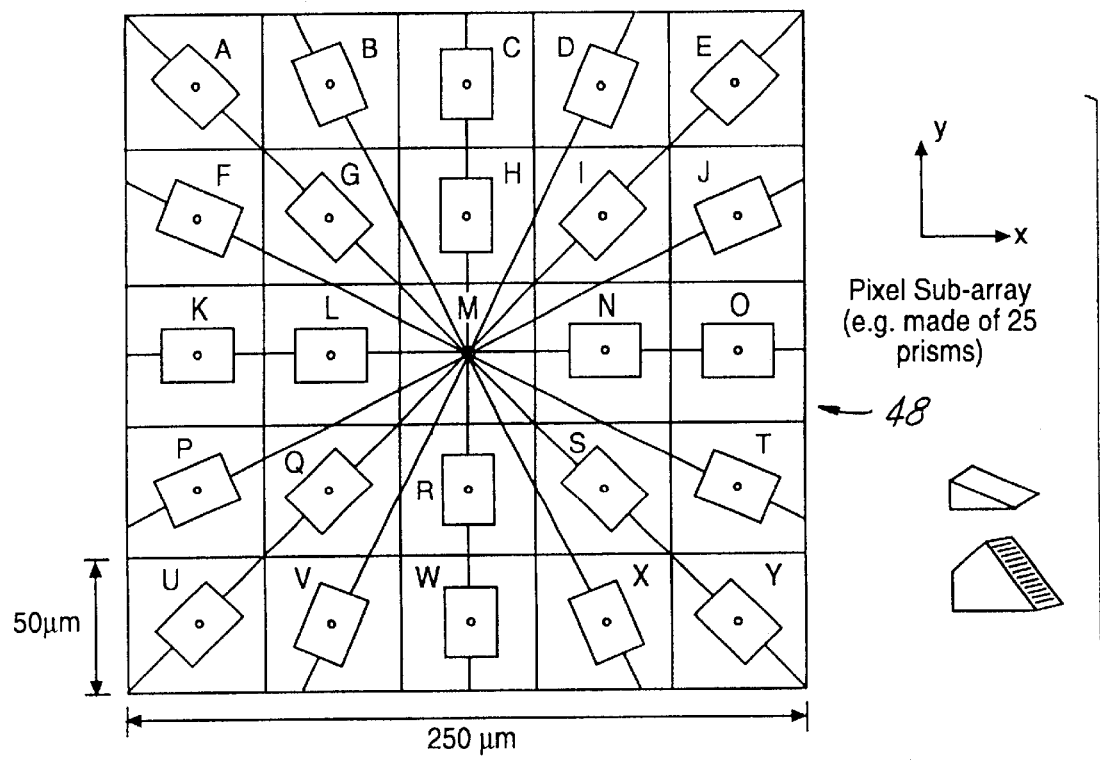
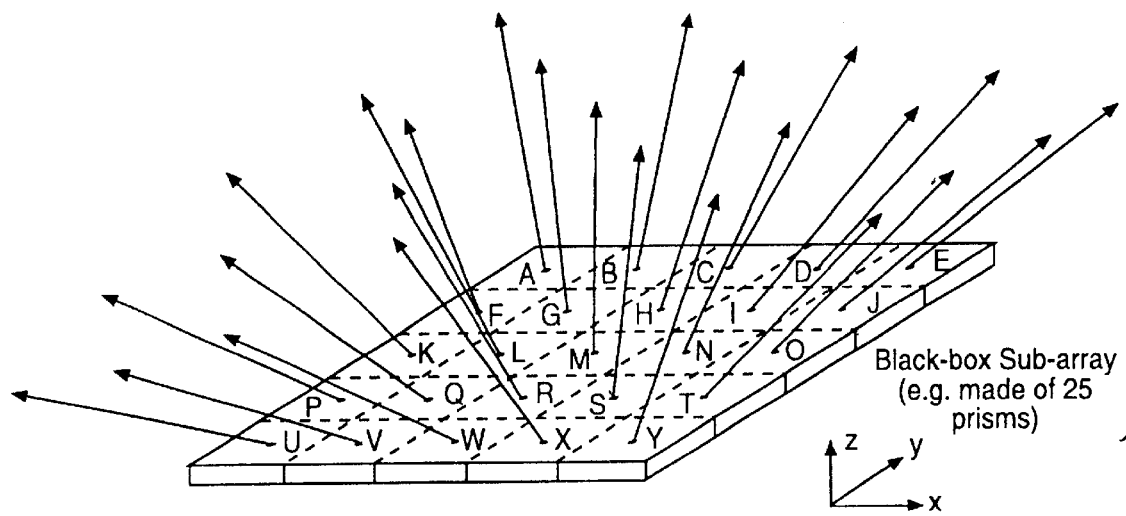
FIG. 32

THREE-DIMENSIONAL DISPLAY SYSTEM: APPARATUS AND METHOD

RELATED CASE

This application is a continuation-in-part of copending application Ser. No. 08/910,823, filed Aug. 13, 1997, which is a continuation-in-part of copending application Ser. No. 08/655,257, filed Jun. 5, 1996.

BACKGROUND OF THE INVENTION

The invention pertains to apparatus and method for three-dimensional display of three-dimensional objects and scenes.

In recent years, various attempts have been made to create three-dimensional displays for various applications, particularly three-dimensional television. Because of the inherent mathematical and practical complexities in the three-dimensional imaging problem, as well as the ad hoc nature of previous approaches, the degree of success thus far has been rather limited.

Most developments in three-dimensional display systems have been primarily in stereoscopic techniques, and incorporating a set of discrete multiviews of the three dimensional scenes. These have included both binocular parallax and autostereoscopic three-dimensional systems. Stereoscopic techniques typically require the observer to use a viewing device. In contrast autostereoscopic techniques, which include for example, holographic, lenticular screens and parallax barriers, produce three-dimensional appearance without the use of any special viewing device. The article by Motoki, Isono and Yuyama, in the *Proceedings of the IEEE*, Vol 83, No. 7, July, 1995, pp. 1009–1021, provides a convenient summary of the present state of the art of three-dimensional television, one of the major applications of three-dimensional display systems. As of yet, there is not a practical system which may be considered to offer all of the capabilities necessary to achieve widespread success.

Nomura et al., in U.S. Pat. No. 5,493,427 disclosed apparatus for three-dimensional display using a liquid crystal panel. The inventors'technique relies on simultaneously displaying a plurality of distinct parallax images using a lens with a variable optical characteristic attached to the liquid crystal panel. An alternative embodiment incorporates a head detecting section for detecting a spatial position of an observer's head, and a control section connected to the head detecting section for controlling an operation of the optical characteristic variable lens based on position information of the observer's head.

An autostereoscopic display system is disclosed by Woodgate et al. in U.S. Pat. No. 5,465,175. The device utilizes two lenticular screens and a plurality of light sources which produce divergent light beams for displaying two interlaced views, thereby producing an autostereoscopic image. Another autostereoscopic display system is described by Eichenlaub in U.S. Pat. No. 5,457,574. The inventor discloses a display having an optical system and one or more light sources which provide high brightness of the observed three-dimensional images and a high brightness-to-input power ratio. This is achieved by having the light pass directly through the optical system directed to the observer's eyes, instead of being diffused across the field of view.

Kurata et al. in U.S. Pat. No. 5,408,264, disclose a three-dimensional image display apparatus for optically synthesizing images formed on different surfaces on a display screen. In their invention, a plurality of display devices is used with a first and second optical means to synthesize a plurality of images formed at different positions. In a preferred embodiment, the first optical means has polarizing characteristics. In U.S. Pat. No. 5,49,7,189, Aritake et al., disclose a stereoscopic display apparatus which is capable of displaying sequentially a plurality of 2-dimensional images of different visual directions.

Powell in U.S. Pat. No. 5,483,254 discloses a device for forming and displaying stereoscopic images. The display is comprised of a non-planar upper substrate having a series of alternating raised and depressed regions and a non-planar lower substrate having a shape corresponding to the upper substrate, with an electrically controllable light transmissive material contained within the two substrates. The 3D video display device operates thereby to form and displace stereoscopic images at predetermined viewing angles.

A system for displaying three dimensional video is disclosed by Carbery in U.S. Pat. No. 5,475,419. This invention uses a dual-lensed video camera to generate signals representing a subject from each of two different perspectives. The signals are spliced to form a combined video signal consisting of an alternating series of fields representing the image from two perspectives. The video signal is then sent to a receiver including a video screen equipped with a refracticular surface, thereby producing a stereoscopic image towards the eyes of a viewer.

Thompson et al., in U.S. Pat. No. 5,446,479 disclose a multidimensional array video processor system. The system consists of a processor and a video memory. The processor converts a stream of digital information to extract planes of a three dimensional image to store into the video memory to display a three dimensional image. A spatial light modulator is connected to the video memory to receive and display a plane of said image to display a three dimensional image.

Kuga, in U.S. Pat. No. 5,592,215 discloses a stereoscopic picture system which uses multiple display panels having three-dimensionally arranged pixels to produce a stereoscopic picture. The invention utilizes a simple coordinate transformation to produce the picture on the three-dimensional display.

Zellitt, in U.S. Pat. No. 5,790,086 discloses a 3-D imaging system in which the apparent distance of a pixel of the image is varied, on a pixel by pixel basis. This variation in perceived distance is achieved using specially constructed optical elements aligned with the pixels of the image. The optical elements are formed such that the focal length of each element varies across the surface of the optical element, which allows the perception of different depths to be realized.

The most advanced system for display of three-dimensional scenes is based on holography, but a practical realization is many years in the future. A review of this approach may be found in the article by Benton, in the Proc. TAO 1st Int. Symp. on 3D Image Communication Tech., 1993, pp. S-3-1-1–S-3-1-6. Wakai et al. in U.S. Pat. No. 5,430,560 disclose a holographic image display system. The system incorporates a coherent light source and a hologram having a plurality of divided areas, which are sequentially irradiated by the light source to thereby produce the three-dimensional image signal.

The prior art, exemplified by the references that have been briefly discussed, has focussed primarily either on stereoscopic techniques with the use of polarizing or shutter glasses, or relatively primitive autostereoscopic display systems. A major shortcoming of the prior art is its reliance on stereoscopic imaging techniques, in which a set of distinct perspective or parallax views are projected to the viewer in essentially an ad hoc fashion, with no direct correspondence to the radiance of the original three-dimensional scene. This has led to the production of relatively poor three-dimensional display systems. A true multiviewpoint autostereoscopic system which can offer practical, cost effective, as well as realistic and aesthetically acceptable images from a continuum of viewpoints has not yet been developed.

BRIEF STATEMENT OF THE INVENTION

It is accordingly an object of the invention to provide an improved method and apparatus for three-dimensional display of three-dimensional objects and scenes.

Another object is to meet the above object, such that the three-dimensional image may be readily and more reliably produced than heretofore.

A related object is to provide a three-dimensional imaging system in which both multiviewpoint—from a continuum of viewpoints—and autostereoscopic capabilities can be optimally obtained, without requiring coherent illumination.

Another related object is to provide an optimal mathematical framework for synthesizing three-dimensional images on a three-dimensional display system.

A specific object is to achieve the above objects with small time delay if desired, using real-time signal processing means, to enable for a given three-dimensional scene its display in approximately real-time.

Another object is to utilize the optimal mathematical framework for applications in computer graphics, to allow both for efficient storage and display of images.

It is a general object to achieve the foregoing objects with apparatus components many of which are commercially available.

Briefly stated, the invention in its presently preferred form achieves the foregoing objectives by recording a three-dimensional scene with M television cameras, each placed in a distinct position with respect to the scene being recorded, and each producing a separate channel (i.e., view) of recorded data. The M channels are processed at each point in time (i.e., at each image frame) to optimally evaluate an associated set of N tesseral coefficient functions in a finite tesseral harmonic expansion of the scene radiance. These tesseral coefficient functions are functions of the spatial coordinates, x and y, in the three-dimensional scene coordinate system (object space), which is assumed one-to-one with the display coordinate system. The functions are used in conjunction with a specialized display device, constructed from a currently available model of a reflective light device, namely an appropriately adapted digital micromirror device. In the usual digital micromirror device the beam of light reflected from each micromirror is either radiating "on" directly towards the viewer in the direction orthogonal to the surface of the device or radiating "off" out of view of the observer to a light sink. In contrast, the new design is such that each micromirror's "on" position corresponds to the beam of light being reflected in a specified angular but not necessarily orthogonal direction. The display device design is specified further such that each pixel of the K pixels in the display device is comprised of a set of N ($N \leq M$) micromirrors, each of these N micromirrors radiating (i.e., reflecting) a beam in a distinct direction when "on." Each individual micromirror is "off" when it's associated light beam is directed to a light sink, and the position of each micromirror is controlled by an electrical-input signal as with the standard digital micromirror device. Further, each sets of N micromirrors associated with all the display device pixels have identical distributions in terms of their relative directional orientations. The display device is controlled by a set of N×K signals, known as the display-excitation electrical-input signals; the specification of particular values for the N display-excitation electrical-input signals at each of the K pixels produces a specific radiance pattern associated with the display device. In the presently preferred embodiment of the invention, N=4 micromirrors, K=512×480=245,760 pixels and M=4 cameras (i.e., 4 two-dimensional views), and the four micromirrors associated with any display device pixel are directed at ±10° vertically and ±10° horizontally, respectively. It should therefore be understood that in the currently preferred embodiment a total of 512×480×4=983,040 micromirrors are used for display of the three-dimensional monochrome image.

A finite tesseral harmonic expansion of the radiance of the reflected light device is then used in conjunction with the finite tesseral harmonic expansion of the M images to derive an optimal set of display-excitation electrical-input signals. The planar reflective light display device, when driven by this set of display-excitation electrical-input signals, produces a displayed image similar to that which one would observe by looking at the original three-dimensional scene directly. In particular, a continuous interpolation for any viewpoint in between the discrete viewpoints corresponding to M cameras is achieved. The above procedure is repeated for each image frame in the television images, to obtain an optimal implementation of multiviewpoint autostereoscopic three-dimensional television, whereby achieving the indicated objectives.

BRIEF DESCRIPTION OF THE DRAWINGS

The invention will be described in detail for a presently preferred embodiment, in conjunction with the accompanying drawings, in which:

FIG. 2 is an electron micrograph of a reflective light device, the digital micromirror device offered by Texas Instruments, of Dallas, Tex.

FIG. 4 is a schematic diagram of an appropriately adapted projector based on a reflective light device, the digital micromirror device projector (also known as a digital display engine, DDE) offered by Texas Instruments, Dallas, Tex.

FIG. 32 is a schematic illustration of a portion of the display means for one alternative embodiment of the invention, showing a pixel with its sub-pixels and light phase encoders (prisms).

It should be understood that in FIG. 1, FIGS. 21–23, FIG. 25, and FIGS. 27–33, the physical dimensions are not to scale.

DETAILED DESCRIPTION OF THE INVENTION

The invention will be described in detail for a presently preferred embodiment, in conjunction with the accompanying drawings.

Figure 1:
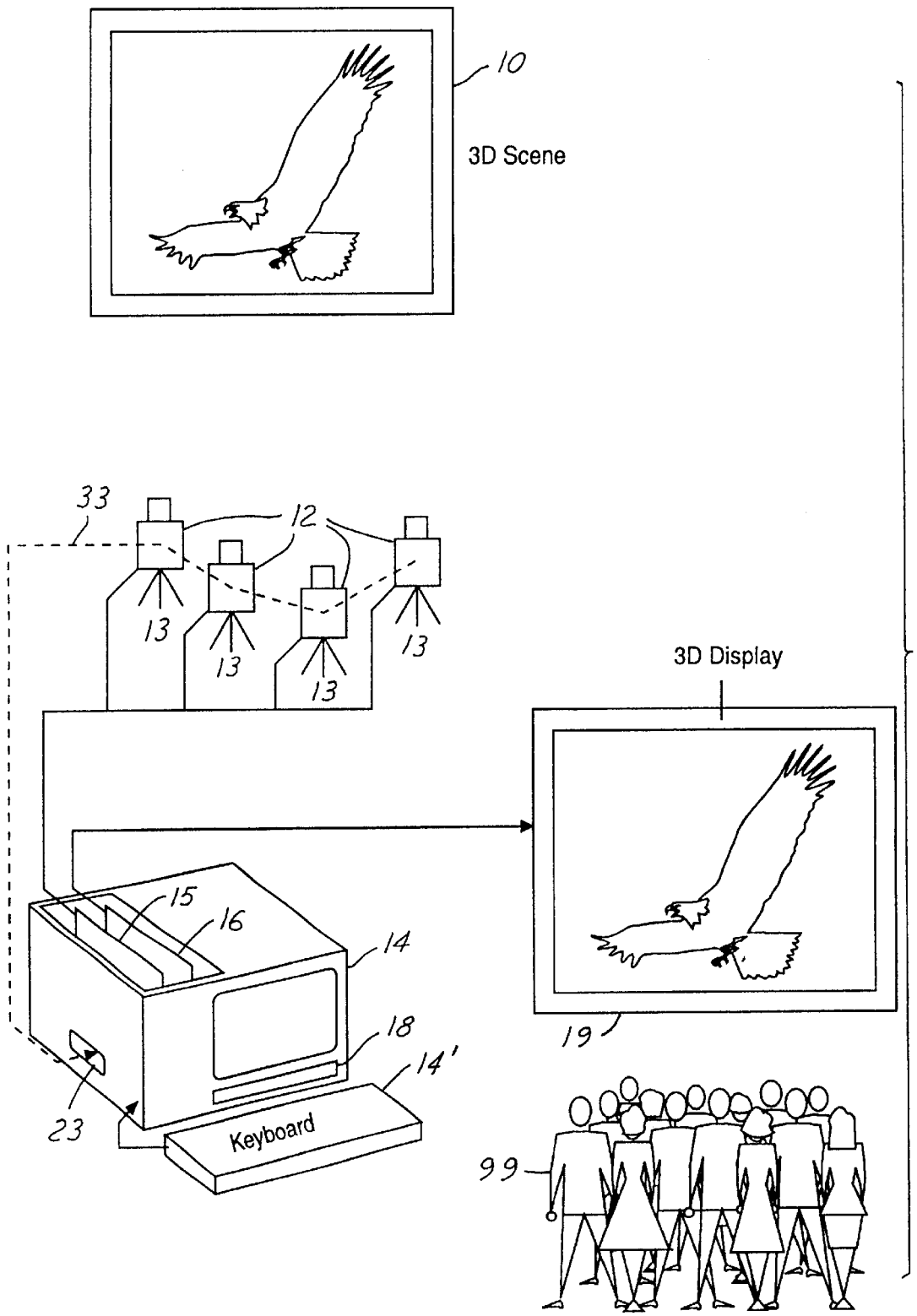
FIG. 1 is a diagram schematically showing the interconnected relation of components of apparatus of the invention.

The invention is shown in FIG. 1 in application to interconnected components for constructing apparatus for performing methods of the invention, namely for providing three-dimensional display of three-dimensional objects and scenes. Some of these components are commercially available from different sources and will be identified before providing detailed description of their total operation. Other components in FIG. 1 are not commercially available and need to be fabricated using known and currently available technology. In FIG. 1, a three-dimensional still scene 10 to be displayed is shown, and to be surrounded by four stigmatic video cameras, 12, each mounted on a tripod, 13. These four cameras may be identically the same, and are commercially available from Eastman Kodak Company, Rochester, N.Y.; suitably, each of the cameras 12, may be Kodak Megaplus Model ES 1.0, which has the capabilities of having up to 1008×1018 8-bit pixels, although in the presently preferred embodiment 512×480 pixel images are utilized. The 4 stigmatic cameras provide a set of 4 two-dimensional views or images of the three-dimensional scene.

Basic operation is governed by computer means 14, which may be a "PC" computer, such as the "200 MHz Pentium Pro" available from Gateway 2000, Inc., North Sioux City, S.Dak.; as its designation suggests, this computer contains a 200 MHz clock-pulse generator, and an Intel 686 ("Pentium Pro") processor supplied with 128 megabytes of memory, with provision for keyboard instruction at 14'.

A high accuracy monochrome frame-grabber card 15 is relied upon to digitize and acquire the four images acquired by the four video cameras, respectively. The frame-grabber card is suitably Model DT3152 Data Translation, Marlboro, Mass., and is capable of acquiring up to 4 monochrome video signals.

A card 16 is shown which transmits digital data from the computer means 14 to the digital micromirror device, 19. The card may suitably be a digital input/output board of National Instruments, Austin, Tex., identified by National Instruments part No. AT-DIO-32F. This input/output board has 32 lines of digital input/output divided into four bytes capable of transmitting approximately 900 kilobytes per second.

Figure 3:
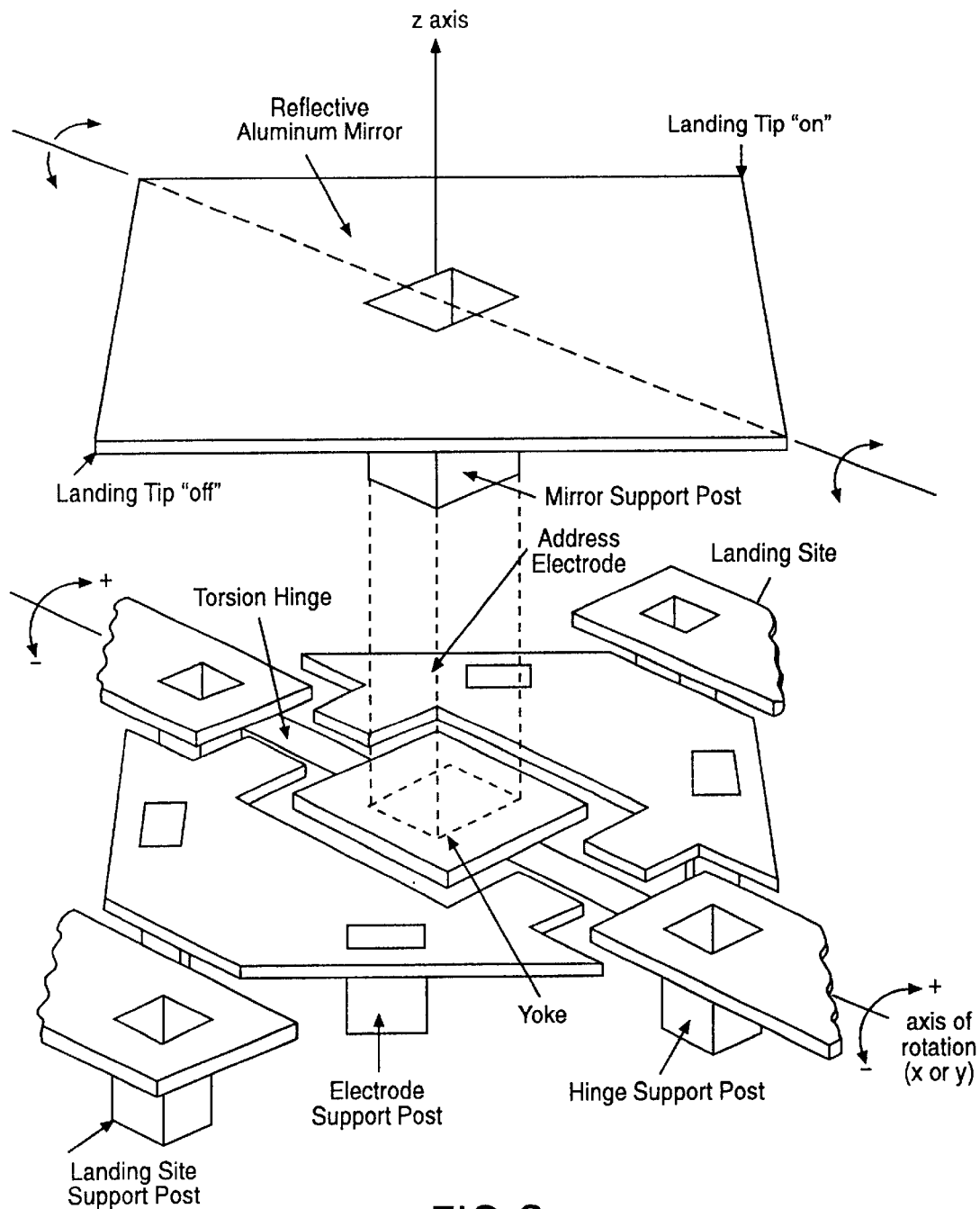
FIG. 3 is an exploded view of a single digital micromirror within the reflective light device offered by Texas Instruments, of Dallas, Tex.
Figure 5:
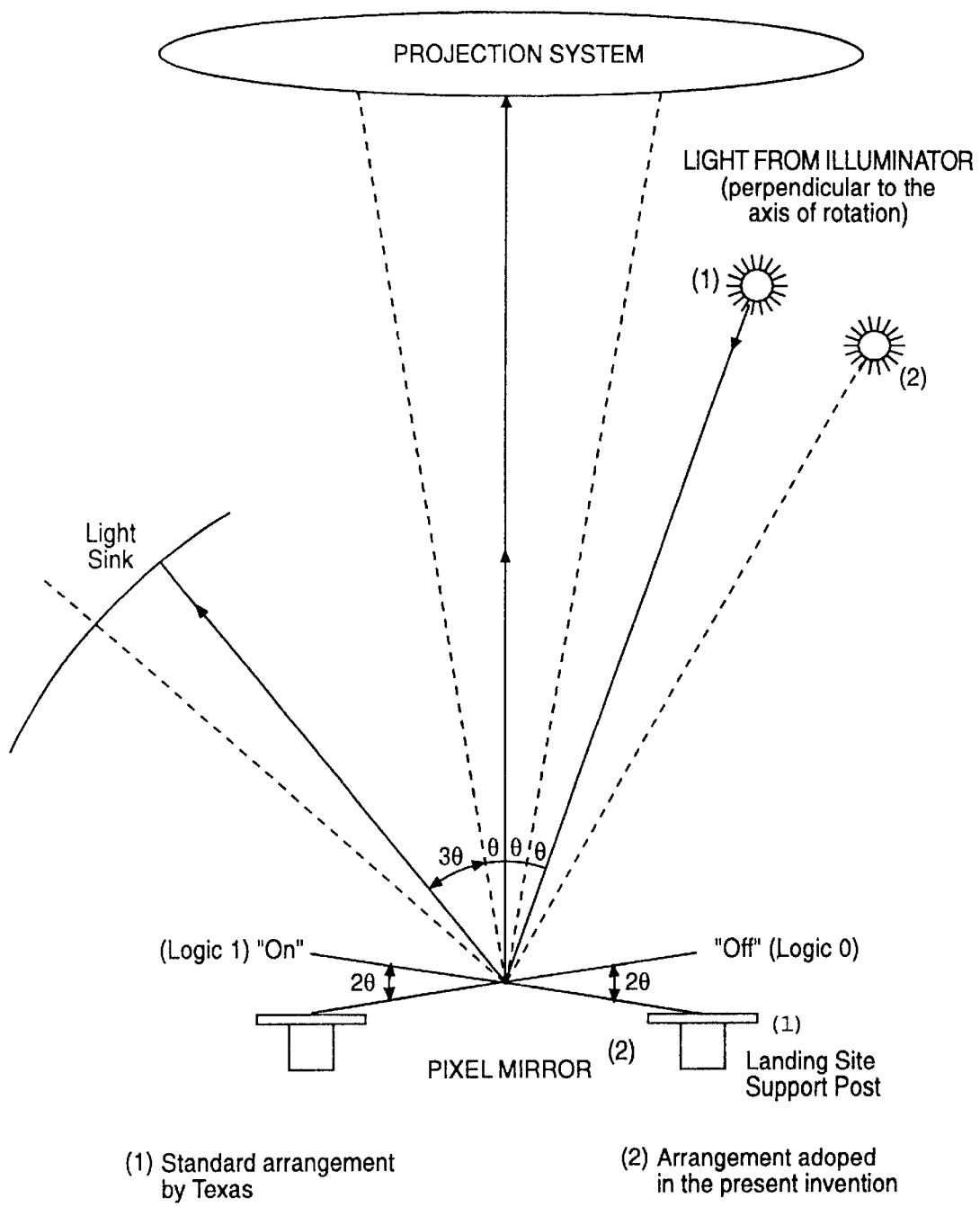
FIG. 5 is a schematic diagram of a single micromirror of the digital micromirror device offered by Texas Instruments, Dallas, Tex. The dotted lines refer to the modification adopted in the present invention.

A reflective light device, 19, is connected to the digital input/output board 16. Although a full description of the reflective light device 19 can be provided, it is more convenient to describe instead a modification of an already available reflective light device, namely the digital micromirror device offered by Texas Instruments, Dallas, Tex. In the standard Texas Instruments reflective light device shown in U.S. Pat. No. 5,061,049 by Hornbeck, issued Oct. 29, 1991, which is incorporated hereinto by reference and shown in FIG. 2 and FIG. 3 and FIG. 4, a set of very small mirrors or micromirrors are electronically controlled to reflect light in one of two possible orientations, namely directly out of the device (i.e., in a direction perpendicular to the surface of the device) or at an angle such that the reflected light is not observed and is absorbed by the light sink. This is shown in FIG. 5, for a single micromirror; as may be seen, the micromirror is positioned against one or the other of two posts of identical height; in the positive logic "1" or "on" position the beam of light is reflected directly towards the viewer, while in the positive logic "0" or off position the beam of light is reflected completely out of view. An image is formed when a large number of identical micromirrors are controlled in an appropriate manner and projected onto an appropriately adapted display screen as shown in FIG. 4; currently, Texas Instruments offers a model with up to 2048×1152=2,359,296 micromirrors. It should be understood that although FIG. 4 represents a color projection system, the operation of a monochrome projection system, as utilized in the currently preferred embodiment, is essentially equivalent.

Figure 6:
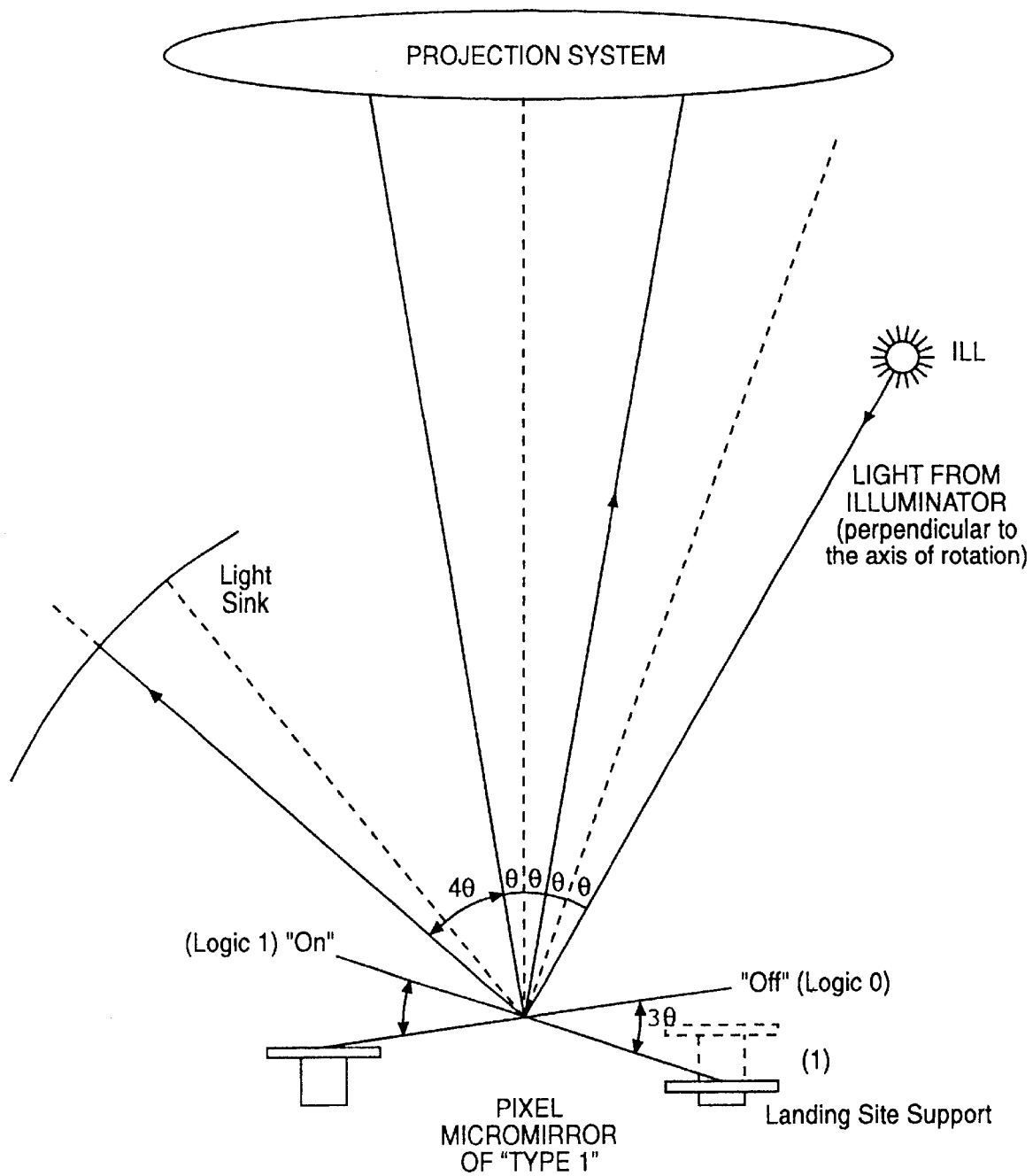
FIG. 6 is a schematic diagram of a single micromirror of "Type 1" associated with the modified reflective light device, 19, of FIG. 1, which shows its modified post height and illumination direction, for the beam of light in the plane orthogonal to the axis of rotation. The dotted lines refer to the standard illumination and post height adopted by Texas Instruments.
Figure 7:
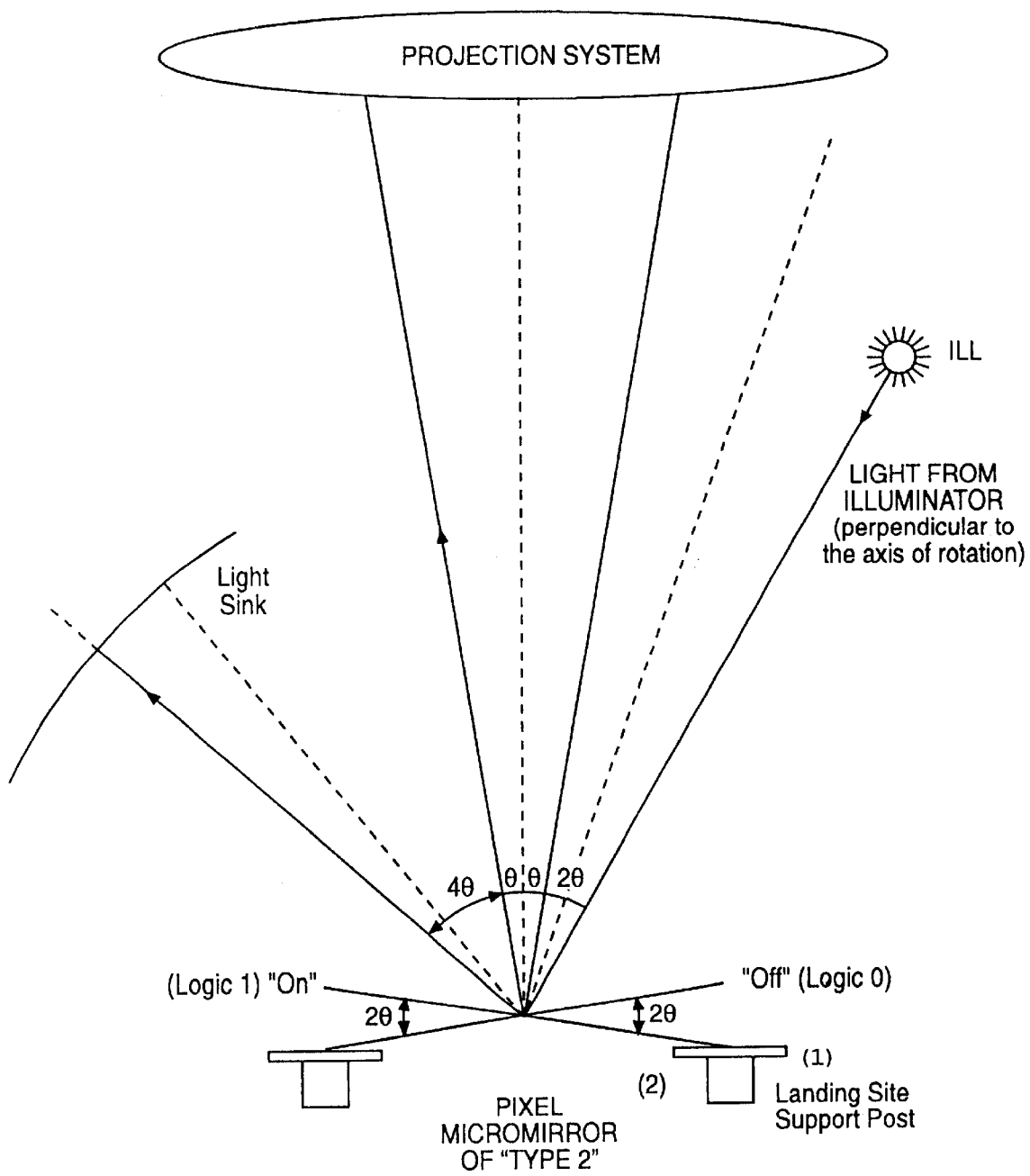
FIG. 7 is a schematic diagram of a single micromirror of "Type 2" associated with the modified reflective light device, 19, of FIG. 1, which shows its modified illumination direction, for the beam of light in the plane orthogonal to the axis of rotation. The dotted lines refer to the standard illumination adopted by Texas Instruments.
Figure 8:
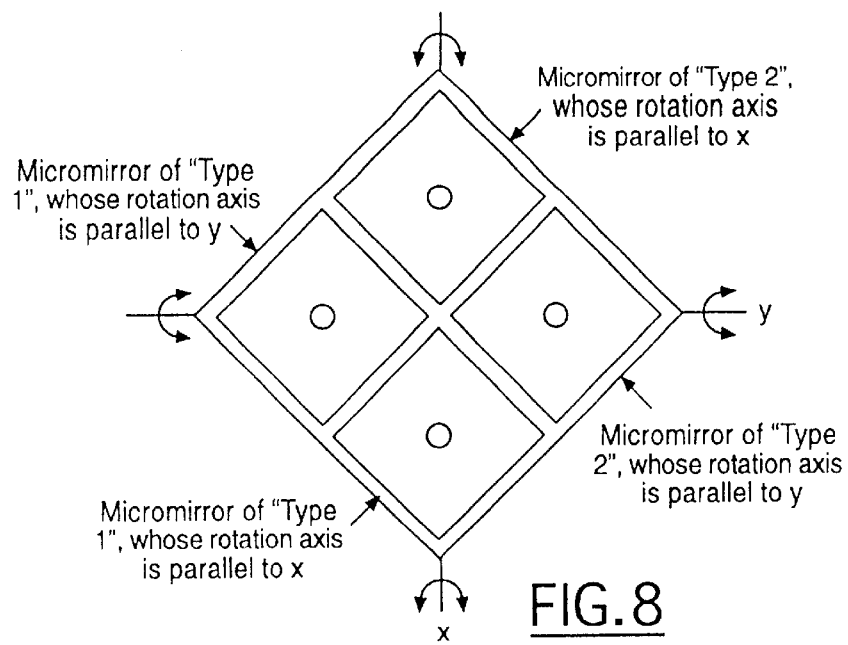
FIG. 8 is a schematic diagram of four micromirrors associated with a single pixel of the modified reflective light device, 19, of FIG. 1. The direction of one of the illuminations is in the y-z plane, and the other is in the x-z plane.

In contrast, in the modified reflective light device 19 the beam of light reflected from a particular micromirror when it is in the "on" position is not necessarily directed orthogonally from the display device surface, but rather at a specific oblique angle. This is shown in FIG. 6 for a single "Type 1" micromirror and in FIG. 7 for a single "Type 2" micromirror, for a presently preferred embodiment in which 4 micromirrors are used to form a single picture element or pixel. With reference to FIG. 8, the axis of rotation of two micromirrors (one of "Type 1" and the other of "Type 2") are vertical and parallel to the x-axis. The axis of rotation of the other two micromirrors (one of "Type 1" and the other of "Type 2") are horizontal and parallel to the y-axis. As may be seen, "Type 1" micromirrors have unequal post heights while "Type 2" micromirrors have equal post heights. In addition, for both types the angle of illumination is modified as compared to the standard digital micromirror device, as shown in FIG. 6 and FIG. 7. A further modification is the use of not one but two independent sources of illumination impinging on the micromirrors, one source in the x-z plane and one source in the y-z plane. FIG. 8 shows a set of four micromirrors comprising one pixel in the presently preferred embodiment. As may be seen, the beams of light due to the incident illumination in the plane orthogonal to the rotation axis of the micromirrors, when they are in the "on" positions, are reflected at angles of ±θ degrees in each of the vertical and horizontal planes, as illustrated in FIG. 5 and FIG. 6. In the "off" positions the beams of light are reflected completely out of view, and absorbed by the light sinks. Additionally, the beams of light due to the illumination incident on the plane parallel to the rotation axis of the micromirrors when they are in the "on" positions are reflected at angles out of view and absorbed by the light sinks. The radiant power of the reflected light from each micromirror in the reflected light device 19 is controlled by adjusting the duty cycle of the micromirror in terms of its proportion of time in the "on" mode in comparison to the time in the "off" mode. In the currently preferred embodiment, there are N=4 micromirrors in each pixel; each beam reflected by a micromirror within each pixel is directed in one of four directions: +10° vertically, −10° vertically, +10° horizontally and −10° horizontally, in their respective "on" modes; K=512×480=245,760 pixels; and there are a total of 4×512×480=983,040 micromirrors.

Finally, general signal-processing/display/storage software, for signal processing, control and operation of the computer is not shown but will be understood to be a floppy disk loaded at 18 into the computer; this software is suitably the MATLAB-386, available from The MathWorks, Inc., Natick, Mass. Further software, also not shown, will be understood to include signal-processing, neural-network, and image processing toolboxes, also available from The MathWorks; C++ and Fortran 5.0, available from Microsoft Corporation, Bothell, Wash.; LabView and NI-DAQ, available from National Instruments Corporation, Austin, Tex.; and Frame Grabber SDK, GLOBAL LAB, and GLIDE, available from Data Translation, Marlboro, Mass.

Figure 9:
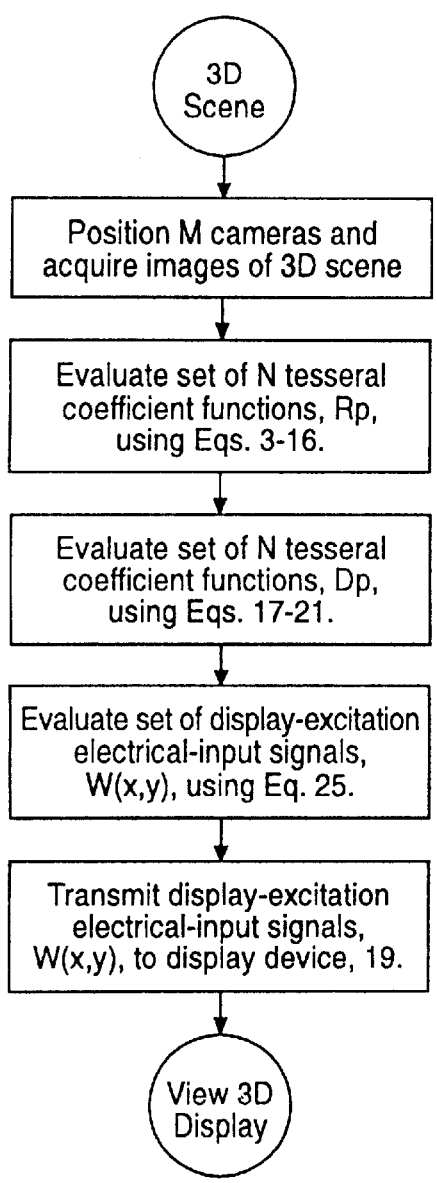
FIG. 9 is a flow chart of computer-controlled operations in providing a three-dimensional display of three-dimensional objects and scenes.

In the presently preferred embodiment of the invention and with additional reference to the flow diagram of FIG. 9, data is collected and processed as follows. A three-dimensional still scene (10) comprised of three-dimensional objects is recorded using a set of M=4 video stigmatic cameras (12) each mounted on a tripod (13), and facing the scene from four distinct locations. The set of four two-dimensional images acquired using the video cameras (12) are downloaded to the computer (14) using frame grabber card (15). These four images are denoted as $L_m(i,j)$, m=1, 2,3,4, and i and j denote the pixel (i,j) associated with the image stored in the memory of computer (14). The three-dimensional scene is characterized in terms of the radiance, R, at a reference planar window at z=0 in the object space. An expansion of the radiance, R, in terms of tesseral harmonics is then evaluated using the four images, $L_m(i,j)$, m=1,2,3,4; these are used to compute a set of four tesseral coefficient functions, $R_p(x_{m,i}, y_{m,j})$, p=1,2,3,4, where $x_{m,i}$ and $y_{m,j}$ are the coordinates associated with the planar window. Note that $x_{m,i}=2d\mu_m i$ and $y_{m,j}=2d\mu_m j$, where 2d is the size of the picture element (pixel) of the camera detector, and $\mu_m$ is the transverse magnification associated with the optics of the mth camera. It should be understood, and with additional reference to FIG. 10, that if $d_m$ is the distance between the input principal plane of the $m^{th}$ camera optics and the plane conjugate to the mth camera detector, and if $d_{Tm}$ is the distance between the output principal plane of the $m^{th}$ camera optics and the $m^{th}$ camera detector, then $\mu_m = d_m/d_{Tm}$.

In a similar manner, the radiance function, D, associated with display device (19) is also expressed in terms of a tesseral harmonic expansion, whose coefficient functions are denoted by $D_q(x_i, y_j)$, q=1,2, ..., N, where N=4 in the presently preferred embodiment. It should be understood that for this embodiment there is a one-to-one correspondence between the size of the planar window and the display device. It is further understood that the functions $D_q(x_i, y_j)$, q=1,2,3,4, are linear functions of a set of display-excitation electrical-input signals, $W_q(x_i, y_j)$, q=1,2,3,4, which are proportional to the radiant power of the corresponding micromirror; thus, $D_q(x_i, y_j)$ may be expressed as a linear function of $W_q(x_i, y_j)$. It should be additionally understood that the set of N=4 display-excitation electrical-input signals, $W_q(x_i, y_j)$, q=1,2,3,4, are used to control the amount of light reflected from the four micromirrors q, q=1,2,3,4, at pixel $\{x_i, y_j\}$. As already noted, in the currently preferred embodiment of the invention, i=1, ..., 480, and j=1, ..., 512, making for a total of 245,760 pixels in the displayed three-dimensional image, and 4×245,760=983,040 micromirrors in reflected light display device (19).

The set of values for the display-excitation electrical-input signals, $W_q(x_i,y_j)$, q=1,2,3,4, i=1, . . . ,480, and j=1, . . . , 512, are evaluated and transferred from computer memory to digital input/output card (15) for transmission to reflected light device (19). The planar display device (19), upon input of the set of display-excitation electrical-input signals, produces a displayed image similar to that seen when viewing the original three-dimensional scene (10), whereby achieving the indicated objectives. It should be further understood that the displayed three-dimensional image may be viewed by observers (99) from a continuum of locations in front of the three-dimensional display, thus enabling full multiviewpoint as well as autostereoscopic capabilities.

The preceding description has proceeded on the basis that a tesseral harmonic expansion can be utilized for deriving a set of display-excitation electrical-input signals suited for driving the reflective light display device. The discussion has also assumed that the relationship between the display-excitation electrical-input signals and the coefficient functions $D_q(x_i,y_j)$, q=1,2,3,4 are linear functions of the display-excitation electrical-input signals, $W_q(x_i,y_j)$, q=1,2,3,4. These facts are demonstrated as follows.

The proof of the above statements is rooted in a fundamental insight which led the present inventors to their current invention. This insight is that any three-dimensional scene composed of three-dimensional objects when viewed through a planar window can be considered to be equivalent to a planar screen coincident with the planar window whose radiance is identical to the radiance of the three-dimensional scene itself at that planar window. As a clarifying example, it may be convenient to consider this representation in terms of the image which would be produced by a planar mirror which is reflecting light from a set of objects located in an appropriate position in front of the planar window. According to this observation, and with additional reference to FIG. 10, we can express, using a generalized version of Lambert's law (see, for example, *Handbook of Optics, Devices, Measurements and Properties, Second Edition, Vol. II*, Michael Bass, Editor-in-Chief, published by McGraw Hill, New York, N.Y., Chapter 24), the total light power in watts [W], $L_m(i,j)$, received by pixel (i,j) of the detector of stigmatic camera m, m=1,2,3,4. The expression, assuming an arbitrarily small pixel size, may be approximated by:

$$L_m(i,j) = 4d^2 \mu_m^2 \iint R(x_{m,i}+a_m, y_{m,j}+b_m, \theta, \phi) \cos\theta \sin\theta \, d\theta \, d\phi \quad (1)$$

In Eq. (1), $R(x_{m,i}+a_m, y_{m,j}+b_m, \theta, \phi)$, in units of watts per square meter per steradian solid angle [$Wm^{-2}sr^{-1}$], is the local radiance (which is also herein referred to as simply radiance or radiance function) at the reference planar window at $(x_{m,i}+a_m, y_{m,j}+b_m)$, and $a_m$ and $b_m$ are the respective horizontal and vertical shifts associated with the cameras 12, for each of the M=4 positions. The angles $\theta$ and $\phi$ are local spherical coordinates taken with respect to polar axis z' through (x,y,0) and parallel to z, and the integration in Eq. 1 is carried out for the rays $(\theta,\phi)$ which enter the pupil of the $m^{th}$ camera. In the presently preferred embodiment, the window is located at the plane z=0 of the object space coordinates, which are coincident with the camera coordinates, apart from the transverse shifts $a_m$ and $b_m$. The window plane is conjugate to the detector plane of each camera. The distance both of the origin of the camera coordinates and of the camera imaging plane itself from the input principal plane of each camera optics is $c_m$; hence, $c_m = d_m$ in the presently preferred embodiment which utilizes stigmatic cameras.

A key factor to the present invention is the recognition that the function $R(x,y,\theta,\phi)$ can be expanded in tesseral harmonics at each point (x,y) (see for example the book *Electromagnetic Theory*, J. A. Stratton, McGraw Hill, New York, 1941, pp. 399–408):

$$R(x, y, \theta, \phi) = \sum_{p=1}^{\infty} R_p(x, y) Y_p(\theta, \phi) \quad (2)$$

In Eq. (2), the $Y_p(\theta,\phi)$ are known orthogonal functions of $\theta$ and $\phi$ (actually of $\cos\theta$, $\sin\theta$, $\cos\phi$ and $\sin\phi$); their definitions can be found also on p. 332, note 2, in Handbook of *Mathematical Functions*, M. Abramowitz and I. A. Stegun, Dover Publications, New York, 1965, ninth printing. Another excellent reference is the book *Electromagnetic Theory* by Julius Adams Stratton, published in New York by McGraw Hill in 1941 and included by reference hereinto, viz., see for example, Eq. (19) on p. 403. It should be understood that although the $Y_p(\theta,\phi)$ are indexed by a single parameter (e.g., "p"), the tesseral harmonics used in the present embodiment contain two indices (in the book by Stratton, these are indicated by "n" and "m," where n is an integer $\geq 0$ and m is any integer such that $|m| \leq n$). Thus it is in general necessary to construct a correspondence or "look-up table" between the sets of indices. In the presently preferred embodiment, this correspondence for the first 25 values of p is given by:

| p | n | m |
|---|---|---|
| 1 | 0 | 0 |
| 2 | 1 | 1 |
| 3 | 1 | 0 |
| 4 | 1 | -1 |
| 5 | 2 | 2 |
| 6 | 2 | 1 |
| 7 | 2 | 0 |
| 8 | 2 | -1 |
| 9 | 2 | -2 |
| 10 | 3 | 3 |
| 11 | 3 | 2 |
| 12 | 3 | 1 |
| 13 | 3 | 0 |
| 14 | 3 | -1 |
| 15 | 3 | -2 |
| 16 | 3 | -3 |
| 17 | 4 | 4 |
| 18 | 4 | 3 |
| 19 | 4 | 2 |
| 20 | 4 | 1 |
| 21 | 4 | 0 |
| 22 | 4 | -4 |
| 23 | 4 | -3 |
| 24 | 4 | -2 |
| 25 | 4 | -1 |

Combining Eqs. 1 and 2, one has:

$$L_m(i, j) = 4d^2 \mu_m^2 \int_{-P_x}^{P_x} \int_{-P_y}^{P_y} \sum_{p=1}^{\infty} R_p(x_{m,i}+a_m, y_{m,j}+b_m) \quad (3)$$

$$K_p(X - x_{m,i}, Y - y_{m,j}, c_m) dX dY$$

Figure 10:
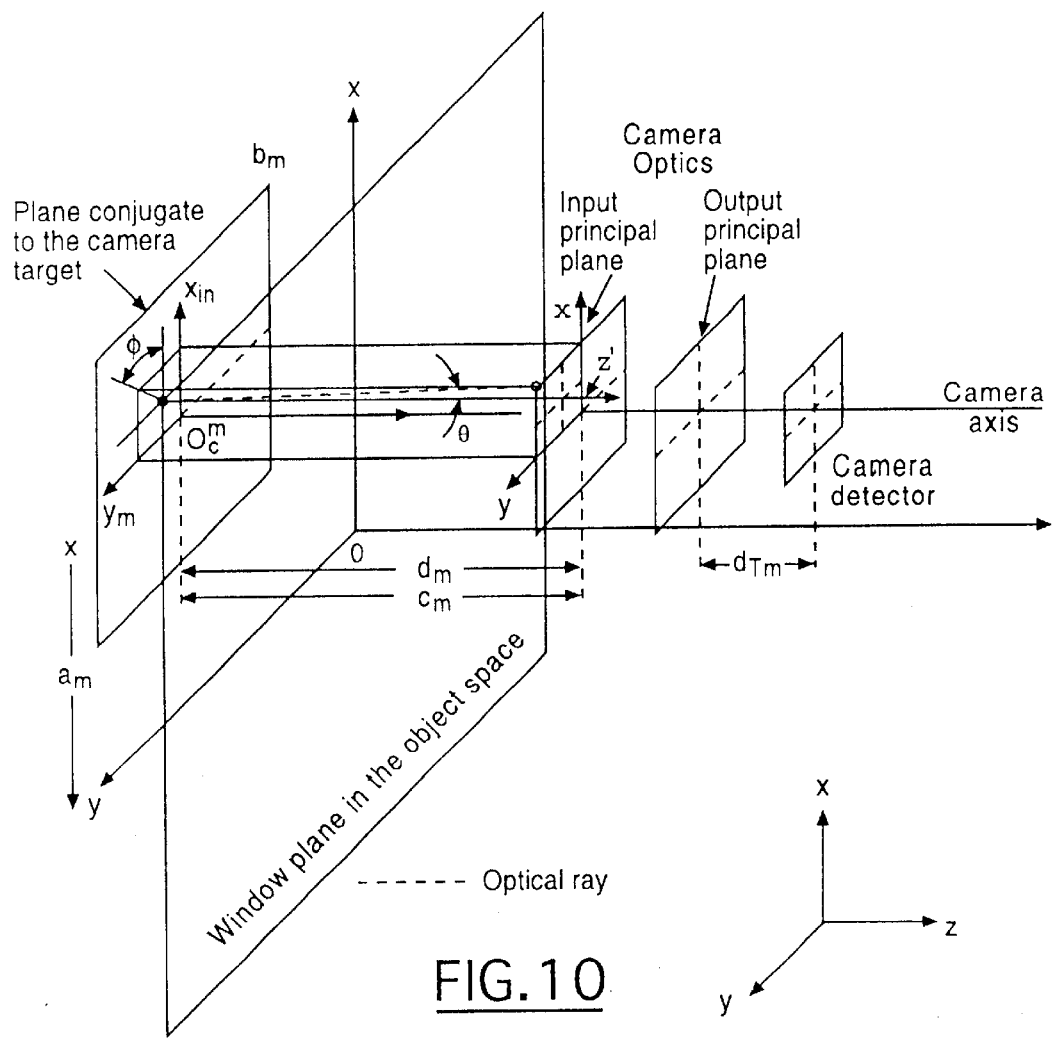
FIG. 10 is a graphical depiction of the coordinates used in the analytic derivation of one presently preferred embodiment of the invention.

The integration variables have been changed from $\theta$ and $\phi$ to Cartesian coordinates X and Y defined in the input principal plane of the camera optics (see FIG. 10). The dimensions of the camera rectangular pupil at the input principal plane of the camera, where the double integration in Eq. 3 is carried out, are $2P_x$ and $2P_y$, respectively. The functions $K_p$ are given by:

$$K_p(X - x_{m,i}, Y - y_{m,j}, c_m) = Y_p(\theta, \phi)\cos^2\frac{\theta}{r_{m,ij}^2} \quad (4)$$

where $$r_{m,ij}^2 = (X - x_{m,i})^2 + (Y - y_{m,j})^2 + c_m^2 \quad (5)$$

The angles $\theta$ and $\phi$ are related to X and Y through the following set of equations:

$$\cos\theta = \frac{c_m}{r_{m,ij}} \quad (6)$$

$$\sin\theta = \frac{\sqrt{(X - x_{m,i})^2 + (Y - y_{m,j})^2}}{r_{m,ij}} \quad (7)$$

$$\cos\phi = \frac{(X - x_{m,i})}{\sqrt{(X - x_{m,i})^2 + (Y - y_{m,j})^2}} \quad (8)$$

$$\sin\phi = \frac{(Y - y_{m,i})}{\sqrt{(X - x_{m,i})^2 + (Y - y_{m,j})^2}} \quad (9)$$

Now Eq. 3 can be written as a summation of convolutions:

$$L_m(i,j) = 4d^2\mu_m^2 \sum_{p=1}^{\infty} \int_{-P_x}^{P_x}\int_{-P_y}^{P_y} R_p(x_{m,i} + a_m, y_{m,i} + b_m) \quad (10)$$

$$K_p(X - x_{m,i}, Y - y_{m,j}, c_m) dX dY$$

With respect to Eq. 10, it should be noted that: (i) all the $K_p$ are known a priori, given by Eq. 4; (ii) $L_m(i,j)$ represents the measurements, i.e., the pixel values associated with the video cameras; (iii) the integration is with respect to the variables X and Y, and thus $R_p$ may be taken outside the double integral; and (iii) if the summation is truncated at some value $N<\infty$, and assuming that $M \geq N$ images at M distinct sets of values of {a,b,c} were acquired (i.e., at M distinct horizontal, vertical, and longitudinal shifts, for example $\{a_1, b_1, c_1\}, \ldots, \{a_m, b_m, c_m\}, \ldots, \{a_M, b_M, c_M\}$), then a linear set of equations associated with Eq. 10 can be derived and solved to obtain an estimate of the set of (coefficient) functions $R_{p(xi,yj)}$, p=1,2, . . . , N, where $x_i = x_{m,i} + a_m$ and $y_j = y_{m,i} + b_m$ are the associated pixel locations in the display device, with respect to the coordinate axes of the window plane. In the case when M>N, an overdetermined set of equations results; in the case when M=N, a square set of equations results; in both cases, a least squares solution may be found. It should be understood that the estimate of $R_p(x_i,y_j)$ will not be distinguished herein from $R_p(x_i,y_j)$ itself, although it is obvious that the two will be different, due both to the finite truncation of the summation as well as the presence of noise. It should be further understood that in this analysis the M two-dimensional views of the three-dimensional scene were assumed to be acquired at M distinct locations, the locations being arranged such that the cameras are all directed in a parallel fashion towards the three-dimensional scene. It should be clear however that this represents no loss of generality in terms of the currently preferred embodiment of the invention; in particular images can be obtained from cameras arranged in non-parallel or "tilted" orientations.

Assume now that the summation in Eq. 10 is truncated at N terms, and that N two-dimensional images are acquired at M=N distinct sets of values of {a,b,c}, i.e., $\{a_1, b_1, c_1\}, \ldots, \{a_m, b_m, c_m\}, \ldots, \{a_N, b_N, c_N\}$,). Then Eq. 10 may be expressed as:

$$L_m(i - \alpha_m, j - \beta_m) = \sum_{p=1}^{N} R_p(i,j) G_{mp}(i,j) \quad (11)$$

where $$G_{mp}(i,j) = 4d^2\mu_m^2 \int_{-P_x}^{P_x}\int_{-P_y}^{P_y} K_p(X - x_{m,i-\alpha_m}, Y - y_{m,j-\beta_m}, c_m) dX dY \quad (12)$$

$$\alpha_m = \frac{a_m}{2d\mu_m} \quad (13)$$

$$\beta_m = \frac{b_m}{2d\mu_m} \quad (14)$$

Note that m=1, . . . , N and p=1, . . . , N, N=4, and $a_m$, $b_m$ are chosen so that $\alpha_m$ and $\beta_m$ are both integer numbers, in the presently preferred embodiment. It should be understood that for ease of notation $R_p(i,j)$ denotes the value of the tesseral coefficient function $R_p(x,y)$ at $x=2d\mu_m i$ and $y=2d\mu_m j$. Now letting $L(i,j) = [L_1(i-\alpha_1, j-\beta_1) \ldots L_m(i-\alpha_m, j-\beta_m) \ldots L_N(i-\alpha_N, j-\beta_N)]^T$, $R(i,j) = [R_1(i,j) \ldots R_n(i,j) \ldots R_N(i,j)]^T$, and $G(i,j) = [G_{mp}(i,j)]$, the N×N matrix of coefficients $G_{mp}$, Eq. 11 may now be written as the matrix expression $$L = GR \quad (15)$$

where for convenience we have dropped the explicit dependence on (i,j). Thus the functions $R_p(i,j)$ are evaluated through inversion of Eq. 15, namely, $$R = G^{-1}L \quad (16)$$

The above inversion is repeated for each pixel (i,j) in the display device in order to obtain the estimated set of tesseral coefficient functions, $R_p(i,j)$, p=1,2, . . . , N, i=1, . . . ,480, j=1, . . . 512, associated with the three-dimensional scene.

Next, a corresponding analysis is applied to the display device, the reflected light device 19, whose radiance function is represented by the function, $D(x,y,\theta,\phi)$. It should be understood that (i) each picture point (pixel) at (x,y) is composed of N independent light sources, i.e., the N micromirrors, which emit N independent beams of light; and (ii) each of the N beams of light is characterized by its associated radiance $W_i(x,y)B_1(\theta,\phi)$, where $W_1(x,y)$, the display-excitation electrical-input signal, is the normalized radiant power of the $i^{th}$ beam, i=1, . . . , N, and $B_i(\theta,\phi)$ is related to the intensity pattern of the $i^{th}$ beam. Then, in view of the above two factors, in conjunction with the fact that the light radiated from the display device is incoherent, the radiance function, $D(x,y,\theta,\phi)$ [Wm$^{-2}$sr$^{-1}$], may be represented by the following summation:

$$D(x, y, \theta, \phi) = \sum_{p=1}^{N} W_p(x, y) B_p(\theta, \phi) \quad (17)$$

In Eq. 17, $W_p(x,y)$ is the normalized radiant power (i.e., $0 \leq W_p(x,y) \leq 255$) of the $p^{th}$ reflected light beam, $B_p(\theta,\phi)$ [Wm$^{-2}$sr$^{-1}$], from pixel (x,y), that is, the light power radiated by one of the N micromirrors located at pixel (x,y). The functions, $B_p(\theta,\phi)$, p=1,2, . . . , N can be expressed as a tesseral harmonic expansion:

$$B_p(\theta, \phi) = \sum_{q=1}^{\infty} s_{pq} Y_q(\theta, \phi) \tag{18}$$

In Eq. 18, $s_{pq}$ are the tesseral coefficients associated with the tesseral expansion, and $Y_q(\theta,\phi)$ are the known orthogonal functions introduced earlier. The tesseral coefficients, $s_{pq}$, can be evaluated using the equations provided in *Electromagnetic Theory*, J. A. Stratton, McGraw Hill, New York, 1941, p. 403, Eqs. 18–19, and which are included by reference hereinto. Combining Eqs. 17 and 18, one obtains $$D(x, y, \theta, \phi) = \sum_{q=1}^{\infty} \left[ \sum_{q=1}^{N} s_{pq} W_p(x, y) \right] Y_q(\theta, \phi) \tag{19}$$

$$= \sum_{q=1}^{\infty} D_q(x, y) Y_q(\theta, \phi)$$

where $$D_q(x, y) = \sum_{p=1}^{N} s_{pq} W_p(x, y), q = 1, 2, 3, \ldots \tag{20}$$

It should be understood that Eq. 20 represents a linear relationship between the normalized radiant powers, $W_p(x, y)$, associated with the micromirrors of the display device, and the tesseral coefficient functions, $D_q(x,y)$. The normalized radiant powers, $W_p(x,y)$, associated with the micromirrors in the display device, can now be evaluated by setting the first N tesseral coefficient functions for the three-dimensional display equal to the N tesseral coefficient functions of the three-dimensional scene, namely:

$$R_q(x,y) = D_q(x,y), q=1, \ldots, N. \tag{21}$$

Combining Eq. 21 with Eq. 20 gives:

$$R_q(x, y) = \sum_{p=1}^{N} s_{pq} W_p(x, y), q = 1, \ldots N \tag{22}$$

or in matrix form $$R(x,y) = SW(x,y) \tag{23}$$

where $R(x,y)=[R_1(x,y) R_2(x,y) \ldots R_N(x,y)]^T$, $W(x,y)=[W_1(x,y) W_2(x,y) \ldots W_N(x,y)]^T$, $S^T=[s_{ij}]$, the N×N matrix of coefficients $s_{ij}$, and $^T$ denotes matrix transpose. It should be understood that the normalized radiant powers represented by column vector, $W(x,y)$, are the set of display-excitation electrical-input signals which are transferred from the computer to the reflected light device in order to form the three-dimensional image.

The solution of Eq. 23 provides the values of the normalized radiant powers associated with the micromirrors in the reflected light device, i.e., $W(x,y)$, is given by $$W(x,y) = S^{-1} R(x,y) \tag{24}$$

where $S^{-1}$ denotes the matrix inverse of S, and it should be understood that x and y represent the locations in the display corresponding to the planar window. Finally, using Eq. 16 together with Eq. 24 provides the following complete solution:

$$W = (GS)^{-1} L \tag{25}$$

where for convenience we have dropped the (x,y) notation. Eq. 25 provides the set of display-excitation electrical-input signals for input to the display device 19. It should of course be understood that the values obtained in Eq. 25 for W are to be normalized to the range 0 to 255, in accordance with the 8 bit data word associated with the digital input/output card and reflected light device of the currently preferred embodiment. It should further be understood that connecting the values W determined from Eq. 25 to the reflected light display device produces the desired three-dimensional view of the three-dimensional scene, thereby achieving the indicated objectives. An additional point to be understood is that the disclosed invention can be used for either still three-dimensional scenes, or for dynamic three-dimensional scenes, i.e., three-dimensional television or video. In the latter case, the processing must be implemented in or close to "real-time". For this, the techniques described in the book *Introduction to Parallel and Vector Solution of Linear Systems*, by James M. Ortega, published by Plenum Press, New York, N.Y., in 1988, and included by reference hereinto, can be utilized to solve Eq. 25. Other high-speed computational approaches and ad hoc hardware microelectronics may be utilized as well.

It should be understood that the above procedure can be generalized by choosing a number, Q, of tesseral harmonics associated with Eqs. 11, 21, and 22, where $Q \geq N$. It is thus to be understood that the length of the column vector $R(x,y)$ is Q, and the matrices G and S are N×Q and Q×N matrices, respectively, so that the matrix product GS and its inverse $(GS)^{-1}$ are N×N matrices. This can also be extended to the case of M>N (i.e., a number of cameras, M, greater than the number of degrees of freedom, N, in each pixel of the display device), in which G becomes M×Q, and the inverse operation in Eq. 25 should be appropriately interpreted as a pseudoinverse operation. An excellent reference on the solution of such overdetermined systems can be found in the book *Solving Least Squares Problems*, by C. L. Lawson and R. Hanson, published by Prentice Hall of Englewood, N.J. in 1974, and which is included by reference hereinto.

It should be additionally understood that N is the number of independent degrees of freedom in each pixel of the display device. Hence, in the general case, the digital micromirror device may be modified so that each pixel is comprised of a set of N distinct micromirrors with, in general, up to N distinct post heights (e.g., "Type 1", "Type 2", . . . , "Type N") and of a suitable set of illuminations; in this case the beams of light reflected from each mirror is oriented in one of N distinct "on" directions. The reflected light device 19 is further specified to be composed of a total of K discrete pixels. Further, each of the K pixels in the modified digital micromirror device are equivalent in terms of the N distinct micromirrors of which they are each comprised. Thus it should be realized that any number, N, of micromirrors associated with each pixel can be used, any number, M, of cameras can be used, and any number, Q, of terms in the tesseral harmonic scene and display expansions can be used, with the understanding that $M \geq N$ and $Q \geq N$.

It should further be understood that the reflected light device 19 of FIG. 1 is used in conjunction with an appropriate projection screen and associated electronics and optics, as schematically diagramed in FIG. 4. It should be additionally understood that display devices other than the reflected light device can be used as part of the three-dimensional display system. For example, and with additional reference to FIG. 11, an alternative preferred embodiment of the present invention uses a liquid crystal display (LCD) device to display the three-dimensional image. In this alternative embodiment, a pixel in the LCD device is comprised of a set of N"subpixels" (a "subpixel" being understood to be an ordinary pixel in a standard LCD), together with a set of optical transformers. The optical transformers are thin lenslets, constructed such that a parallel ray impinging at $(x_p, y_p)$ on the lenslet emerges at an angle, $\theta_p$. A "subpixel" in the LCD whose center is located at $(x_p, y_p)$ produces an emerging beam $W_p B_p(\theta, \phi)$ centered around $\theta_p$. It is to be understood that a similar analysis as carried out for the reflective light display device can also be carried out for the LCD-lenslet display device, i.e., using Eqs. 17–20 and thereby achieving an alternative preferred embodiment of the present invention. A useful reference on the subject of liquid crystal display devices can be found in the reference *Handbook of Optics, Devices, Measurements and Properties, Second Edition, Vol. I*, Michael Bass, Editor-in-Chief, published by McGraw Hill in 1995, New York, N.Y., Chapter 27, pp. 27.36–27.44, and which is incorporated by reference hereinto. A recent advance in three-dimensional display devices is shown in U.S. Pat. No. 5,493,427 by Nomura et al., issued Feb. 20, 1996, and which is incorporated hereinto by reference. This device utilizes a liquid crystal display panel and an attached electronically variable lens. In an alternative embodiment of the present invention, this display device is used to receive the set of display-excitation electrical-input signals provided herein in Eq. 25.

Figure 12:
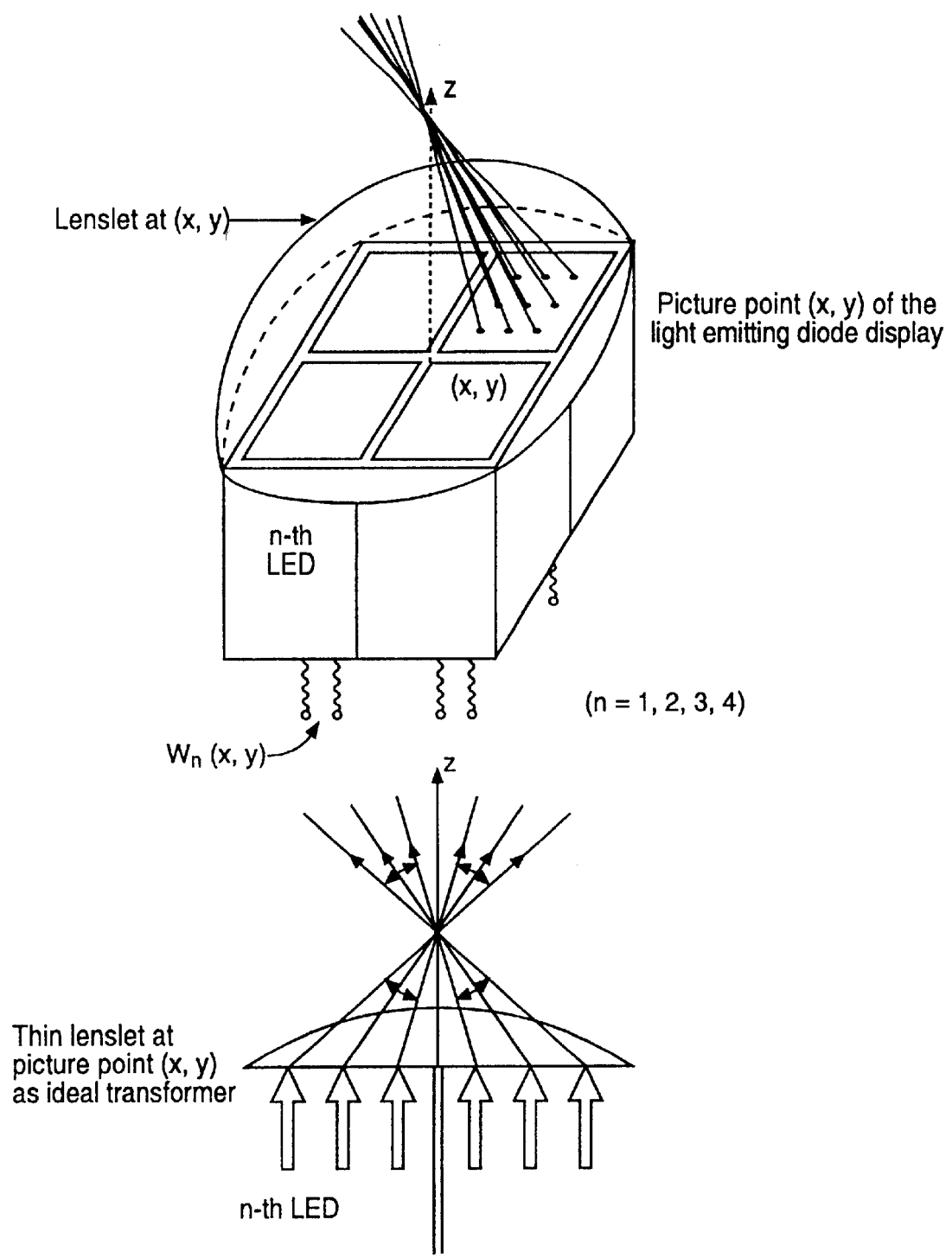
FIG. 12 is a schematic diagram showing another display embodiment, based on light emitting diodes.

In yet another alternative embodiment, and with additional reference to FIG. 12, a set of light-emitting diodes (LED's) together with a set of optical transformers is used to realize the three-dimensional display device. In this alternative embodiment, the optical transformers are thin lenslets, constructed such that a parallel ray impinging at $(x_p, y_p)$ on the lenslet emerges at an angle, $\theta_p$. An LED whose center is located at $(x_p, y_p)$ produces an emerging beam $W_p B_p(\theta, \phi)$ centered around $\theta_p$. It is to be understood that a similar analysis as carried out for the reflective light display device can also be carried out for the LED-lenslet display device, i.e., using Eqs. 17–20 and thereby achieving an alternative embodiment of the present invention. A useful reference on the subject of light emitting diodes can be found in the reference *Handbook of Optics, Devices, Measurements and Properties, Second Edition, Vol. I*, Michael Bass, Editor-in-Chief, published by McGraw Hill in 1995, New York, N.Y., Chapter 12, and which is incorporated by reference hereinto. A recent advance in the engineering of LEDs is the development of transparent organic LEDs (TOLEDs). These devices, which can generate light in the red, green and blue spectral regions, can be used in the construction of a suitable display device using the principles disclosed herein. A useful reference for TOLEDs entitled "Transparent light emitting devices" may be found in *Nature*, Vol. 380, Mar. 7, 1996, p. 29, by V. Bulovic et al., and is incorporated by reference hereinto. It is also to be noted that a display device comprised of suitably arranged bundles of optical fibers can serve as the basis for constructing the display device. Each optical fiber bundle realizes a single pixel. A useful reference on the subject of miniature and micro-optical means can be found in the reference *Handbook of Optics, Devices, Measurements and Properties, Second Edition, Vol. II*, Michael Bass, Editor-in-Chief, published by McGraw Hill, New York, N.Y., Chapters 7, 8 and 10, and which is incorporated by reference hereinto. A general reference on display systems can be found in the publication "Cameras and Display Systems" by yoshitaka Hashimoto et al., in the *Proceedings of the IEEE, Vol* 83, No. 7, Jul. 1995, pp. 1032–1043. Another example of a display device which may be utilized in the presently disclosed invention is known as a grating light valve, which is similar to a digital micromirror device in terms of its ability to control its emitted light pattern. Some new developments of flat-panel displays are reviewed by Ken Werner "The flowering of flat displays," published in *IEEE Spectrum*, May, 1997, pp. 40–49. It is therefore to be understood that the principles disclosed herein, namely the decomposition in terms of tesseral harmonics of the scene and display radiances, respectively, can be adapted to any number of display device embodiments with the understanding that the specific display device embodiment utilized provides a means for independently controlling the angular distribution of the light emitted from each pixel. It is further to be understood that there is no limitation on the number of independent degrees of freedom, N, associated with any specific display device embodiment to be used in the present invention, or with the number of cameras used, or with the number of terms used in the tesseral harmonic expansions, with the conditions that $M \geq N$ and $Q \geq N$. It is to be realized that increasingly larger values of M, N, and Q will generally lead to three-dimensional display of three-dimensional scenes of increasingly higher quality.

Figure 13:
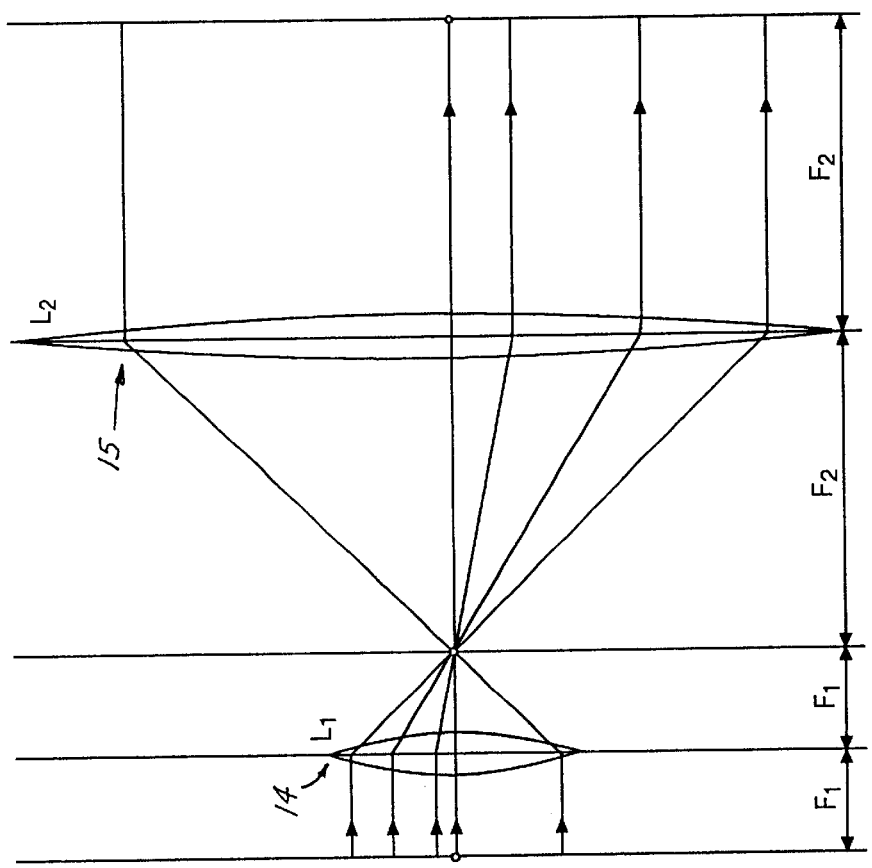
FIG. 13 is a schematic diagram showing an afocal optical system embodiment of the present invention.
Figure 14:
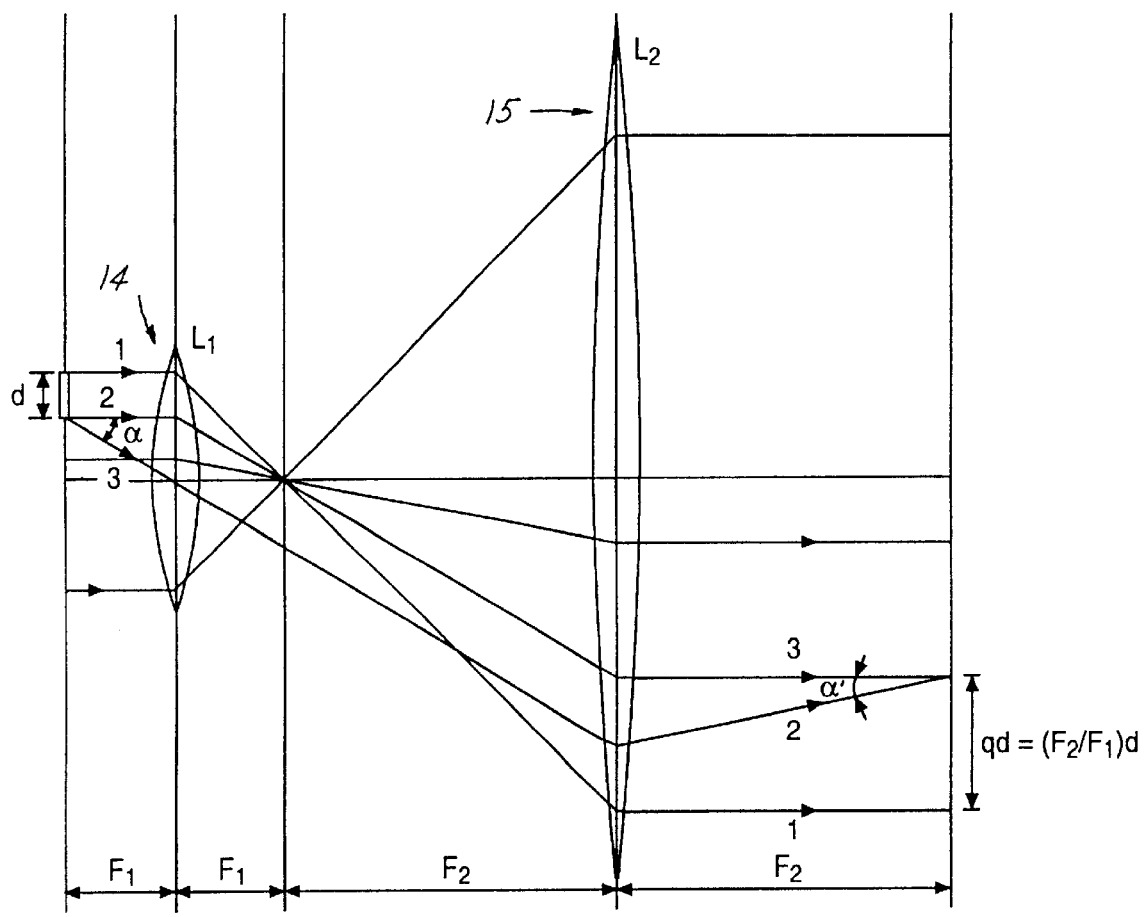
FIG. 14 is another schematic diagram showing additional optical component details of the optical system shown in FIG. 13.
Figure 15:
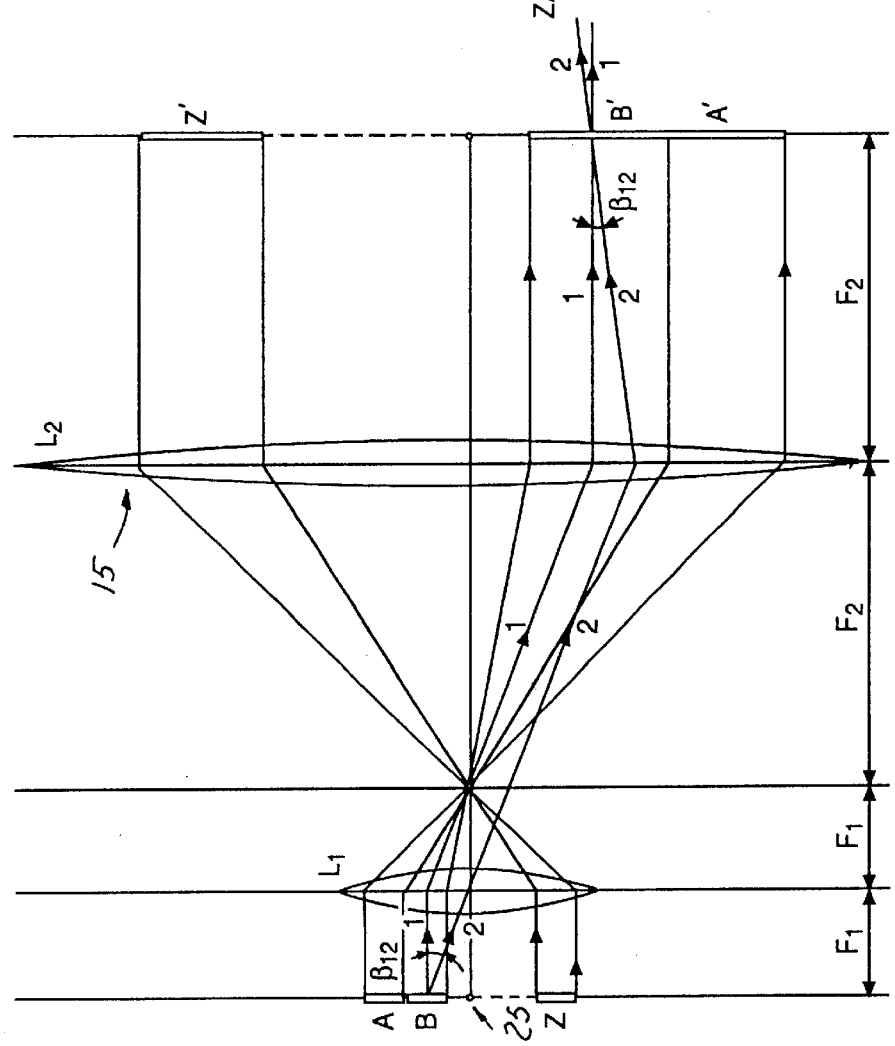
FIG. 15 is another schematic diagram showing additional optical system details associated with FIG. 13.
Figure 16:
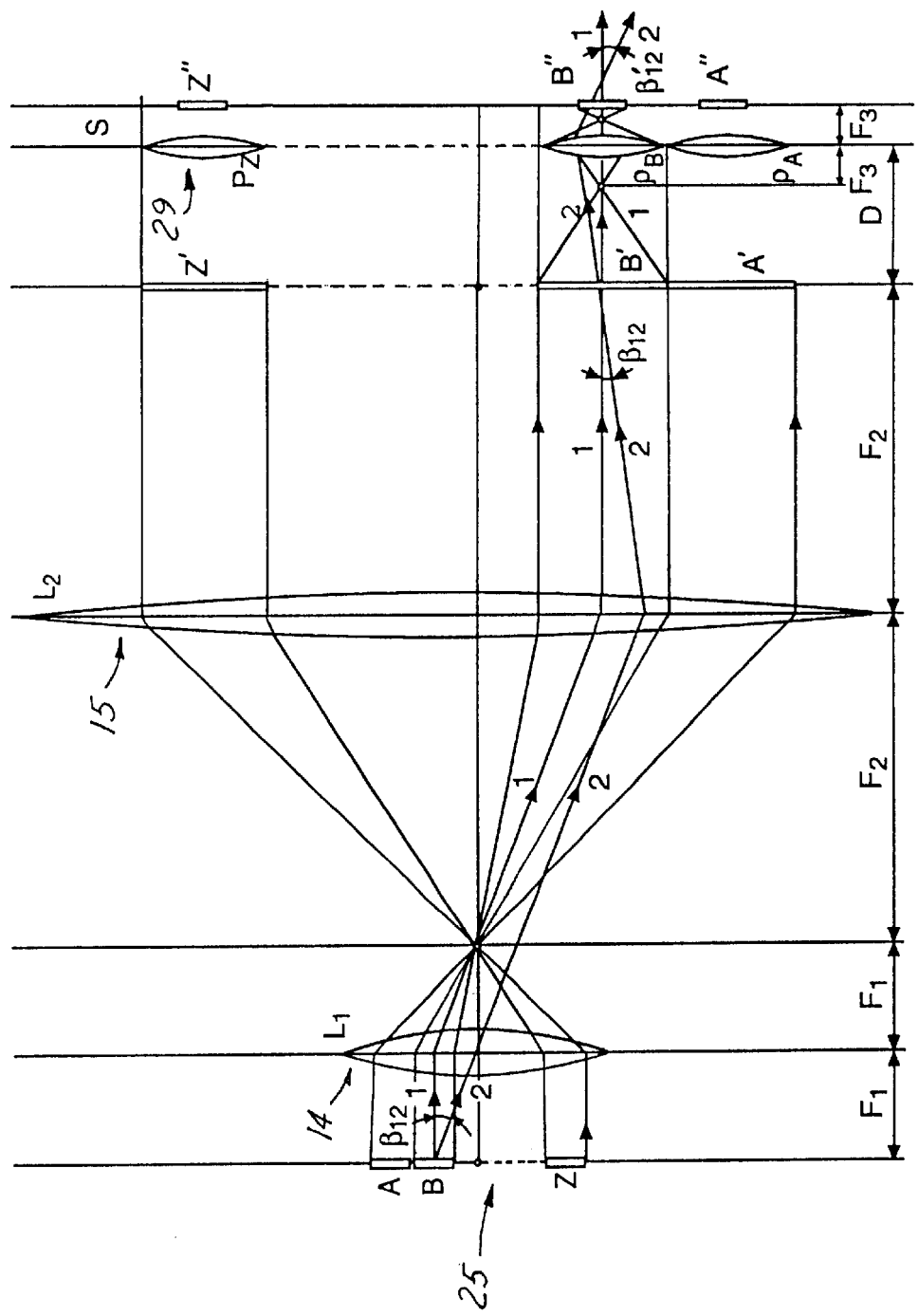
FIG. 16 is another schematic diagram showing additional optical system details associated with FIG. 13.

It is useful here to describe additional details of the invention, namely details associated with the optical system aspects of a presently preferred embodiment of the invention. This embodiment incorporates the modified digital micromirror device (FIGS. 5–8). It is important to remember that each individual pixel corresponds to a set of N micromirrors in the modified micromirror device, and N=4 in the presently preferred embodiment. Note that those components integrally associated with the digital micromirror device itself (including for example the light source, sink, condensers, color filter wheel, zoom projection lens and other components) are not shown or referred to in the following description. With reference then to FIG. 13, $L_1$, 14, and $L_2$, 15, are two lenses arranged in an afocal configuration, i.e., $L_1$ (having focal length $f_1$) has its second focus coinciding with the first focus of $L_2$ (having focal length $f_2$). Such a configuration has the important property that an input ray parallel to the (common) axis of the lenses is again parallel to the axis when it emerges as an output ray. Another property of this afocal configuration is that if an object is placed in the first focal plane of $L_1$, then its image is formed in the second focal plane of $L_2$, and the magnification, q, is given by $q = f_2/f_1$ (as shown schematically in FIG. 14). With additional reference to FIG. 15, let A, B, . . . , Z represent arbitrary pixels on the modified digital micromirror device 25. As shown in FIG. 15, a magnified image represented by A', B', . . . , Z' is formed in the second focal plane of $L_2$, 15. In a presently preferred embodiment of the invention, q=100 (with $f_1$=1 cm and $f_2$=100 cm). (Notice that $L_1$, 14, must be sufficiently large so as to accept almost all light rays coming form the modified digital micromirror device 25.) A pixel such as A, which is 34 microns in dimension in the modified digital micromirror device and comprised of N=4 individual micromirrors in the presently preferred embodiment, will be magnified as A', to 34 microns×100=3.4 mm. As an additional point to note, there is a general rule for optical systems in air, namely that in obtaining a linear magnification, q, the angular "magnification" (that is, the ratio $\alpha'/\alpha$, where $\alpha$ is the angle between two rays outcoming from a given point of an object, and $\alpha'$ is the angle between the corresponding rays in the image, an example of which may be seen by reference to FIG. 14) is $1/q$. In the presently preferred embodiment of the invention, and with additional reference to FIGS. 15 and 16, consider the rays coming for example from B. Note that angle, $\beta_{12}$, between ray 1 and ray 2 is relatively large. At the output, i.e., at B', it can be seen that (i) the direction of (the perpendicular) ray 2 is unchanged (in accordance with the characteristic of an afocal optical system); and (ii) the angle, $\beta_{12}$ between ray 1 and ray 2 at the output pixel, B', is now reduced, i.e., $\beta'_{12} \approx \beta_{12}/q$ ($<<\beta_{12}$). An additional optical component is introduced in this embodiment of the invention which compensates for this angular reduction. With reference to FIG. 16, the optical system of the presently preferred embodiment includes a (transparent) screen S, 29, composed of small lenses $l_A, l_B, \ldots, l_Z$ each 3.4 mm diameter in the present embodiment. Such a screen is well known in the art, and many examples of such lenticular screens are commercially available. One such suitable supplier is the Edmund Scientific Company of Barrington, N.J. Another supplier of such screens is the Lenticular Corporation of Sun Prairie, Wis. It should be understood that each small lens of the screen 29 is in front of each image (e.g., A', B', . . . ,Z') associated to each single pixel (i.e., $l_A$ is in front of A', $l_B$ is in front of B' and proceeding in such fashion for each image associated with each pixel). Note that the distance, D, between the output image and lenticular screen S, 29, must be chosen such that each small lens of S makes an image of the corresponding image pixel with "magnification" 1/q (actually a reduction equal to 1/100 in the presently preferred embodiment). Note also that D must be sufficiently larger than the focal length $f_3$ of the small lenses in the screen 29. In the presently preferred embodiment, D=1 cm. With the above configuration, as shown schematically in FIG. 16, an image seen by an observer looking from an arbitrary position at the right of S is comprised of a set of image points A'',B'', . . . ,Z'' which are related to the original pixels A,B, . . . ,Z, as follows: (i) they are of equal size due to the overall magnification factor being q×1/q=1, but now separated by a significantly larger distance; and (ii) they have equivalent angular characteristics, i.e., the angles between rays coming out from A'', B'', . . . ,Z'' are identical to the angles of the rays coming out of A, B, . . . ,Z (i.e., an angle restriction 1/q due to the afocal system and a second transformation by a factor 1/(1/q)=q due to the small lenses in S). Thus it should be understood that the optical system as herein disclosed has the effect of translating each pixel of the digital micromirror device a finite distance apart in the displayed image (in the presently preferred embodiment the pixels are "moved" approximately 3.4 mm apart, each one keeping the overall 34 $\mu$m size of the original modified micromirror device). It should be understood that the above described embodiment can be constructed so that each small lens in the lenticular screen is associated with each single micromirror, instead of being associated with the N micromirrors of each pixel. In other words, A,B, . . . ,Z are now individual micromirrors. As a consequence, each individual micromirror (16 $\mu$m in size plus 1 $\mu$m of spacing) is now imaged in the displayed image (A'',B'', . . . ,Z'') 1.7 mm apart from the contiguous ones. As a further remark one must consider the fact that the direction of a ray coming out of S may differ from the original direction coming out from the modified micromirror device 25 (as illustrated, for example, by the ray 2 in FIG. 16). Therefore, it must be understood that the driving signals $W_p$ of the display device 25 are adjusted in such a way that the ray directions and intensities of the original scene are reconstructed at the image plane of A'',B'', . . . ,Z'' instead of at the display plane 25. It should therefore be understood that the optical system disclosed herein provides a means for practical viewing of the three-dimensional scene, which is generated using the methods and apparatus disclosed (with respect to the expansion into tesseral harmonics of the original three-dimensional scene and with respect to the determination of the display-excitation electrical-input signals) for driving the display device. Some additional points to be understood with respect to the optical system embodiment are: (i) the light intensity of the final output image can be increased using techniques well known in the art, for example by endowing the screen S with a light intensifying sheet; (ii) the optical axis of the system disclosed herein is single and unique—however, this is not a requirement and the system may be adapted to a variety of configurations using plane mirrors (or prisms acting as high efficiency mirrors)—or some combination of plane and parabolic mirrors—this allows for more flexible placement and geometry associated with the overall three-dimensional display system; and (iii) the analysis has been based largely on the simple "Gaussian theory" of lenses. In practice, optical systems of large aperture are not Gaussian, but that solutions obtained under this assumption can serve as a useful starting point for a more complex optical design; the techniques by which this may be achieved are well known in the art.

Figure 19:
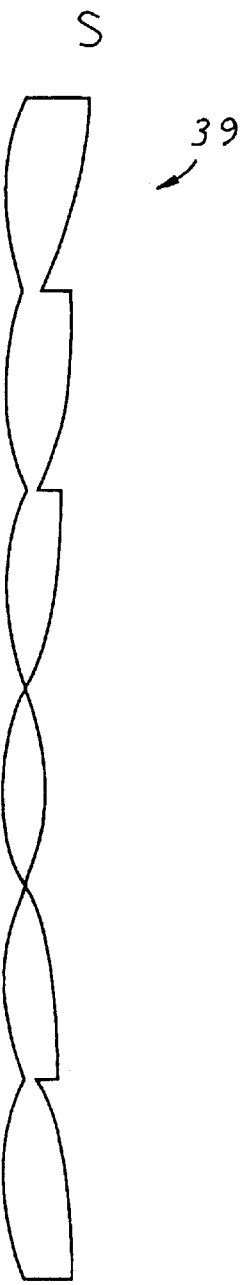
FIG. 19 is another schematic diagram showing additional optical details of the focal optical system shown in FIG. 17.
Figure 18:
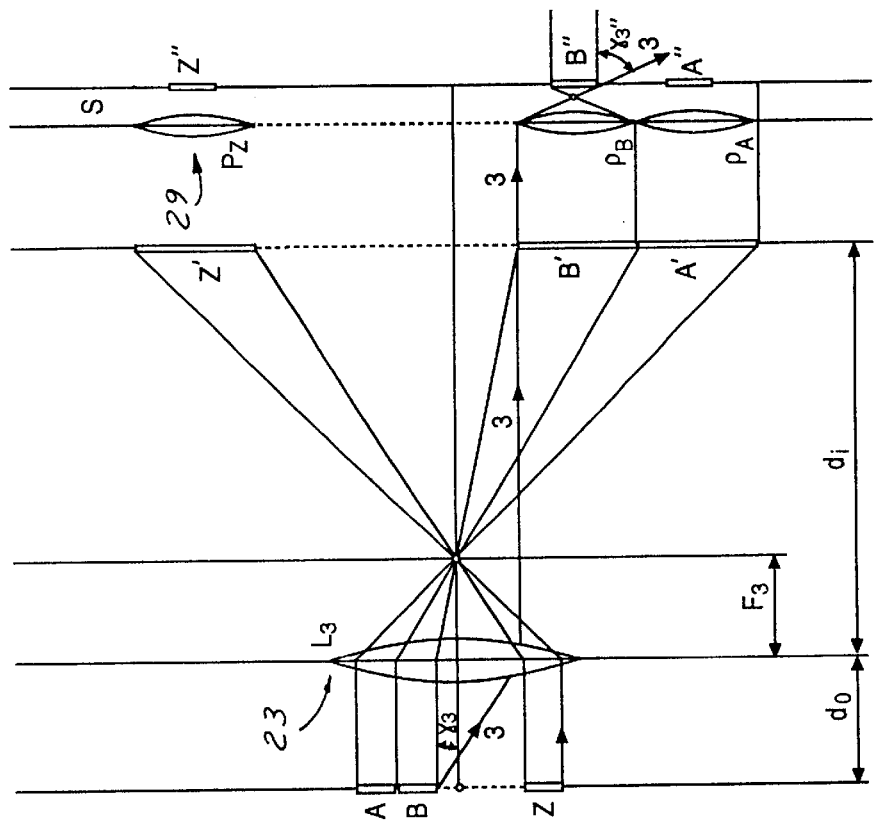
FIG. 18 is another schematic diagram showing additional optical details of the focal optical system shown in FIG. 17.
Figure 17:
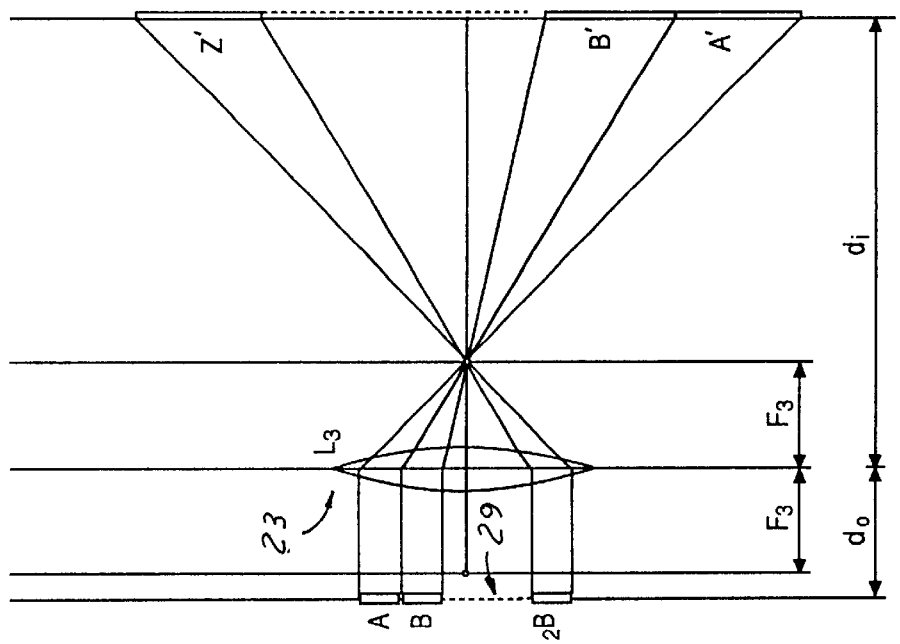
FIG. 17 is a schematic diagram showing a focal optical system embodiment of the present invention.

An alternative embodiment of the invention may use a focal optical system, and is shown in FIGS. 17–19. In this embodiment, and with additional reference to FIG. 17, a single lens $L_3$, 23 is used, in an "overhead projector" arrangement. If the digital micromirrors in A,B, . . . ,Z, (individual micromirrors or N micromirrors of a pixel of the modified digital micromirror device 29) are "near" to the lens focus, then the image A',B', . . . ,Z', is magnified and "far". In this case, the magnification, q, is given by $q=d_i/d_o$, where $1/d_o+1/d_i=1/f_3$, where $f_3$, is the focal length of lens $L_3$ and $d_o$ is the distance between the lens and the modified digital micromirror device. It should be understood that if $d_o \approx f_3$, $d_i$ is very large ($d_i>>f_3$) and hence q>>1. Combining the single lens $L_3$ with a lenticular sheet S, 29, and with additional reference to FIG. 18, the image points A'',B'', . . . ,Z'' represent a magnified image of the modified digital micromirror device. It should be understood that although the relative angular dispersion between light rays is maintained, there is a large absolute angular distortion, e.g., the exit angle $\gamma_3$'' of output ray 3 is much larger than its input angle $\gamma_3$. In order to correct this distortion, each lens of the screen S may be endowed with an optical component which renders output ray 3 parallel to the axis; in the present embodiment, this component may suitably be a small prism, S, 39, as shown in FIG. 19, forming a tapered screen.

Figure 11:
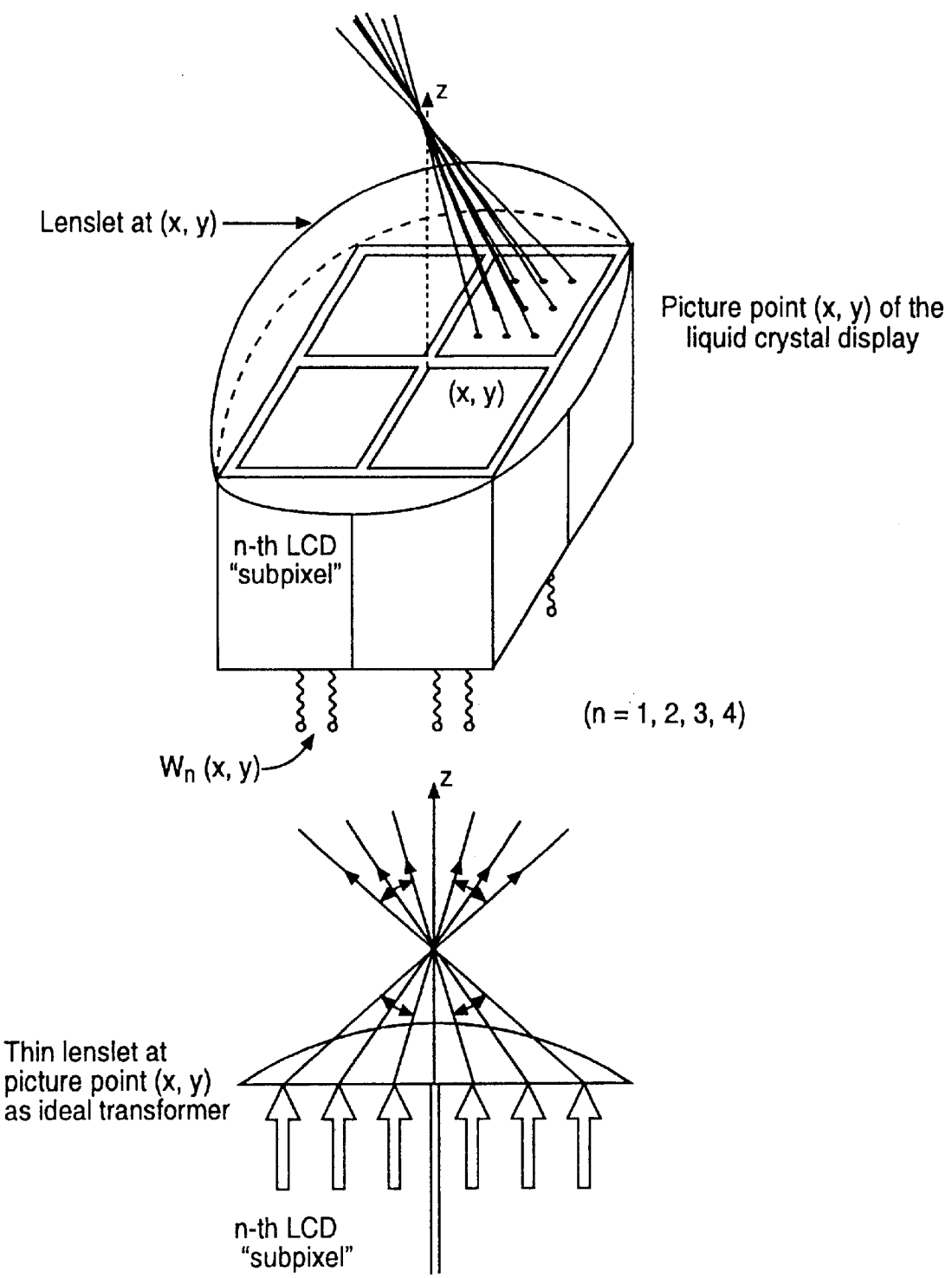
FIG. 11 is a schematic diagram showing another display embodiment, based on a liquid crystal display device.
Figure 20:
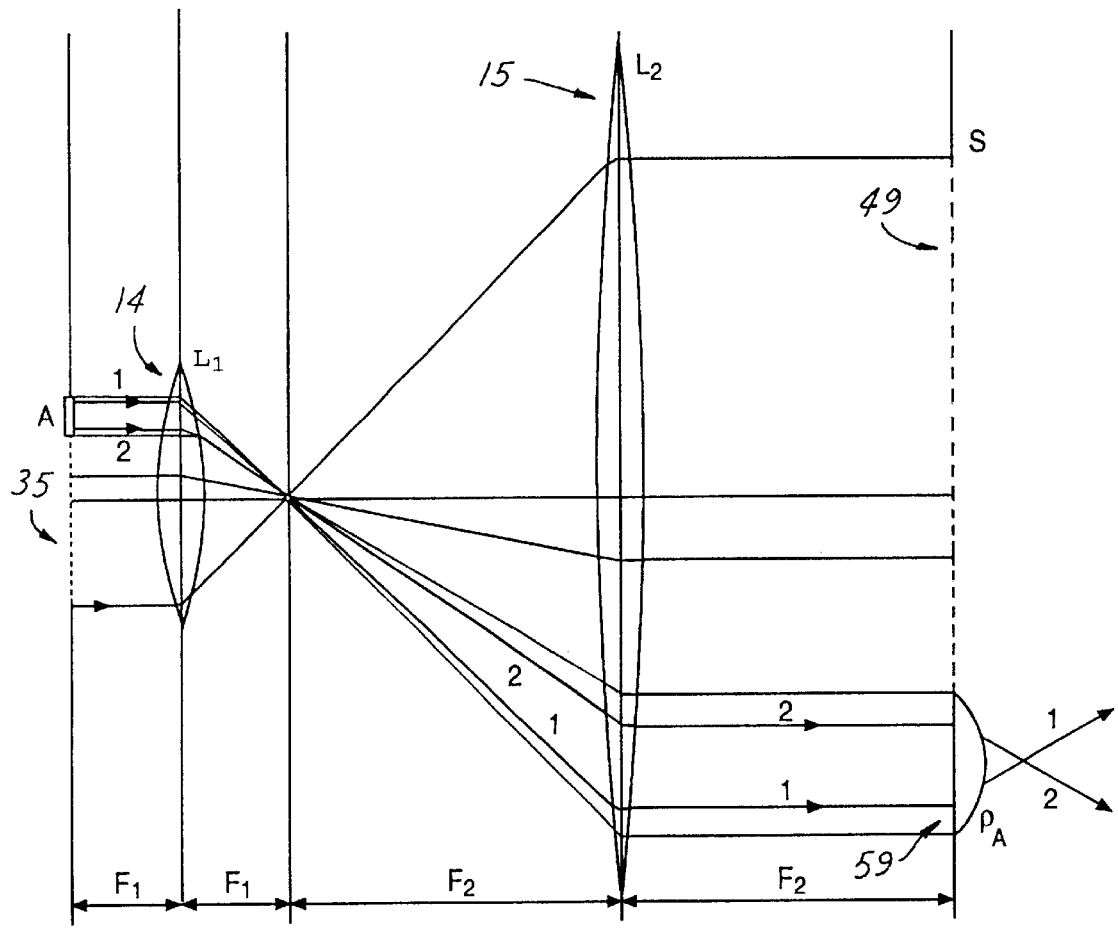
FIG. 20 is a schematic diagram of an alternative embodiment of the invention which utilizes a standard digital micromirror device with an afocal optical system.

Another embodiment of the present invention relies on an afocal optical system as described supra (see FIG. 15) and utilizes a standard (i.e., unmodified) digital micromirror device for producing a three-dimensional image of a three-dimensional scene. In this alternative embodiment, and with additional reference to FIG. 20, a standard digital micromirror device 35 is used in conjunction with an afocal optical system composed of lens $L_1$, 14, and lens $L_2$, 15. Lens $L_1$ is large enough to completely cover the digital micromirror device, which is placed a distance $f_1$ from the lens, where $f_1$ is the focal length of $L_1$. In the present embodiment, a lenticular screen S, 49, is placed at a distance $f_2$ from lens $L_2$, where $f_2$ is the focal length of $L_2$. The screen S consists of a set of lenslets which act as optical transformers. Each lenslet or optical transformer in the screen S, 49, covers each individual pixel in the magnified image, where each pixel corresponds to a set of N micromirrors in the digital micromirror device (in the present embodiment of the invention N=4); this is similar to the embodiments using LCD's or LED's as shown in FIG. 11 and FIG. 12, respectively. It should be understood that the present embodiment utilizes a lenticular screen whose individual lenslets encompass a set of N micromirrors (corresponding to a "pixel" in the display device), so that each optical transformer is used to provide light rays from each pixel in a set of distinct directions, in a manner analogous to that described for the LED and LCD alternative embodiments of the invention (see rays 1 and 2 emitted by two micromirrors of the pixel A in shown in FIG. 20). It should be appreciated that the three-dimensional image of a three-dimensional scene is obtained by driving the digital micromirror device 35 with an appropriate set of display-excitation electrical-input signals, which are determined according to the methods disclosed herein in relationship to the radiance pattern emitted by the screen S, 49, of FIG. 20. Finally, it should be understood in general that the display device includes a suitably adapted set of optical components necessary for viewing the three-dimensional image of the three-dimensional scene. An excellent description of a digital micromirror device may be found in the paper by Peter F. Van Kessel et al., "MEMS-Based Projection Display," in Proceedings of the IEEE, Vol . 86, No. 8, August 1998, pp. 1687–1704, and which is incorporated by reference hereinto. This publication also describes a "digital device engine" which includes a digital micromirror device together with driving and interface electronics for image display.

Figure 21:
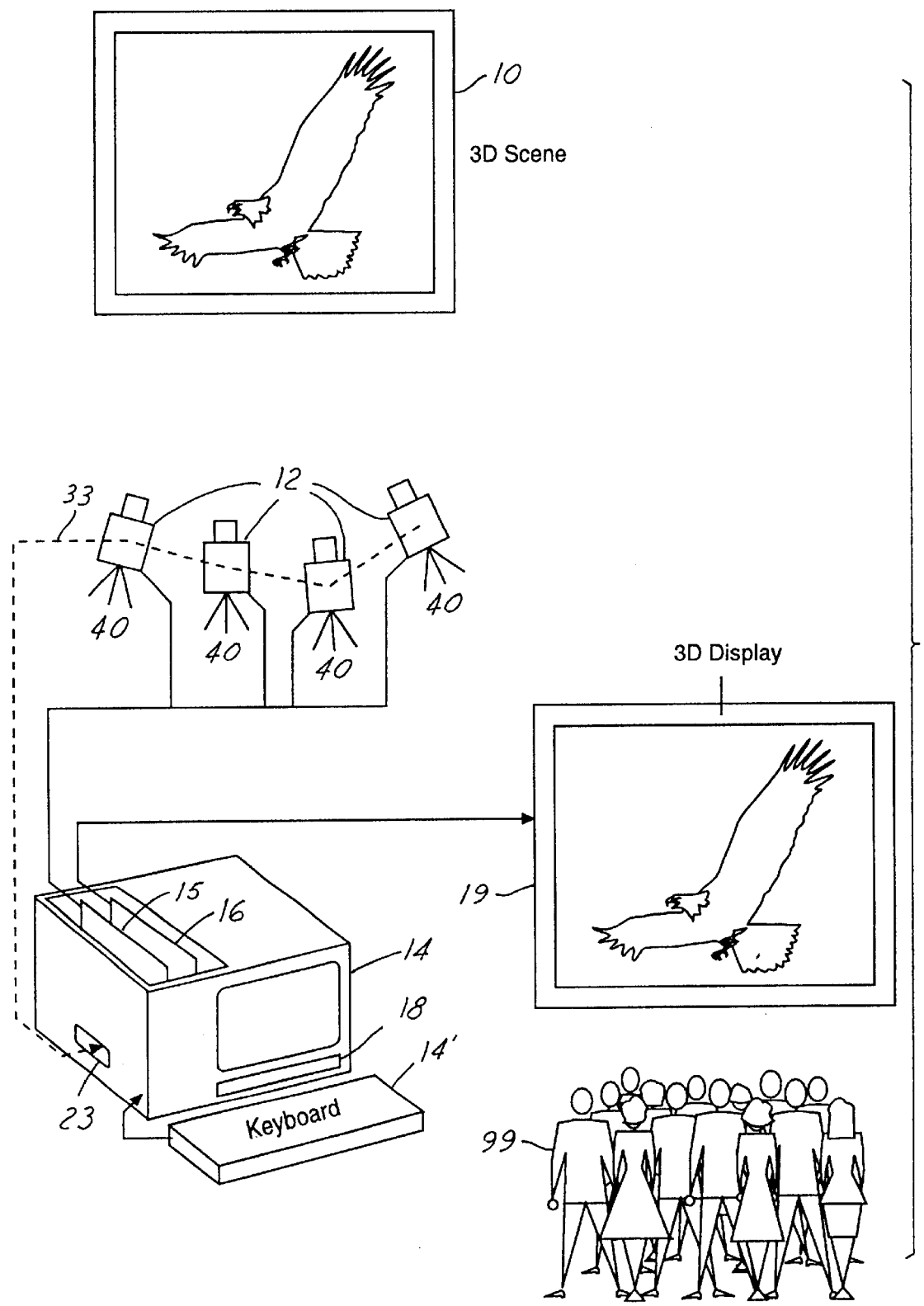
FIG. 21 is a schematic diagram showing another embodiment, similar to that shown in FIG. 1, except that some of the stigmatic cameras are now tilted with respect to the three-dimensional scene.

In another embodiment of the invention, the cameras are not oriented parallel to one another, as shown in FIG. 1. In this alternative embodiment, and as shown in FIG. 21, the cameras are maintained in a set of "tilted" or oblique positions with respect to one another. It may be readily understood that a similar analysis may be carried out with respect to the tesseral harmonic expansions of the scene and display radiances, although the mathematics become somewhat more involved. It is useful to therefore present the exact set of equations associated with this alternative embodiment. It should be further understood that the following mathematical presentation encompasses not only tilted cameras but also the use of either stigmatic cameras (i.e., the standard television camera with its associated "stigmatic" optics) or astigmatic cameras (e.g., sensor or detector arrays). A description of the theory of astigmatic imaging can be found in the book, *Geometrical Optics, An Introduction to Hamilton's Method*, by J. L. Synge, Cambridge University Press, London, England in 1962, on pp. 76–84, and is incorporated by reference hereinto. A reference on visible array detectors, which may be considered to be an embodiment of astigmatic cameras, can be found in the book *Handbook of Optics, Devices, Measurements and Properties, Second Edition, Vol. I*, Michael Bass, Editor-in-Chief, published by McGraw Hill, New York, N.Y., Chapter 22, and is incorporated by reference hereinto.

Figure 22:
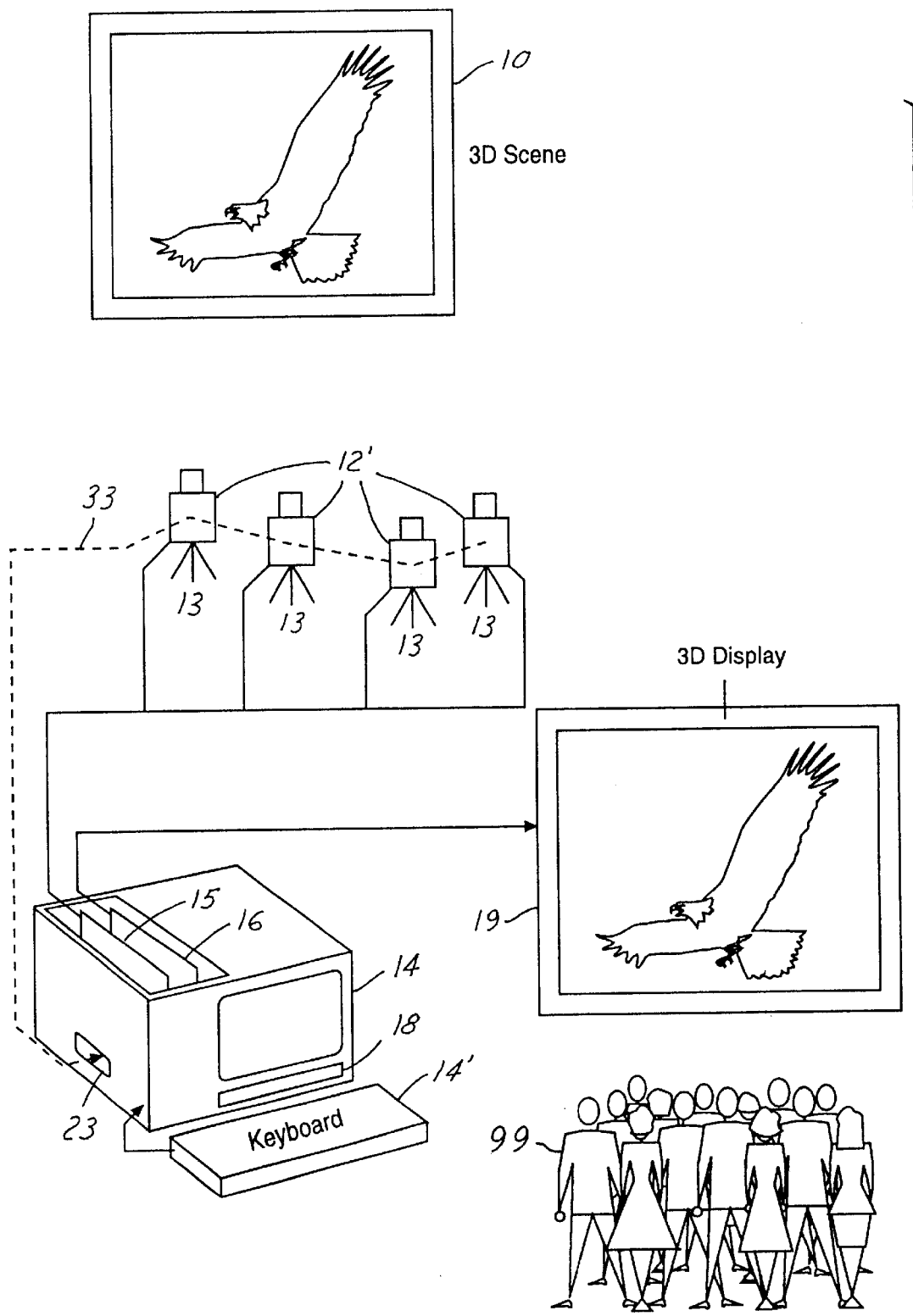
FIG. 22 is a schematic diagram showing another embodiment, similar to that shown in FIG. 1, except that the cameras are astigmatic.
Figure 23:
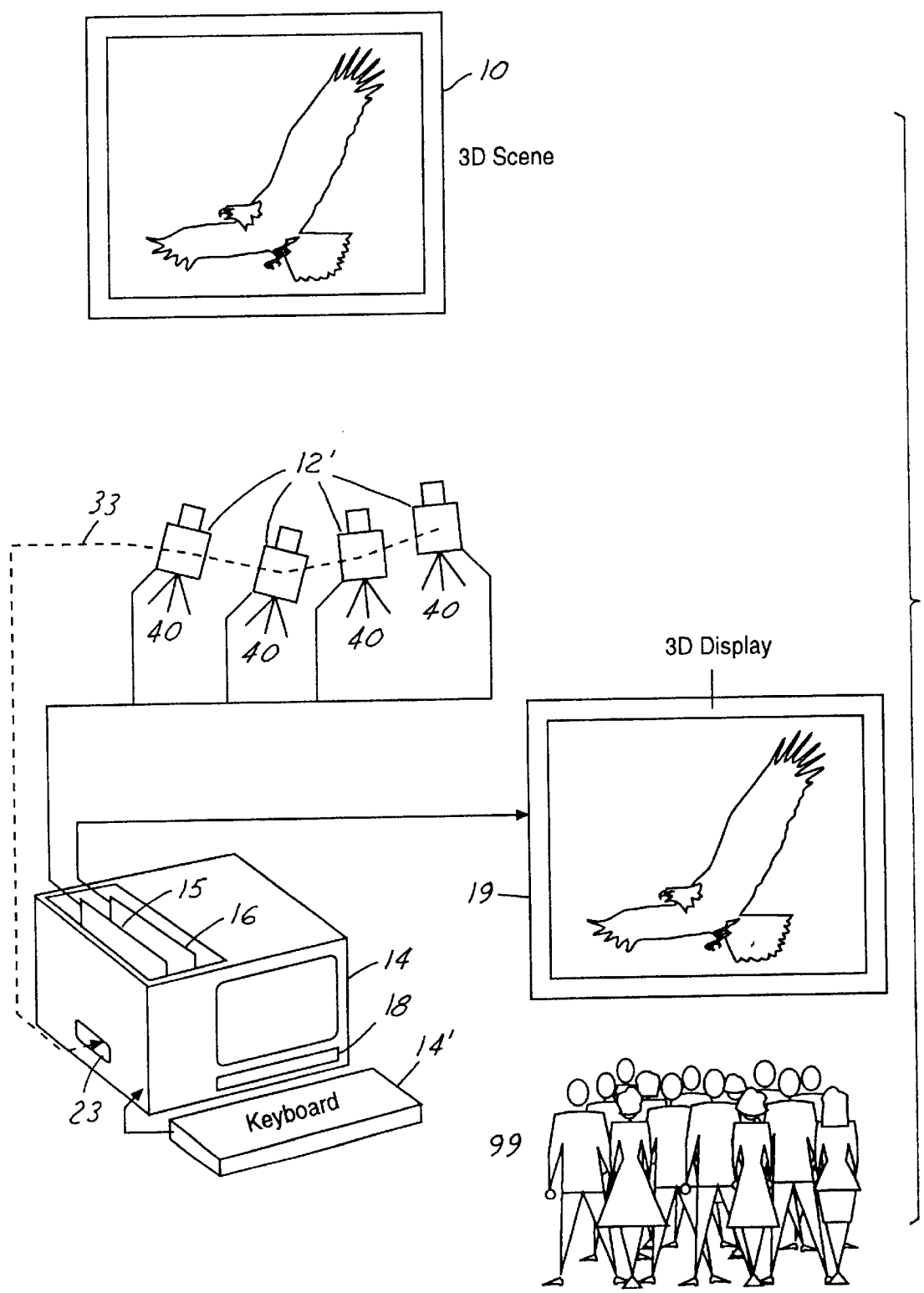
FIG. 23 is a schematic diagram showing another embodiment, similar to that shown in FIG. 1, except that some of the cameras are now tilted with respect to the three-dimensional scene and the cameras are astigmatic.

It should therefore be understood that the present invention may be embodied in a variety of ways, with the currently preferred embodiment including parallel stigmatic cameras 12, as shown in FIG. 1. An alternative embodiment utilizes tilted stigmatic cameras, as shown in FIG. 21, where each camera 12 is mounted on a gimbal 40 having two degrees of freedom. The gimbal allows for convenient positioning of its attached camera. Yet another embodiment of the invention utilizes parallel astigmatic cameras 12', as shown in FIG. 22. A further embodiment utilizes tilted astigmatic cameras, as shown in FIG. 23, where each astigmatic camera 12' is mounted on a gimbal 40.

These alternative embodiments of the invention, and with further reference to FIG. 24, can be described in a comprehensive analytic fashion as follows. As noted earlier, $d_m$ is the distance of the plane conjugate to the detector of camera m from the input principal plane of the optics of camera m. The distance both of the origin of the coordinates of camera m and of the camera m imaging plane itself from the input principal plane of the optics of camera m, is $c_m$. It should be understood that $d_m$, may generally differ from $c_m$, but for a stigmatic camera as used in the presently preferred embodiment, $c_m = d_m$. For an astigmatic camera, $c_m >> d_m$. Let $(x_{0m}, y_{0m}, z_{0m})$ be the offset of the origin of the camera coordinates from the gimbal or tripod center, and $(a_m - x_{0m}, b_m - y_{0m}, z_m)$ be the offset of the center of the gimbal or tripod from the origin of the coordinates of the object space coordinates, where the window is located. With additional reference to FIG. 24, the following matrices are defined:

$$A_m = \begin{bmatrix} 1 & 0 & 0 & a_m - x_{0m} \\ 0 & 1 & 0 & b_m - y_{0m} \\ 0 & 0 & 1 & z_m \\ 0 & 0 & 0 & 1 \end{bmatrix} \quad (26)$$

$$T_m = \begin{bmatrix} \cos\phi_{cm} & -\sin\phi_{cm}\cos\theta_{cm} & \sin\phi_{cm}\sin\theta_{cm} & 0 \\ \sin\phi_{cm} & \cos\phi_{cm}\cos\theta_{cm} & -\cos\phi_{cm}\sin\theta_{cm} & 0 \\ 0 & \sin\theta_{cm} & \cos\theta_{cm} & 0 \\ 0 & 0 & 0 & 1 \end{bmatrix} \quad (27)$$

$$F_m = \begin{bmatrix} 1 & 0 & 0 & x_{0m} \\ 0 & 1 & 0 & y_{0m} \\ 0 & 0 & 1 & z_{0m} + c_m - d_m \\ 0 & 0 & 0 & 1 \end{bmatrix} \quad (28)$$

where the angles $\phi_{cm}$ and $\theta_{cm}$ are the pan and tilt angles of rotation of the $m^{th}$ camera on the gimbal, respectively. These matrices, i.e., Eqs. 26–28 are used for geometrical transformations of the image coordinates, and are described in the reference *Digital Image Processing, 2nd Edition*, by Rafael C. Gonzalez and Paul Wintz, published by Addison-Wesley of Reading, Massachusetts in 1987, pp.36–54, and which is incorporated by reference hereinto. Now by defining the auxiliary coordinate vectors $[x_{m,ij}{}^*, y_{m,ij}{}^*, z_{m,ij}{}^*, 1]^T$ and $[X_m{}^*, Y_m{}^*, Z_m{}^*, 1]^T$, the following relationships hold:

$$\begin{bmatrix} x^*_{m,ij} \\ y^*_{m,ij} \\ z^*_{m,ij} \\ 1 \end{bmatrix} = A_m T_m F_m \begin{bmatrix} x_{m,i} \\ y_{m,j} \\ 0 \\ 1 \end{bmatrix} \quad (29)$$

$$\begin{bmatrix} X^*_m \\ Y^*_m \\ Z^*_m \\ 1 \end{bmatrix} = A_m T_m F_m \begin{bmatrix} X \\ Y \\ d_m \\ 1 \end{bmatrix} \quad (30)$$

Figure 24:
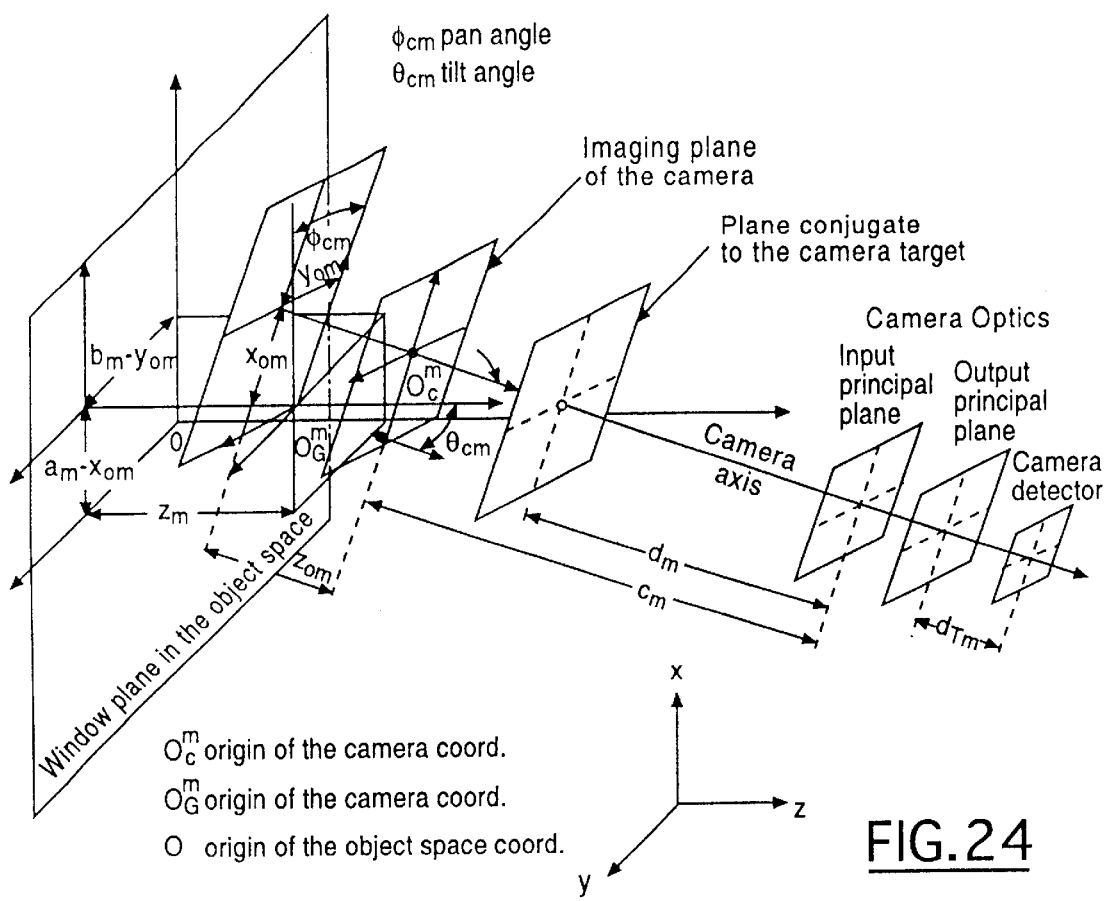
FIG. 24 is a graphical depiction of the coordinates used in the mathematical analysis, similar to FIG. 10, except it is more general and applies to all the embodiments of the present invention.

The superscript (*) labels the values of the coordinates of a given point in the object space, as shown in FIG. 24. In Eq. 29, the double subscripts (ij) occur because each coordinate in the object space depends on both indices i and j, which identify respectively the $x_m$ and $y_m$ axes in the camera coordinates. Then, the expression for the total light power received by pixel (i,j) of the detector of camera m, m=1,2, . . . ,M, can be approximated by:

$$L_m(i,j) = 4d^2\mu_m^2 \int_{-P_x}^{P_x}\int_{-P_y}^{P_y} \sum_{p=1}^{\infty} R_p(x_{m,ij}, y_{m,ij}) K^*_{p,m}(X, Y, i, j) dX dY \quad (31)$$

where

-continued $$K^*_{p,m}(X, Y, i, j) = Y_p(\theta^*_{m,ij}, \phi^*_{m,ij}) \frac{Z^*_m(Z^*_m - z^*_{m,ij})}{r^3_{m,ij} r_{c,m,ij}} \quad (32)$$

$$r^2_{m,ij} = (X^*_m - x_{m,ij})^2 + (Y^*_m - y_{m,ij})^2 + Z^{*2}_m \quad (33)$$

$$r^2_{c,m,ij} = (X^*_m - x^*_{m,ij})^2 + (Y^*_m - y^*_{m,ij})^2 + (Z^*_m - z^*_{m,ij})^2 \quad (34)$$

$$\cos\theta^*_{m,ij} = \frac{Z^*_m}{r_{m,ij}} \quad (35)$$

$$\sin\theta^*_{m,ij} = \frac{\sqrt{(X^*_m - x_{m,ij})^2 + (Y^*_m - y_{m,ij})^2}}{r_{m,ij}} \quad (36)$$

$$\cos\phi^*_{m,ij} = \frac{(X^*_m - x_{m,ij})}{\sqrt{(X^*_m - x_{m,ij})^2 + (Y^*_m - y_{m,ij})^2}} \quad (37)$$

$$\sin\phi^*_{m,ij} = \frac{(Y^*_m - y_{m,ij})}{\sqrt{(X^*_m - x_{m,ij})^2 + (Y^*_m - y_{m,ij})^2}} \quad (38)$$

$$x_{m,ij} = \frac{Z^*_m x^*_{m,ij} - X^*_m z^*_{m,ij}}{Z^*_m - z^*_{m,ij}} \quad (39)$$

$$y_{m,ij} = \frac{Z^*_m y^*_{m,ij} - Y^*_m z^*_{m,ij}}{Z^*_m - z^*_{m,ij}} \quad (40)$$

Eqs. 26–40 are used to solve for the set of display-excitation electrical-input signals, $W_p$, in a manner similar to that used in the presently preferred embodiment described previously in Eq. 3. The solution requires the numerical evaluation of the integral, Eq. 31, and, because of the dependence of the arguments, $x_{m,ij}$ and $y_{m,ij}$ of $R_p$ on the variables of integration, X and Y, in this alternative embodiment(see Eqs. 26–30 and Eqs. 32–40), $R_p$ cannot be removed from inside the double integrals. Hence the numerical solution of Eq. 31 will involve a more complex set of equations compared with the solution to Eq. 3; however the resulting equations remain linear in terms of the solution for $R_p$, and thus the techniques already disclosed herein can be utilized. The integrations in the presently preferred and alternative embodiments of the invention are numerically evaluated using a trapezoidal integration rule, according to the description provided in *Numerical Recipes in Fortran The Art of Scientific Computing 2nd edition*, by William Press et al., Cambridge University Press, Cambridge, England, 1992, Chapter 4, which is included by reference hereinto. It should be further understood that any numerical integration procedure can be utilized, and that any quantitative method and means can be used to solve Eq. 3 and Eq. 31. It should be understood that the solution of Eq. 31 for $R_p$ is to be used in Eq. 24 to solve for the display-excitation electrical-input signals, W(x,y). It should be appreciated, however, that the depth of field available in present cameras allows the tilted stigmatic camera embodiment to be implemented using a mathematical formulation analogous to Eq. 11.

It is also to be understood that certain nonlinear solution techniques can also be utilized for the solution of both Eq. 3 and of Eq. 31, in order to deal more effectively with the effects of noise and nonlinearities and non-ideal natures of the various components used in the present invention. These nonlinear techniques can be understood to include the use of neural networks; see for example the book *Neural Networks A Comprehensive Foundation*, by Simon Haykin, published by IEEE Press, 1994, and incorporated by reference hereinto. In such a variation of the present invention, the outputs of the video cameras serve as inputs to an appropriately configured neural network, whose outputs are themselves the set of display-excitation electrical-input signals. In this alternative embodiment, Eq. 24 is not utilized in evaluating the display-excitation electrical-input signals, but it is to be understood that both linear (as with Eq. 24 and Eq. 25) and nonlinear techniques for evaluating W(x,y) are within the spirit and scope of the present invention. In the present nonlinear embodiment, the neural network is first configured or trained on a set of data (i.e., the "training data set") consisting of known three-dimensional still or dynamic scenes. The neural network serves as a means for encoding the set of two-dimensional views into the set of display-excitation electrical-input signals. It should be understood that the neural network can be implemented in either software or hardware; in a currently preferred embodiment of the invention, a neural network may suitably be implemented in software, using computer 14 in FIG. 1, FIG. 21, FIG. 22 or FIG. 23, respectively. Again, it is to be recognized that the neural network as herein disclosed can be either a linear or nonlinear mapping of the set of two-dimensional views into the display-excitation electrical-input signals. It is to be further recognized that such a linear or a non-linear mapping can be configured a priori or upon identification of a set of parameters contained in the linear or non-linear mapping. Finally, it should be appreciated that the derivation of the display-excitation electrical-input signals in this embodiment is a direct approach, not requiring the explicit expansion of the local radiance in terms of an orthogonal series.

It will be additionally understood that the video cameras shown in FIG. 1, FIG. 21, FIG. 22, and FIG. 23 can in the preferred and alternative embodiments of the present invention be adapted for control and communication of their respective spatial positions and optical settings to the processing computer (indicated by the dashed lines 33 in the respective figures connected to the cameras and serial port 23 of computer 14), thus enabling the use of practical and modern television production techniques. It should also be understood that knowledge of the positions and optical settings of all the cameras used in all of the presently preferred embodiments must be available for solving Eq. 3 or Eq. 31 for the display-excitation electrical-input signals.

It will be seen also that the methods and apparatus disclosed herein encompasses not only monochrome display of three dimensional scenes, but also the display of full color three-dimensional images. In this case, it will be understood that the processing as described herein is applied to each separate color utilized for display. It is to be understood that the camera detector is assumed in the presently preferred embodiments of the invention to absorb light according to Lambert's cosine law. However, any other radiometric characteristic of the detector can be easily incorporated into the present invention through appropriate modifications of Eq. 4 or Eq. 32. It is further to be realized that chromatic aberrations can be addressed using techniques well known in the optical sciences, although the present invention does not make explicit use of these improvements and modifications. An important point to be understood for the disclosed invention is that the displayed three-dimensional image and associated three-dimensional scene need not be of the same size. In particular, by inclusion of an additional magnification factor, similar to $\mu_m$, a complete variety in displayed image sizes, relative to the original three-dimensional scene, can be produced. Similarly, a large range in display device sizes relative to the size of the displayed three-dimensional image as well as to the size of the associated three-dimensional scene should be understood to be achievable with the methods and apparatuses disclosed herein.

Additionally, it should be recognized that all the embodiments and variations of the display device, including for example, micromirrors, LCDs, LED, fiber optics, grating light valve and cathode ray tubes, can be utilized in all the various embodiments as presented in FIG. 1, FIG. 21, FIG. 22 and FIG. 23, and described by Eqs. 26–40. It should also be pointed out that in some alternative embodiments it may be desirable to provide a three-dimensional view for observers with only two degrees of freedom (i.e., x-z or y-z) or only one degree of freedom (x or y or z only). In another variation of the present invention, it should also be understood that the terms used in the tesseral harmonic expansions of Eq. 3 and Eq. 31 need not necessarily be sequentially chosen. For example, the expansion in Eq. 2 can be written as $$R(x, y, \theta, \phi) = \sum_{p=1}^{Q} R_{2p+1}(x, y) Y_{2p+1}(\theta, \phi) \qquad (41)$$

In this case, Q terms in total are used, except that p=3,5,7, ..., 2Q+1 are the only terms used in the expansion. In one alternative variation, the terms in the tesseral harmonic expansion are chosen in order to enhance the quality of the displayed three-dimensional image from a point of view which is coincident with the z-axis. Other choices for terms used in the tesseral harmonic expansion will be understood to provide three-dimensional images of higher quality depending on the relative degrees of freedom allowed for the observer positions.

It should be understood that the respective embodiments and variations of the invention can be implemented using either analog or digital processing techniques and that these techniques can be further understood to include the use of "real-time" signal processors. Thus it is appreciated from the foregoing that the present invention can be utilized for three-dimensional display of both "still" three-dimensional scenes or dynamic three-dimensional(television and video) scenes. It should also be recognized and appreciated that not only can tesseral harmonic functions be used, but that any orthogonal set of functions may be utilized in the expansion of Eq. 2. For example, one such set of functions can be constructed from the set of Tchebychef polynomials. An excellent reference for the theory of orthogonal functions is the book *Orthogonal Functions, Revised English Edition*, by Giovanni Sansone, Dover Publications, Inc., New York, N.Y., in 1991, and which is included by reference hereinto. Another excellent reference on orthogonal functions is the book *Handbook of Mathematical Functions*, M. Abramowitz and I. A. Stegun, Dover Publications, New York, 1965, ninth printing, and which is incorporated by reference hereinto. It should also be noted that not only can any orthogonal function be used but any orthonormal function should be understood to be within the scope of the present invention as well. (Orthonormal functions are also orthogonal functions but are numerically scaled in such a way such that their associated integrals evaluate to one.) As additional points, it is important to understand that the methods disclosed herein may be applied not only to three-dimensional scenes per se as in video or television, but may also find applications in the general field of computer graphics, including virtual reality and head-mounted display systems. These applications can also include volumetric rendering, as in the field of three-dimensional medical imaging and material testing. In such applications, a scalar function $\epsilon(x,y,z)$ is assumed to be given. This scalar function may correspond to any one of a number of material parameters of a physical object or set of objects, including for example, a visco-elastic modulus, an electric permittivity or an absorption coefficient. In order to obtain a three-dimensional (synthesized) scene associated with the scalar function $\epsilon(x,y,z)$, it may be assumed that the center of each voxel (i.e., the center of each volume element of the three-dimensional object) is an isotropic point source which radiates an amount of light power given by $\epsilon(x,y,z)$ in all directions according to Lambert's law. It should be then understood that the methods and apparatuses for three-dimensional display disclosed herein may be applied to the three-dimensional (synthesized) scene associated with the scalar function $\epsilon(x,y,z)$. It should be further understood that an arbitrary one-to-one function may be applied to the scalar function $\epsilon(x,y,z)$ to achieve particular visualization objectives, as for example to obtain a specific contrast level in the produced three-dimensional image. It should also be noted that the three-dimensional (synthesized) scene associated with the scalar function $\epsilon(x,y,z)$ may be considered to be formed under a variety of configurations of light sources, which may or may not be isotropic, for example. Moreover, the three-dimensional (synthesized) scene associated with the scalar function $\epsilon(x,y,z)$ may be considered to be formed by one or more external light sources which are attenuated by the three-dimensional object, whose absorption coefficients at each voxel are assumed to be proportional to the scalar function $\epsilon(x,y,z)$.

It is useful to point out the details for yet another embodiment of the invention, in which the viewers are assumed to have only two degrees of freedom. For example, in a presently preferred embodiment, observers are assumed to "move" only in an "x-z" degree of motion, that is horizontal ("x") and perpendicular ("z") with respect to the display; an autostereoscopic multiviewpoint three-dimensional image in this framework provides for three-dimensional viewing with observers moving in the "x-z space." Additionally, if the observer point of view is moved vertically ("y"), the image does not change (within the limitations of the distortions due to parallax artifacts). This embodiment, in which constraints exist on the degrees of freedom of the observers, can be useful in cases where less costly and simpler implementations are needed. For example, and with further reference to FIG. 25, two video cameras 12 mounted together on a single fixture can be an appealing configuration for the mass consumer market. This arrangement allows, for example, a single individual to acquire all the two-dimensional views necessary (in this case two) for deriving the set of display-excitation electrical-input signals to drive an appropriately adapted display device 59. In the present alternative embodiment, the two cameras are parallel to one another, but it should be understood that other configurations of the cameras can be utilized, as described supra.

In the derivation of the display-excitation electrical-input signals for this alternative embodiment and with additional reference to FIG. 10, it is assumed that the distance $c_m>0$, and that the differences $|X-x_{m,i}|$ and $|Y-y_{m,j}|$ have a positive upper bound, namely $c_0$, such that $|X-x_{m,i}|<c_0$ and $|Y-y_{m,j}|<c_0$, for any $X$, $Y$, $x_{m,i}$ and $y_{m,j}$ (where the definitions of the variables $X$, $Y$, $x_{m,i}$, $y_{m,j}$ and $c_m$ are the same as given supra). Thus it is possible to choose arbitrarily a constant parameter $\zeta$, such that $|X-x_{m,i}|/(\zeta c_m) \leq 1$ and $|Y-y_{m,j}|/(\zeta c_m) \leq 1$, for every $X$, $Y$, $x_{m,i}$, $y_{m,j}$ and $c_m$. It is then possible to characterize any light ray in terms of the auxiliary variables $\psi$ and $\Omega$, defined as follows:

$$\cos\psi = \frac{Y - y_{m,j}}{\zeta c_m} \quad (42)$$

$$\cos\Omega = \frac{X - x_{m,i}}{\zeta c_m} \quad (43)$$

The angles $\psi$ and $\Omega$ vary in the range $[0,\pi]$ and the direction cosines of the light rays can be expressed as:

$$\cos\theta_x = \frac{X - x_{m,i}}{\sqrt{(X - x_{m,i})^2 + (Y - y_{m,j})^2 + c_m^2}} = \frac{\zeta\cos\Omega}{\sqrt{\zeta^2(\cos^2\Omega + \cos^2\psi) + 1}} \quad (44)$$

$$\cos\theta_y = \frac{Y - y_{m,j}}{\sqrt{(X - x_{m,i})^2 + (Y - y_{m,j})^2 + c_m^2}} = \frac{\zeta\cos\psi}{\sqrt{\zeta^2(\cos^2\Omega + \cos^2\psi) + 1}} \quad (45)$$

$$\cos\theta = \frac{c_m}{\sqrt{(X - x_{m,i})^2 + (Y - y_{m,j})^2 + c_m^2}} = \frac{1}{\sqrt{\zeta^2(\cos^2\Omega + \cos^2\psi) + 1}} \quad (46)$$

where $\theta_x$, $\theta_y$ and $\theta$ are the angles between the ray and the x-axis, y-axis and z-axis, respectively. It should be understood that any ray can be identified by means of $\cos\psi$ and $\cos\Omega$. Then the image radiance R at the reference planar window can be expressed as a function of the Legendre polynomials $P_m$:

$$R(x, y, \psi, \Omega) = \sum_{r=0}^{\infty}\sum_{s=0}^{\infty} R_{rs}(x, y) P_r(\cos\psi) P_s(\cos\Omega) \quad (47)$$

It should be appreciated that in this embodiment of the invention an alternative orthonormal set has been utilized in the expansion of Eq. 47, namely, $P_r(\cos\psi)$ and $P_s(\cos\Omega)$, where $P_m(\eta)$, $-1 \leq \eta \leq 1$, are the Legendre polynomials of the first kind. A useful reference for these orthonormal functions can be found in the book *Field Theory Handbook*, by P. Moon and D. Eberle Spencer, published by Springer Verlag in 1961, pages 209–210. The use of $[P_r(\cos\psi) P_s(\cos\Omega)]$ is an alternative to the use of tesseral functions, $Y_n(\theta,\phi)$, and such alternative orthogonal functions can be useful for deriving the display-excitation electrical-input signals, as pointed out supra. It should be further understood that any arbitrary function of $\eta=\cos(\cdot)$ may be expressed as a series of the orthogonal Legendre polynomials of the first kind $P_m[\cos(\cdot)]$. The integral radiance function, $F(x,y,\psi)$ [Wm$^{-1}$], at point $(x,y)$ of the window plane may be expressed as $$F(x, y, \psi) = \quad (48)$$

$$\int_{-P_x}^{+P_x} R(x, y, \psi, \Omega) dX = \sum_{r=0}^{\infty} F_r(x, y) P_r(\cos\psi)$$

where $F_r(x,y)$ is given by $$F_r(x, y) = \sum_{s=0}^{\infty} R_{rs}(x, y) \int_{-P_x}^{+P_x} P_s(\cos\Omega) dX \quad (49)$$

It should be recalled that $2P_x$ and $2P_y$ are the dimensions of the camera pupil at the input principal plane of the camera. It can be shown using suitable approximations that the light power, $L_m(i,j)$, received by pixel $(i,j)$ of camera m is given by $$L_m(i, j) \simeq \sum_{r=0}^{\infty} F_r(x_{m,i} + a_m, y_{m,j} + b_m) H_{mr}^*(\cdots) \quad (50)$$

where $$H_{mr}^*(\cdots) = \quad (51)$$

$$H_{mr}^*(X - x_{m,i}, Y - y_{m,j}, c_m) = 4d^2\mu_m^2 \int_{-P_y}^{P_y} P_r(\cos\psi) \frac{c_m^2}{r_{m,ij}^{*4}} dY$$

and $$r_{m,ij}^{*2} = \frac{1}{2P_x}\int_{-P_x}^{P_x} (X - x_{m,i})^2 dX + (Y - y_{m,j})^2 + c_m^2 \quad (52)$$

Carrying out the shift by $\alpha_m$ and $\beta_m$ as given by Eqs. 13 and 14 leads to:

$$L_m(i - \alpha_m, j - \beta_m) = \sum_{r=0}^{\infty} F_r(i, j) H_{mr}(i, j) \quad (53)$$

where $$H_{mr}(i, j) = 4d^2\mu_m^2 \int_{-P_y}^{P_y} P_r(\cos\psi) \frac{c_m^2}{r_{m,(i-\alpha_m),(j-\beta_m)}^{*4}} dY \quad (54)$$

and $$\cos\psi = \frac{Y - y_{m,j-\beta_m}}{\zeta c_m} \quad (55)$$

It should be understood that the parameters $H_{mr}$ play the same role as the $G_{mp}$ in Eq. 12. Note also that $F_r(i,j)$ represents $F_r(2di\mu_m, 2dj\mu_m)$. If the summation in Eq. 52 is truncated at N terms (i.e., r=0,1,2, , , , , N−1), it can be expressed as $$L = HF \quad (56)$$

where L, H and F are N×1, N×N and N×1 matrices, respectively. In analogy to Eq. 16, H can be inverted to obtain $$F = H^{-1}L \quad (57)$$

In an analogous derivation as disclosed supra for the display-excitation electrical-input signals (see Eqs. 17–25), we can express the integral radiance function, $A(x,y,\psi)$ [Wm$^{-1}$] as:

$$A(x, y, \psi) = \int_{-P_x}^{P_x} D(x, y, \psi, \Omega) dX \quad (58)$$

and $$A(x, y, \psi) = \sum_{p=1}^{N} W_p(x, y) C_p(\psi) \qquad (59)$$

where $$C_p(\psi) = \sum_{q=0}^{\infty} c_{qp} P_q(\cos\psi) \qquad (60)$$

By letting $$A_q(x, y) = \sum_{p=1}^{N} c_{qp} W_p(x, y) \qquad (61)$$

the integral radiance function of the display may be expressed as $$A = \sum_{q=0}^{\infty} A_q(x, y) P_q(\cos\psi) \qquad (62)$$

It is natural to consider only a finite set N of $P^q$ polynomials so that $$A = \sum_{q=0}^{N-1} A_q P_q \qquad (63)$$

and to identify the Aq with the $F_P$. In matrix form, this becomes:

$$A = CW \qquad (64)$$

where A, C and W are N×1, N×N and N×1 matrices, respectively. In analogy to Eq. 25, the following equation may be written:

$$W = [HC]^{-1} L \qquad (65)$$

Eq. 65 should therefore be understood to represent the display-excitation electrical-input signals for this alternative embodiment of the invention. It should also be understood that all the variations disclosed herein may be applied to the present embodiment. For example, it should be appreciated that Q≧N orthogonal polynomials can be used in the solution of Eq. 65.

It should be further understood that the invention as described herein can include a reflecting screen onto which the three-dimensional image is projected by the display device and its associated optical system. In this alternative embodiment, the display device can be understood to include not only the associated optical system but the reflecting screen as well. It should be understood that the optical system is designed to establish a one-to-one correspondence between the pixels of the display and the pixels of the reflecting screen (that is, it operates as a stigmatic optical system). In this alternative embodiment, the reflecting screen is a planar surface coated with a suitable set of layers, characterized by its specific reflectance intensity, $\rho_s(\theta_s,\phi_s,\theta,\phi,)$ The screen reflectance, $\rho_s(\theta_s,\phi_s,\theta,\phi)$, gives the reflected portion of the light incident intensity (flux density) at any point of the screen along the direction $(\theta_s,\phi_s)$, which is reflected in the direction $(\theta,\phi)$. Note that the screen is in the (x,y) plane, $(\theta_s,\phi_s)$ are the spherical coordinate angles (referred to the z-axis orthogonal to the plane) of the direction of an incident ray, and $(\theta,\phi)$ are the spherical coordinate angles of the direction of a reflected ray. The reflecting properties of the screen are such that the pattern of reflected light at each point depends on the direction of the incident light. The display-excitation electrical-input signals can be derived in an exactly analogous fashion as described supra for the embodiments of the invention which do not incorporate a reflecting screen. This is accomplished using an expansion into spherical harmonics of the screen reflectance intensity, $\rho_s(\theta_s,\phi_s,\theta,\phi)$:

$$\rho_s(\theta_s, \phi_s, \theta, \phi) = \sum_r \sum_q \rho_{rq} Y_r(\theta_s, \phi_s) Y_q(\theta, \phi) \qquad (66)$$

The display-excitation electrical-input signals, W, are then expressed by $$W = (G\Sigma)^{-1} L \qquad (67)$$

Eq. 67 is identical in form to Eq. 25, with S in Eq. 25 replaced by Σ in Eq. 67. The computation of Σ, which incorporates the screen reflectance intensity, $\rho_s(\theta_s,\phi_s,\theta,\phi)$, is straightforward from the descriptions contained supra. It should therefore be appreciated that the invention disclosed herein includes production of a three-dimensional image on a reflecting screen.

It should be understood that the disclosed invention has applications not only in 3D display of 3D scenes, but also in computer graphics as well. Although this has already been pointed out supra, it is worthwhile to provide a more detailed description of the invention specifically for this application. In one alternative embodiment, the functions $R_p(i,j)$, p=1, . . . , N, for each pixel i,j, as given for example in Eq. 11, are assumed to be known. Then, any planar view, m, of the original 3D scene can be reconstructed using the "forward solution," as given by Eq. 11, repeated here:

$$L_m(i - \alpha_m, j - \beta_m) = \sum_{p=1}^{N} R_p(i, j) G_{mp}(i, j) \qquad (11)$$

In this equation, $L_m$, is one pixel of the particular planar view (i.e., the $m^{th}$ view) desired of the 3D scene, while $G_{mp}$ represents a set of functions which are independent of the original 3D scene itself and thus can be computed a priori. The $G_{mp}$ are given by Eqs. 12–14, and include the specific position from which it is desired to view the 3D scene. Eq. 11 must be repeated for each pixel i,j, of the desired view. In a presently preferred embodiment, i=1, . . . ,480, and j=1, . . . , 512. Thus it should be understood that the entire 3D scene, i.e., the entire set of graphical information of the original scene, is represented by the set of data, {$R_p$,(i,j), p=1, . . . , N, i=1, . . . ,I, j=1, . . . ,J}, where I and J are the number of pixels in each view in the x and y directions, respectively. Thus the invention in this embodiment should be understood to be both an efficient method by which to store the original 3D data by means of the N functions $R_p(i,j)$, and also as a method to efficiently display it in any arbitrary or set of arbitrary (2D) views. The invention may thus be considered as an efficient method and apparatus to perform 3D image interpolation and extrapolation. As an alternative and yet additional embodiment of the invention for computer graphics display, a set of planar views of a 3D scene is given. In this embodiment, the functions $R_p(i,j)$, p=1, . . . , N, for each pixel i,j, are evaluated using Eq. 11 where the M functions (i.e., views), $L_m(i-\alpha_m, j-\beta_m)$, are given. Then, any planar view of the original 3D scene can be reconstructed using the "forward solution" again, as given by Eq. 11. In this case the extrapolated or interpolated view or set of views is evaluated or computed using appropriate values in Eqs. 12–14, as required for the chosen view(s), according to the methods disclosed herein.

The previous embodiment for graphical display of a 3D scene utilized the set of equations (Eqs. 11–15) in which the cameras (i.e., 2D views) were assumed to be parallel to one another and their optical axes all normal to the planar window. In yet another alternative embodiment of the invention for application to computer graphics, the set of equations corresponding to tilted cameras is used, i.e., the cameras or 2D views are not necessarily parallel to one another nor are their optical axes all normal to the planar window. In this embodiment, the pixel value of a tilted 2D view, $L_m(i,j)$, is provided by Eq. 31, also repeated here for convenience:

$$L_m(i,j) = 4d^2 \mu_m^2 \int_{-P_x}^{P_x} \int_{-P_y}^{P_y} \sum_{p=1}^{\infty} R_p(x_{m,ij}, y_{m,ij}) \quad (31)$$
$$K_{p,m}^*(X, Y, i, j) dX dY$$

where the $K^*_{p,m}$ are given by Eq. 32, and are related to the orthogonal functions selected. In this alternative embodiment, the orthogonal functions used are the tesseral harmonic functions, but it should be understood that any set of orthogonal or orthonormal functions can be utilized. It is also to be understood that in contrast to the 2D views provided by Eq. 15, the 2D views provided by Eq. 31 are oriented in essentially any arbitrary direction. Thus, this embodiment of the invention may also be understood to be both an efficient method to store the original set of 3D data (i.e., the set of data corresponding to the original 3D scene) and also as a method to efficiently display it in any arbitrary 2D view or set of arbitrary 2D views. The invention also may thus be considered as an efficient method and apparatus to perform 3D image interpolation and extrapolation. In the present embodiment, it is assumed that the functions $R_p(i,j)$, $p=1, \ldots, N$, for each pixel i,j, are known. In yet an additional alternative embodiment, the functions $R_p(i,j)$, $p=1, \ldots, N$, for each pixel, i,j, are evaluated or computed using a set of tilted planar views, using Eqs. 26–40. Then, any tilted planar view or set of tilted views, of the original 3D scene, can be reconstructed using the "forward solution," as given by Eq. 31. In this case the extrapolated or interpolated tilted view or set of tilted views is evaluated or computed using appropriate values in Eqs. 26–40, as required for the chosen view(s), according to the methods disclosed herein.

As a further alternative embodiment of the invention, it should be appreciated that the original 3D data and the associated set of 2D views may be generated by computer software. For example, a three-dimensional scene can be represented in a computer using various software packages. In one alternative embodiment, a 3D scene is represented as a "DxF" file. The DXF file is a standard format often used in the computer graphics community, and has been popularized by the software package "AutoCAD," which is available from Autodesk, Inc., located in San Rafael, Calif. In this embodiment utilizing computer software, the distribution of light from the (simulated) 3D scene may be suitably evaluated or computed using another software package, Lightscape, available from Lightscape Technologies, Inc., located in Montreal, Quebec, Canada. This software provides the ability to simulate on a computer the complete distribution of light (i.e., radiance) at any arbitrary position. In the present embodiment, a set of M 2D views is most suitably computed using a 3D scene simulated with AutoCAD and Lightscape, although it should be appreciated that any appropriate computer software and any graphics files formats may be utilized. It should be also understood that these 2D views serve exactly the same purpose as the views which may be acquired with actual imaging hardware, e.g., video or still cameras, according to the methods disclosed herein. Thus, in this alternative embodiment, 3D display of a (simulated) 3D scene is based on the 2D views acquired not from cameras or other hardware but from data simulated entirely with software. Thus, it should therefore be understood, that all the methods and apparatuses disclosed herein can be utilized with simulated 2D views, including for 3D display and computer graphics applications.

As yet a further embodiment of the invention, computer software is used to produce the entire local radiance function, $R(x,y,\theta,\phi)$, in units of watts per square meter per steradian solid angle $(Wm^{-2}sr^{-1})$, at the reference planar window, corresponding to a (simulated) 3D scene. In a presently preferred embodiment, the software 3D Studio (Autodesk, Inc., San Rafael, Calif. is used to produce a simulated 3D scene, and Lightscape (Lightscape Technologies, Inc., Montreal, Quebec, Canada) software is most suitably used to generate the associated local radiance function R, although it should be understood that any software implementations can be utilized. In this present embodiment of the invention, the decomposition of the radiance function R in terms of the functions, $R_p$, is achieved directly, using Eq. 2, without the use of the pixel intensity expression, Eq. 3. To achieve this, both sides of Eq. 2 are multiplied by $Y_q(\theta,\phi)\sin\phi$, and then integrated with respect to $\theta$ and $\phi$:

$$\int_0^{2\pi} \int_0^\pi R(x, y, \theta, \phi) Y_p(\theta, \phi) \sin\theta \, d\theta \, d\phi = \quad (70)$$
$$\int_0^{2\pi} \int_0^\pi \sum_{p=1}^{\infty} R_p(x, y) Y_p(\theta, \phi) Y_q(\theta, \phi) \sin\theta \, d\theta \, d\phi$$

Because of the orthogonality of the functions $Y_p(\theta,\phi)$, Eq. 70 reduces to:

$$R_q(x, y) = \frac{1}{c_q} \int_0^{2\pi} \int_0^\pi R(x, y, \theta, \phi) Y_q(\theta, \phi) \sin\theta \, d\theta \, d\phi \quad (71)$$

In Eq. 71, $c_q$ are (normalizing) constants related to the specific choice of orthogonal functions used and do not depend in any way on the image data itself:

$$c_q = \int_0^{2\pi} \int_0^\pi Y_q^2(\theta, \phi) \sin\theta \, d\theta \, d\phi \quad (72)$$

In the present embodiment, the values of $c_q$ can be found in the book *Electromagnetic Theory* by Julius Adams Stratton, published in New York by McGraw Hill in 1941 and included by reference hereinto, viz., see Eq. (19) on p. 403. It should be understood that although the constants $c_q$ are indexed by a single parameter (e.g., "q"), the tesseral harmonics used in the present embodiment contain two indices (in the book by Stratton, these are indicated by "n" and "m," where n is an integer $\geq$ and m is any integer such that $|m| \leq n$).

Figure 26:
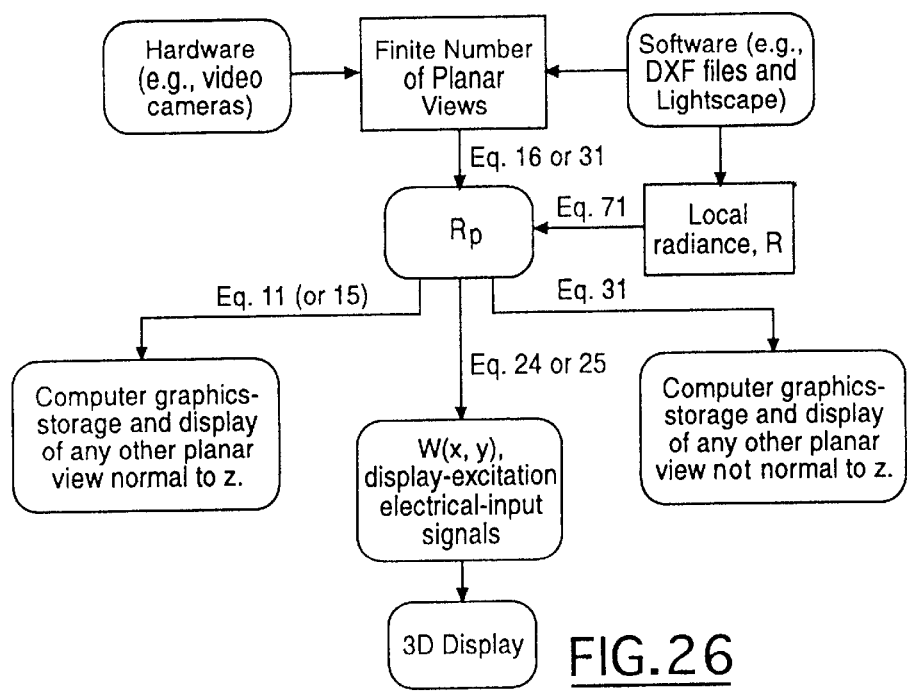
FIG. 26 is a diagrammatic flowgraph illustrating the various hardware and software embodiments of the present invention.
Figure 25:
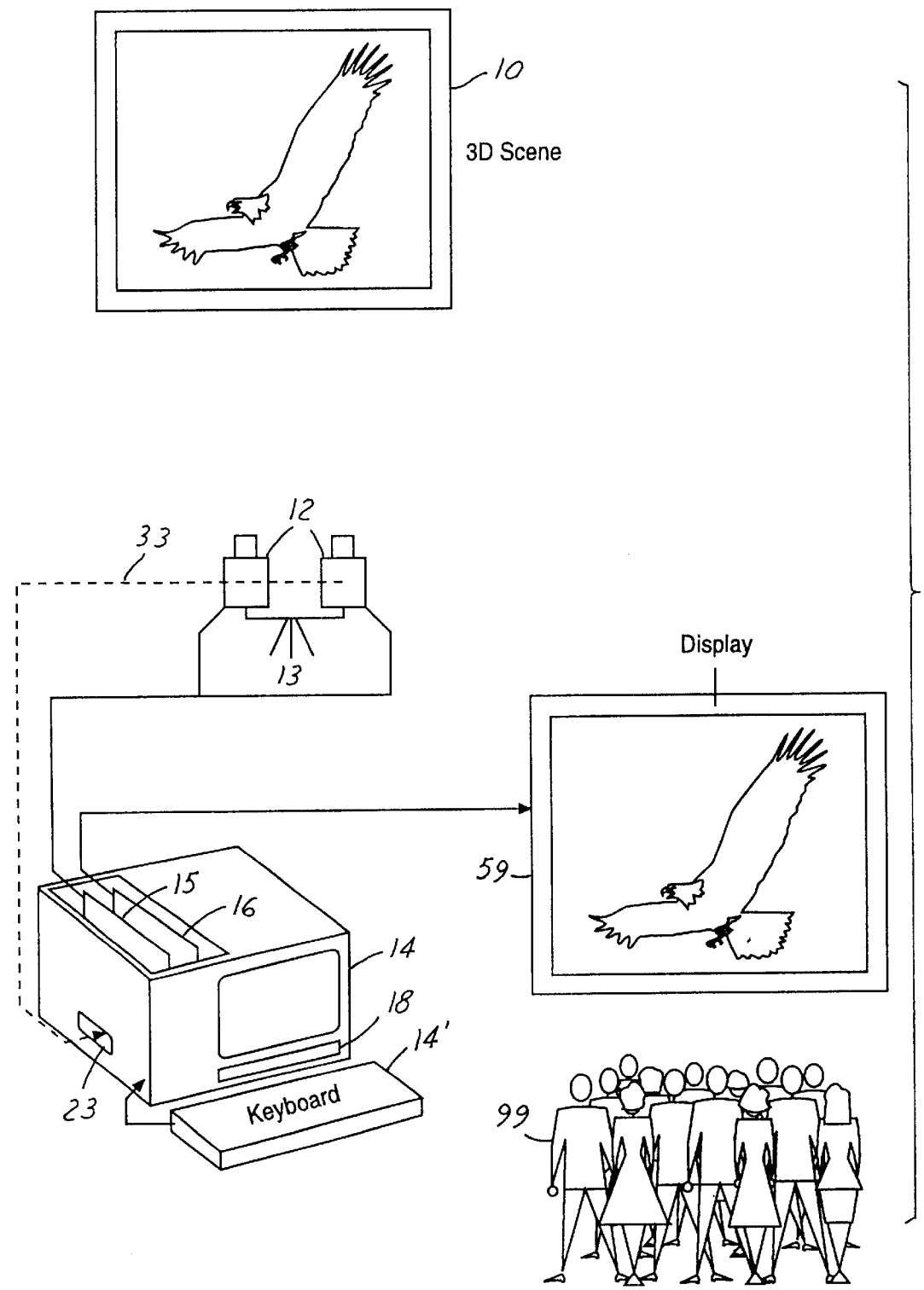
FIG. 25 is a schematic diagram showing another embodiment with two video cameras.

It should be recognized that any set of orthogonal (or orthonormal) functions can be utilized in the various embodiments of the present invention, including in 3D display (as in video and television) or in computer graphics generally, and the use in the present embodiment of tesseral harmonic functions, should not be construed as limiting in any way. It should be appreciated though that any particular choice of orthogonal (or orthonormal) functions will generally have associated with it a specific association of indices. In the presently described embodiment, the evaluated coefficient functions, $R_p$, can be utilized with any of the 3D display or computer graphics embodiments of the invention, disclosed herein. It should be appreciated that the coefficient functions, $R_p$, may be referred to as functions, $R_p$, or simply, $R_p$; no distinction is intended between them in this disclosure. Finally, it should thus be appreciated that computer software and the data generated therefrom can be used to evaluate the local radiance function, R, the functions, $\{R_p\}$, and/or the parallel or tilted 2D view(s), $\{L_m(i,j)\}$. FIG. 26 displays a diagrammatic flowgraph illustrating the various hardware and software embodiments disclosed of the present invention.

It is useful to describe several additional alternative embodiments of the display means which is connected for response to the set of display-excitation electrical-input signals. As already pointed out supra, the 3D display of a 3D scene is achieved by controlling the radiance pattern of each pixel of the 3D display. In the presently preferred embodiments of the invention, it should be understood that control of the radiance patterns of each pixel is most suitably achieved through control of the intensities of a set of "sub-pixels" of which each pixel is comprised. It should be further understood that the control of the radiance patterns of each pixel is most suitably achieved through use of specialized optics adapted for distributing the light in a suitable manner, but the invention should be considered to include any display means by which the radiance pattern of each pixel may be controlled. It is to be appreciated that the specialized optics used in the various embodiments of the present invention may generally be considered to include a "light phase encoder." Such a light phase encoder serves as a means to deflect incoming rays of light in a specified direction or set of specified directions, in order to achieve a desired radiance pattern. In some of the embodiments disclosed herein, the light phase encoding is obtained by means of an array of lenslets, with each lenslet covering a pixel, i.e., the ensemble of its associated sub-pixels. In other embodiments, the light phase encoding is achieved with prisms. It should be understood that light phase encoding can be realized in a number of ways, for example with refraction-index-gradient sheets, prisms, or lenses, or even holographically, and that the present invention can be realized with any suitable light phase encoding means.

Figure 27:
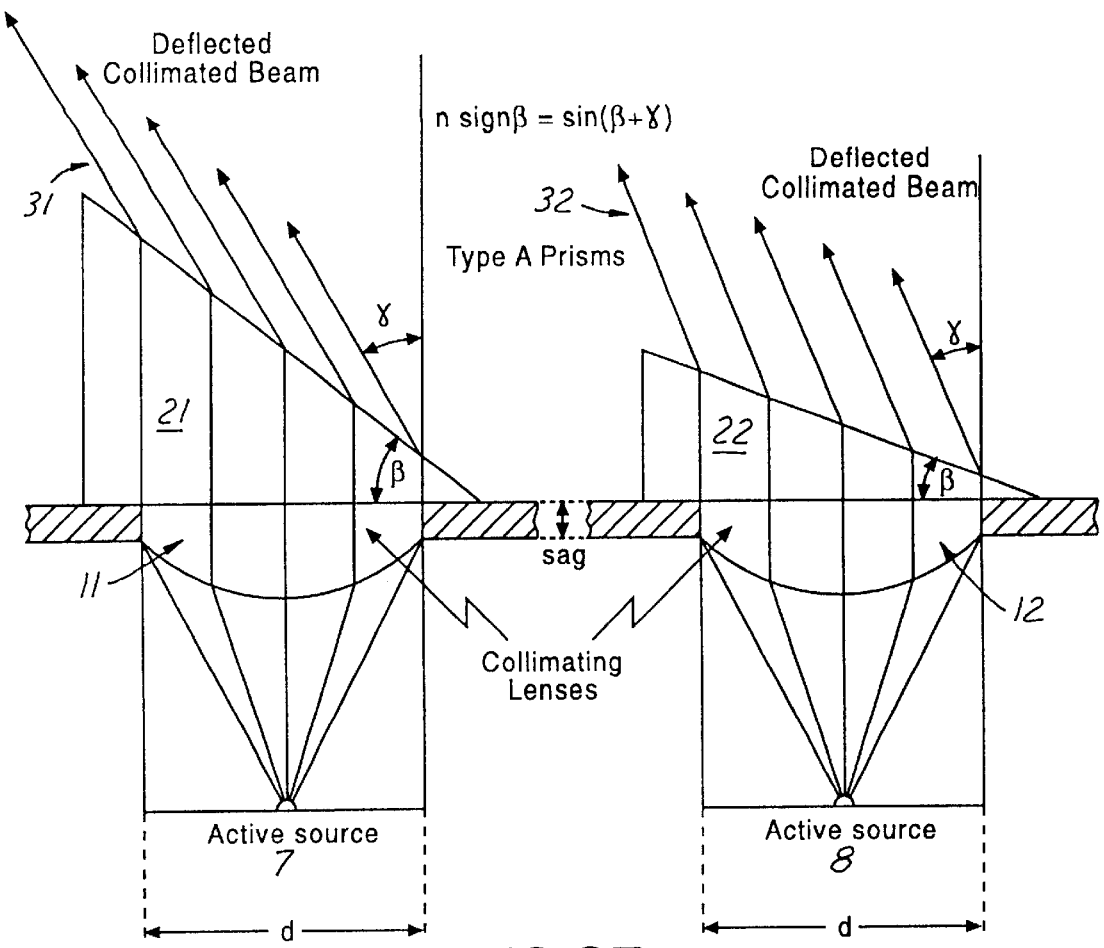
FIG. 27 is a schematic illustration of a portion of the display means for one alternative embodiment of the invention, showing a light phase encoder in the form of prisms and collimating lenslets.
Figure 28:
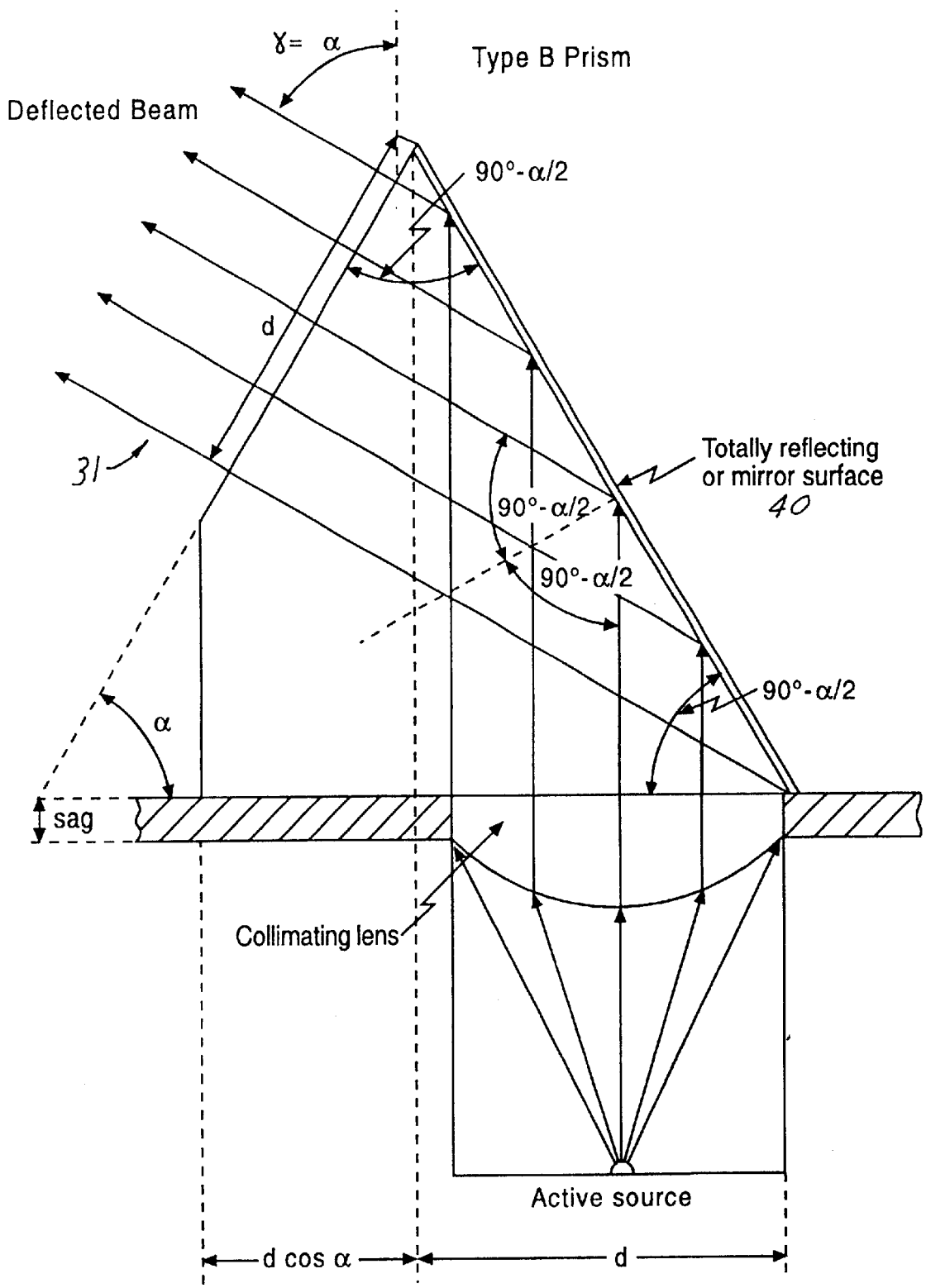
FIG. 28 is a schematic illustration of a portion of the display means for one alternative embodiment of the invention, showing a light phase encoder in the form of a prism and collimating lenslet.
Figure 29:
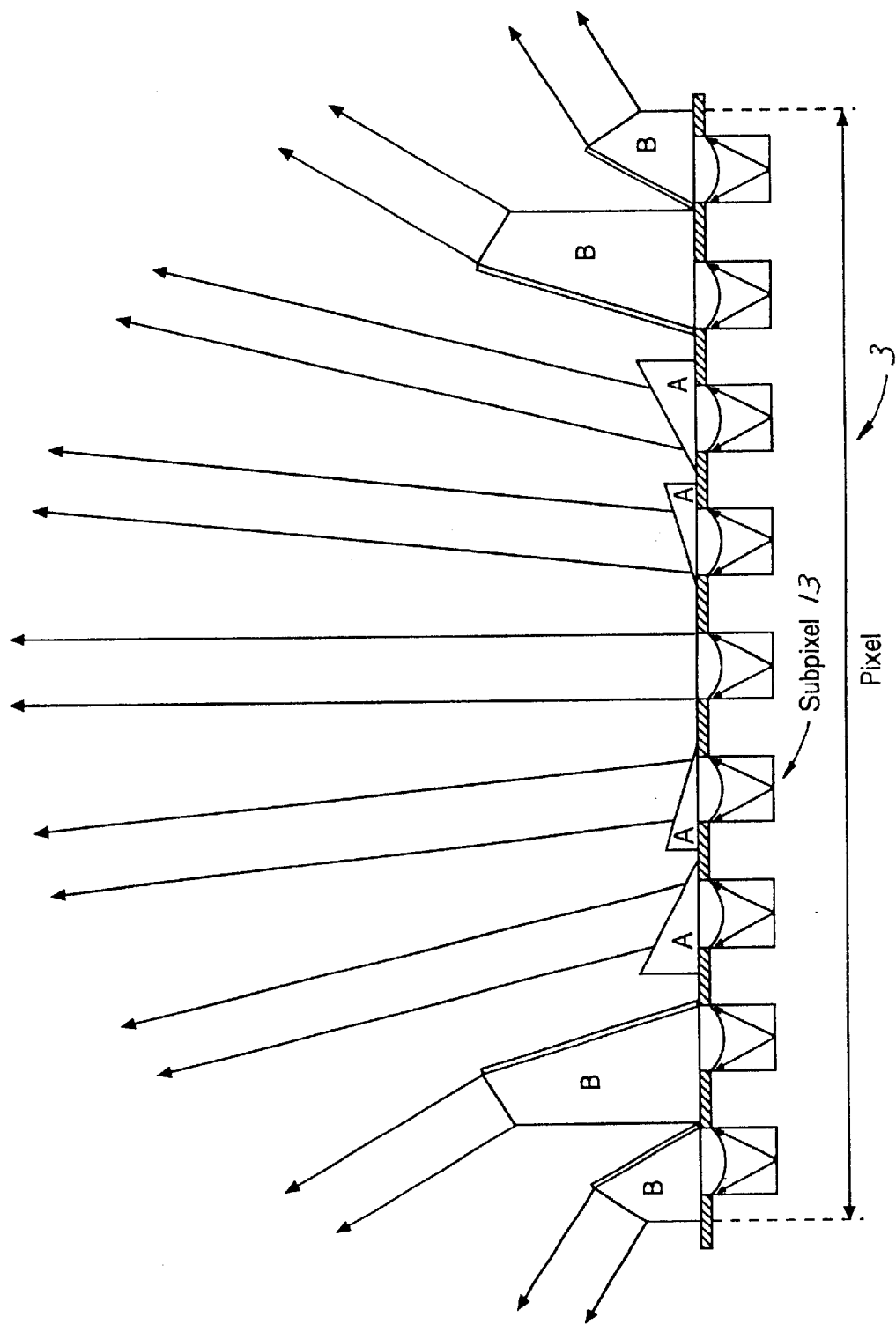
FIG. 29 is a schematic illustration of a portion of the display means for one alternative embodiment of the invention, showing a pixel with its sub-pixels and light phase encoders (prisms and collimating lenslets).
Figure 30:
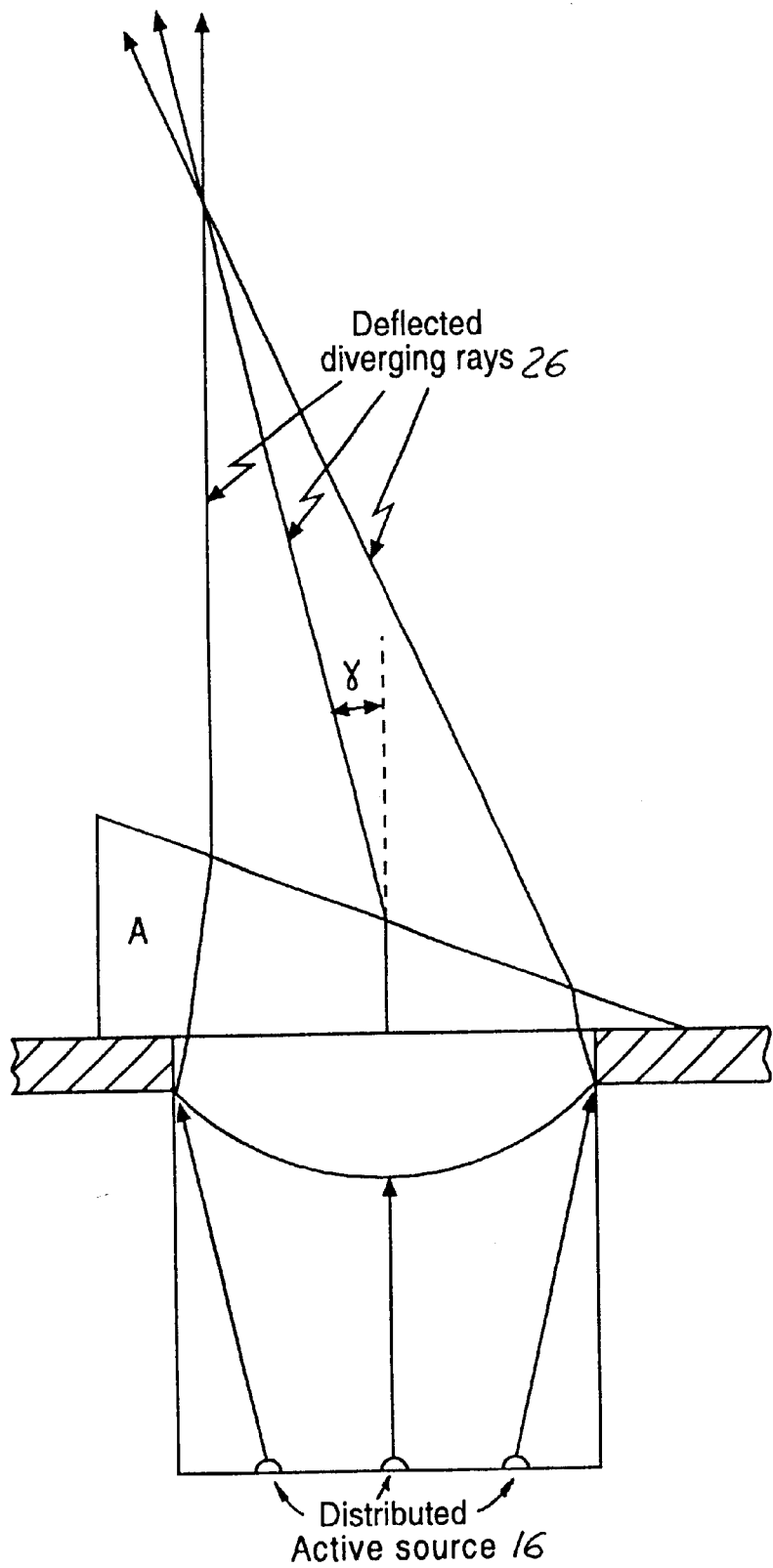
FIG. 30 is a schematic illustration of a portion of the display means for another embodiment of the invention, showing the effects of a distributed (i.e., non-point) light source.
Figure 31:
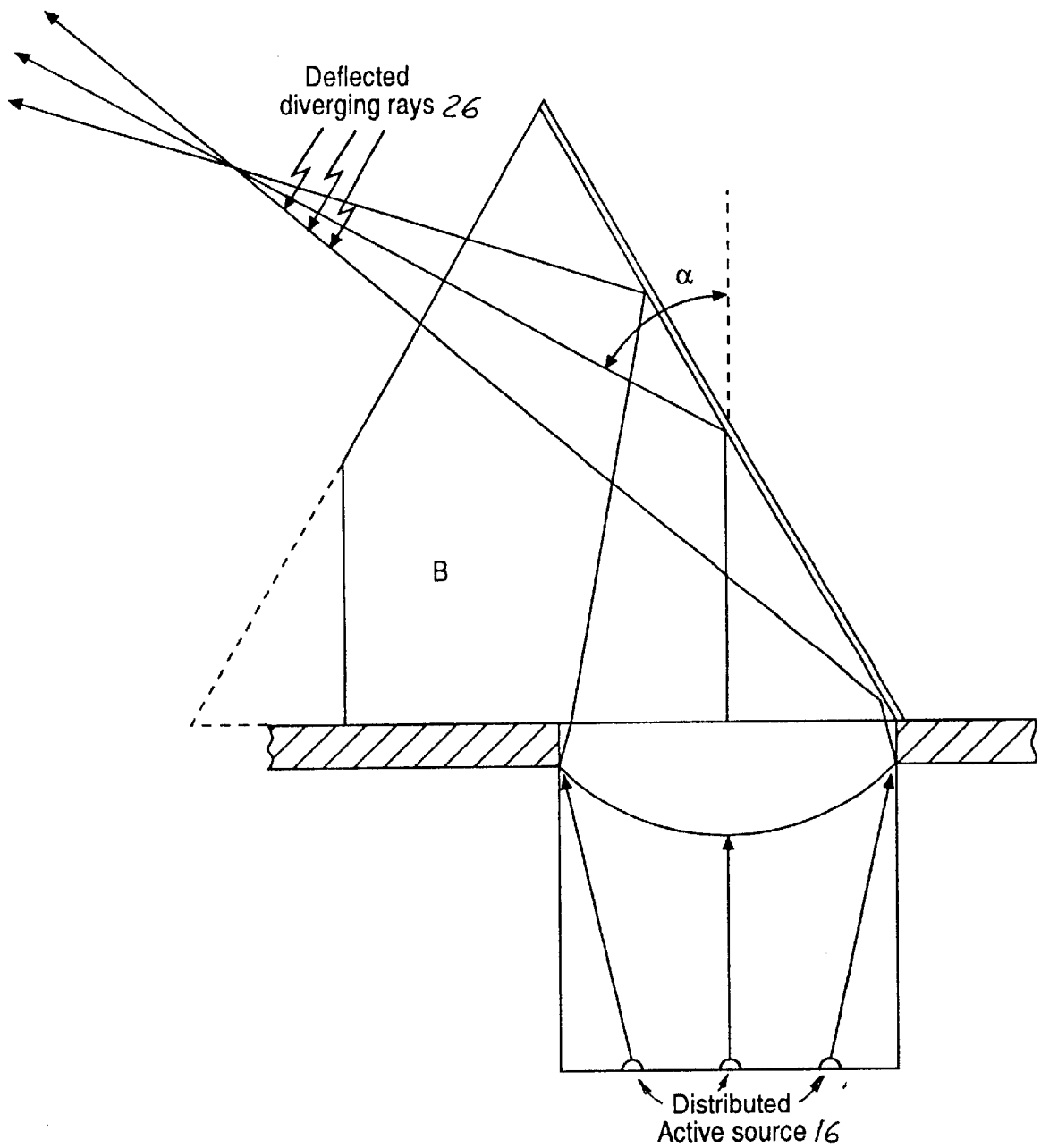
FIG. 31 is a schematic illustration of a portion of the display means for another embodiment of the invention, showing the effects of a distributed (i.e., non-point) light source.

As additional embodiments then of the invention with specific descriptions of the 3D display means, and with additional reference to FIG. 27, the light intensity encoding of each sub-pixel is achieved by means of the active sources 7 and 8 which are shown as approximate point sources of light. Collimating lenslets 11 and 12 are used to collect the light from active point sources 7 and 8 and collimate the light onto prisms 21 and 22, respectively, whose index of refraction is n. The prisms deflect the light onto an angle γ, to produce collimated deflected beams 31 and 32. Shown on the left and right respectively of FIG. 27 are two different prisms with two different angles at which the deflected collimated beams emerge. The prisms in FIG. 27 are termed prisms of type "A," to distinguish them from the type "B" prism as displayed in FIG. 28. With reference to FIG. 28, and with description only of the elements differing from those in FIG. 27, it will be observed that in a type "B" prism, a "mirrored" surface 40 is utilized in order to obtain a deflected beam 31 at the desired angle γ=α. It can be observed that the angle α in FIG. 28 can in general be larger than the angle α in FIG. 27. It should be understood, that such a larger angle α as in FIG. 28 can also be obtained without use of a mirrored surface per se, by taking advantage of the property of total internal reflection for large angles of incidence of light on surface 40. This occurs if n cos α/2≧1. In the presently preferred embodiments of the invention, α≦90°, so that total internal reflection always occurs if the index of refraction of the prism is larger than 1.41. Prisms of type "A" and type "B" can be combined, as shown in FIG. 29, for controlling the radiance pattern of a single pixel 3, using a set of sub-pixels 13. Each sub-pixel shown in FIG. 29 is either a type "A" or type "B" prism. By controlling the source intensity at each sub-pixel, a desired radiance pattern is obtained, according to the methods disclosed herein. It should be appreciated that FIG. 29 represents a simplified cross-section of an overall pixel of the display means. As yet further elaboration of the display means and light-radiating elements, FIG. 30 and FIG. 31 display a type "A" and type "B" prism, respectively, in which the source is not a point, but may be more appropriately considered to be a distributed active source 16. In this case, the emerging beam is not fully collimated, but is instead a set of additional rays 26 emerging at an angle with respect to the reference deflected direction, γ, as shown. The effect of the divergence of the rays, which is generally present because of the typically non-point source nature of real sources, is some overlap of the individual radiance patterns of each sub pixel, which in turn "smooths out" the overall pixel radiance pattern generated by the collection of sub-pixels shown in FIG. 29. This makes the displayed image more realistic as a representation of a 3D scene. An excellent reference on prisms in particular and refracting optics in general can be found in the book *Modern Geometrical Optics*, written by Richard Ditteon and published in 1998 by John Wiley and Sons, Inc., New York, and included by reference hereinto. This reference even includes an address of an Internet fileserver, ftp.wiley.com/public/sci_tech_med, which contains a geometrical_optics directory providing access to a program named ROSE.EXE. This program can be used to analyze optical systems with up to 25 axially symmetric surfaces (reflective or refractive). A further point to be understood is that a variety of techniques known in the art can be used to control the degree of collimation of the light sources, and can be used in various embodiments of the invention disclosed herein.

As yet a further elaboration of the display means, FIG. 32 shows a single pixel 48 containing 25 sub-pixels A, B, C, . . . , Y. The upper portion of the figure shows the view of the pixel from the top, while the lower portion of the figure shows the pixel in perspective view, showing as well the individual light beams emerging in a distinct set of directions. It is to be appreciated that in the present embodiment of the invention, each sub-pixel is made of a prism of either type "A" or type "B". This produces, according to the methods and apparatuses disclosed herein, a desired radiance pattern whereby to produce a three-dimensional image of a three-dimensional scene. An optical screen containing a collection of such pixels is most suitably available from MEMS Optical Inc., of Huntsville, Ala. This company has the capability to produce a wide range of optical screens, microlens arrays, diffractives, shaped surfaces, lenslet arrays, refractive microlens arrays, and a variety of shaped surfaces, in glass, plastic, or other materials, which can be utilized to a variety of embodiments of the present invention.

Figure 33:
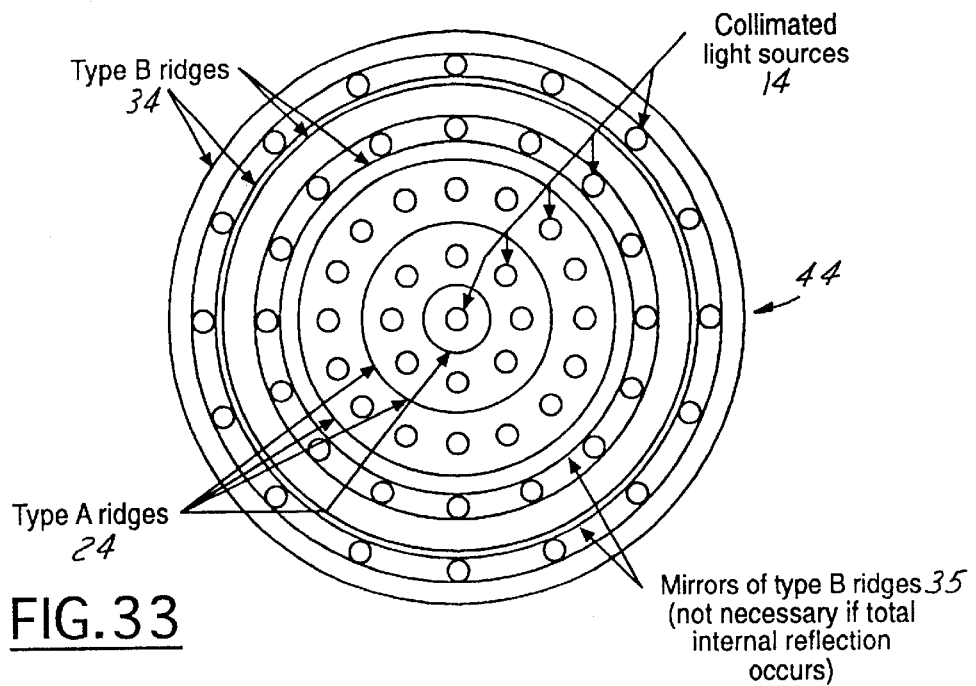
FIG. 33 is a schematic illustration of a portion of the display means for one alternative embodiment of the invention, showing a pixel with its sub-pixels in the form of a specialized Fresnel lens.

As yet one further elaboration of the display means, and with reference to FIG. 33, a specialized Fresnel type lens 44 is shown. The Fresnel type lens 44 should be understood to cover a single pixel in the display means, with each pixel comprised of a number of sub-pixels. Each sub-pixel contains a collimated light source 14, over which is a ridge, 24, whose cross-section is identical to the cross-section of the type "A" prisms, or a ridge whose cross-section is identical to the cross-section of the type "B" prisms, 34. Also shown in FIG. 33 are mirrors of the type "B" ridges, 35. It should be understood that the present Fresnel type lens embodiment may be constructed without mirrored surfaces, using the principle of complete internal reflection in order to achieve the desired deflection angles, if the index of refraction $n \geq 1.41$. It should also be understood that the sources utilized may not be collimated, or collimated only to a limited degree, in order to realize the desired control of the radiance pattern of the display means. It should be further understood that a collimating lens may be used, or may not be used, in the Fresnel type lens embodiment, and that each should be considered to be a variation of the invention disclosed herein. Finally, the Fresnel type lens of FIG. 33 can be considered to be constructed by an axisymmetric rotation of the cross-section of the pixel schematically displayed in FIG. 29.

It should be additionally appreciated that any type of display technology may be utilized in the present invention in producing the desired radiance patterns, as for example, using cathode ray tube, liquid crystal display, plasma display, light emitting diodes, electroluminescent panel, vacuum fluorescent display, digital micromirror device or field emission display. It should be further understood that a variety of optical components and systems can be used in order to obtain the desired radiance patterns from the display means, whereby to achieve (i.e., to produce) a three-dimensional image of a three-dimensional scene. It should also be appreciated that the specifications of an optical system utilized in the display means will depend on the characteristics of the display technology utilized. As one example, the optical system design will depend on the degree of collimation of the light sources. In one such variation of the embodiment of the invention, light emitting diodes (LED's) which are relatively well collimated are used without any additional optical components in the display means to achieve the desired control of the radiance pattern. An LED with only 7 degrees of collimation (i.e., viewing angle) and which is known as type "HLMA-CH00" is most suitably available from Hewlett Packard, Palo Alto, Calif. In this embodiment, a set of LED's is geometrically positioned such that the radiance pattern of each pixel, comprised of a number of LED's, is controlled by the relative intensity of each LED (or sub-pixel) and associated relative angular orientation.

Finally, it is to be understood that the invention as disclosed herein can be embodied in any display means in which it is possible to control the radiance patterns of the pixels of the display means, through a set of display-excitation electrical-input signals. Thus, it is to be recognized that this control of the radiance patterns in the spirit of the present invention can be achieved using any number of approaches, besides optical systems per se, which for example can include adaptive optical systems (AOS) and microelectromechanical systems (MEMS). Two excellent references on these two respective topics are *Principles of Adaptive Optics, Second Edition*, by Robert K. Tyson, published by Academic Press, Boston, Mass., in 1998, and the Special Issue of the Proceedings of the IEEE entitled "Integrated Sensors, Microactuators & Microsystems (MEMS)", Volume 86, No. 8, pp. 1529–1812, August, 1998, both of which are included by reference hereinto.

While several embodiments of the present invention have been disclosed hereinabove, it is to be understood that these embodiments are given by example only and not in a limiting sense. Those skilled in the art may make various modifications and additions to the preferred embodiments chosen to illustrate the invention without departing from the spirit and scope of the present contribution to the art. Accordingly, it is to be realized that the patent protection sought and to be afforded hereby shall be deemed to extend to the subject matter claimed and all equivalence thereof fairly within the scope of the invention.

It will be seen that the described invention meets all stated objectives as to the three-dimensional display of three-dimensional objects and scenes and for the computer graphics display of images, with the specific advantages that it provides for true multiviewpoint and autostereoscopic capabilities, as well as for efficient storage and display of 3D graphical images. Moreover, the disclosed apparatus and method provides herein for the first time a coherent and comprehensive mathematical framework by which the three-dimensional display of three-dimensional scenes may be achieved. In summary, it should be noted that the invention as presently disclosed provides for the following advantages and improvements:

i. True multiviewpoint capabilities, thereby allowing a group of people to view the three-dimensional images from a continuum of viewpoints, and thereby allowing each individual to observe a distinct three-dimensional view;

ii. Autostereoscopic capability, without the use of viewing glasses or any type of head locator/detector means;

iii. A natural and accurate display of the three-dimensional scene, which does not cause or lead to viewer fatigue;

iv. Compatibility with standard (two-dimensional) television technology; and v. Practicality and cost-effectiveness in comparison with other systems; and vi. Innovative display technology offering faithful reproduction of 3D scene radiance; and vii. Allows for the possibility for direct evaluation of the display signals from a set of 2D views, thereby offering greatly simplified implementation and minimal processing delays; and viii. Efficient storage and display in computer graphics applications.

What is claimed is:

1. An apparatus for providing a three-dimensional image of a three-dimensional scene, said apparatus comprising:
   (a) encoding means for processing a set of M two-dimensional views to obtain a set of display-excitation electrical-input signals; and
   (b) planar display means connected for response to said set of display-excitation electrical-input signals, whereby to produce said three-dimensional image of said three-dimensional scene
      wherein said three-dimensional image is autostereoscopic and has a continuous interpolation along a continuum of viewpoints.

2. Apparatus for providing a three-dimensional image of a three-dimensional scene, said apparatus comprising:
   (a) a set of M two-dimensional views of said three-dimensional scene;
   (b) encoding means for processing said set of M two-dimensional views to obtain a set of display-excitation electrical-input signals; and
   (c) display means connected for response to said set of display-excitation electrical-input signals, whereby to produce said three-dimensional image of said three-dimensional scene
      wherein said display means includes a set of light phase encoders.

3. Apparatus according to claim 2, wherein said set of light phase encoders includes a set of prisms.

4. Apparatus according to claim 2, wherein said set of light phase encoders includes a refraction-index-gradient sheet.

5. Apparatus according to claim 2, wherein said set of light phase encoders includes a set of lenslets.

6. The apparatus of claim 2 wherein said display means is planar.

7. Apparatus for providing a sequence of three-dimensional images of a sequence of three-dimensional scenes, said apparatus comprising:
   (a) a sequence of sets of M two-dimensional views of said sequence of three-dimensional scenes;
   (b) encoding means for processing said sequence of sets of M two-dimensional views to obtain a sequence of sets of display-excitation electrical-input signals; and
   (c) display means connected for response to said sequence of sets of display-excitation electrical-input signals, whereby to produce said sequence of three-dimensional images of said sequence of three-dimensional scenes wherein said display means includes a set of light phase encoders.

8. Apparatus according to claim 7, wherein said set of light phase encoders includes a set of prisms.

9. Apparatus according to claim 7, wherein said set of light phase encoders includes a refraction-index-gradient sheet.

10. Apparatus according to claim 7, wherein said set of light phase encoders includes a set of lenslets.

11. The apparatus of claim 7 wherein said display means is planar.

12. A method for displaying a two-dimensional view of a three-dimensional scene, comprising the step of:
   (a) generating a set of N coefficient functions, $R_q$, q=1, ..., N through an orthogonal expansion of a set of M two-dimensional views of said three-dimensional scene; and,
   (b) using said set of N coefficient functions to compute said two-dimensional view of said three-dimensional scene, said two-dimensional view of said three-dimensional scene different from each of said M two-dimensional views.

13. A method for generating a set of N coefficient functions, $R_q$, q=1, ..., N, associated with a set of M two-dimensional views of a three-dimensional scene, comprising the step of:
   (a) performing an orthogonal expansion of said set of M two-dimensional views of said three-dimensional scene.

14. A method for generating a set of N coefficient functions, $R_q$, q=1, ..., N, associated with a radiance function of a three-dimensional scene, comprising the step of:
   (a) performing an orthogonal expansion of said radiance function of said three-dimensional scene.

15. The method according to claim 13, wherein said set of M two-dimensional views is produced by computer software.

16. The method according to claim 12, wherein said set of M two-dimensional views is produced by computer software.

17. The method according to claim 14, wherein said radiance function is produced by computer software.

18. A display apparatus comprising a set of light radiating elements, wherein said set of light-radiating elements includes means for controlling the radiance pattern from said set of light-radiating elements
   wherein said means for controlling said radiance pattern includes a set of light phase encoders.

19. The apparatus of claim 18 wherein said display apparatus is planar.

20. A display apparatus comprising a set of light radiating elements, wherein said set of light-radiating elements includes means for controlling the radiance pattern from said set of light-radiating elements
   wherein said means for controlling said radiance pattern includes a set of prisms.

21. The apparatus of claim 20 wherein said display apparatus is planar.

22. A display apparatus comprising a set of light radiating elements, wherein said set of light-radiating elements includes means for controlling the radiance pattern from said set of light-radiating elements
   wherein said means for controlling said radiance pattern includes a refraction-index-gradient sheet.

23. The apparatus of claim 22 wherein said display apparatus is planar.

24. A display apparatus comprising a set of light radiating elements, wherein said set of light-radiating elements includes means for controlling the radiance pattern from said set of light-radiating elements
   wherein said means for controlling said radiance pattern includes a set of lenslets.

25. The apparatus of claim 24 wherein said display apparatus is planar.

26. Apparatus for providing a three-dimensional image of a three-dimensional scene, said apparatus comprising:
   (a) a set of M two-dimensional views of said three-dimensional scene;
   (b) encoding means for processing said set of M two-dimensional views to obtain a set of display-excitation electrical-input signals; and,
   (c) display means connected for response to said set of display-excitation electrical-input signals, whereby to produce said three-dimensional image of said three-dimensional scene, said display means including a set of light radiating elements adapted for controlling a radiance pattern from said set of light-radiating elements
      wherein said encoding means includes a neural network.

27. The apparatus of claim 26 wherein said display apparatus is planar.

28. Apparatus for providing a sequence of three-dimensional images of a sequence of three-dimensional scenes, said apparatus comprising:
   (a) a sequence of sets of M two-dimensional views of said sequence of three-dimensional scenes;
   (b) encoding means for processing said sequence of sets of M two-dimensional views to obtain a sequence of sets of display-excitation electrical-input signals; and,
   (c) display means connected for response to said sets of display-excitation electrical-input signals, whereby to produce said sequence of three-dimensional images of said sequence of three-dimensional scenes, said display means including a set of light radiating elements adapted for controlling a radiance pattern from said set of light-radiating elements; and
      wherein said encoding means includes a neural network.

29. The apparatus of claim 28 wherein said display means is planar.

30. An apparatus for providing a three-dimensional image of a three-dimensional scene, said apparatus comprising:
   (a) encoding means for processing a set of discrete M two-dimensional views of said three-dimensional scene to obtain a set of display-excitation electrical-input signals; and
   (b) display means for generating a three-dimensional image of said three-dimensional scene responsive to said set of display-excitation electrical-input signals, said display means including a plurality of pixels and each of said plurality of pixels including a plurality of subpixels wherein a radiance pattern of any one pixel of said plurality of pixels is controlled by adjusting an intensity of each of said subpixels of said one pixel and said three-dimensional image has a continuity along a continuum of viewpoints.

31. The apparatus of claim 30 wherein said three-dimensional image is autostereoscopic.

32. The apparatus of claim 30 wherein said display means includes a reflecting screen.

33. The apparatus of claim 30 wherein said display means is planar.

34. An apparatus for providing a three-dimensional image of a three-dimensional scene, said apparatus comprising:

(a) encoding means for processing a set of discrete M two-dimensional views of said three-dimensional scene to obtain a set of display-excitation electrical-input signals; and (b) display means for generating a three-dimensional image of said three-dimensional scene responsive to said set of display-excitation electrical-input signals, said display means including a plurality of pixels and each of said plurality of pixels including a plurality of subpixels wherein a radiance pattern of any one pixel of said plurality of pixels is controlled by adjusting an intensity of each of said subpixels of said one pixel and said three-dimensional image has a continuous interpolation along a continuum of viewpoints.

35. The apparatus of claim 34 wherein said three-dimensional image is autostereoscopic.

36. The apparatus of claim 34 wherein said display means includes a reflecting screen.

37. The apparatus of claim 24 wherein said display device means is planar.

38. A method for producing a three-dimensional image of a three-dimensional scene, comprising the steps of:

(a) using a set of M two-dimensional views of said three-dimensional scene to produce a set of display-excitation electrical-input signals; and (b) controlling a radiance pattern of each pixel of a display device responsive to said set of display-excitation electrical-input signals by adjusting an intensity of each subpixel of said pixel wherein said three-dimensional image has a continuity along a continuum of viewpoints.

39. The method according to claim 38 wherein said three-dimensional image is autostereoscopic.

40. The method according to claim 38 wherein said display device includes a reflecting screen.

41. The method according to claim 38 wherein said M two-dimensional views are derived using a scalar function $\epsilon(x,y,z)$.

42. The method according to claim 30 wherein step (a) includes a substep of performing a numerical orthogonal expansion of said set of M two-dimensional views.

43. The apparatus of claim 38 wherein said display device is planar.

44. A method for producing a three-dimensional image of a three-dimensional scene, comprising the steps of:

(a) using a set of M two-dimensional views of said three-dimensional scene to produce a set of display-excitation electrical-input signals; and (b) controlling a radiance pattern of each pixel of a display device responsive to said set of display-excitation electrical-input signals by adjusting an intensity of each subpixel of said pixel wherein said three-dimensional image has a continuous interpolation along a continuum of viewpoints.

45. The method according to claim 44 wherein said three-dimensional image is autostereoscopic.

46. The method according to claim 44 wherein said display device includes a reflecting screen.

47. The method according to claim 44 wherein said M two-dimensional views are derived using a scalar function $\epsilon(x,y,z)$.

48. The method according to claim 44 wherein step (a) includes a substep of performing a numerical orthogonal expansion of said set of M two-dimensional views.

49. The method of claim 44 wherein said display device planar.

50. A method for producing a three-dimensional image of a three-dimensional scene, comprising the steps of:

using a set of M two-dimensional views of said three-dimensional scene and a first numerical orthogonal expansion to produce a first set of functions associated with said three-dimensional scene;

using a second orthogonal expansion to produce a second set of functions associated with a display device and a set of display-excitation electrical-input signals;

deriving values for said set of display-excitation electrical input signals, wherein said first set of functions and said second set of functions are approximately equal to one another; and driving said display device with said values of said set of display-excitation electrical-input signals to generate said three-dimensional image of said three-dimensional scene wherein said three-dimensional image has a continuous interpolation along a continuum of viewpoints.

51. The method according to claim 50 wherein said three-dimensional image is autostereoscopic.

52. A method for obtaining a set of N coefficient functions, $R_q$, q=1, ..., N, associated with a set of M two-dimensional views of a three-dimensional scene, comprising the steps of:

(a) performing an orthogonal expansion of said set of M two-dimensional views of said three-dimensional scene to generate said set of N coefficient functions, $R_q$, q=1, ..., N; and, (b) storing said set of N coefficient functions, $R_q$, q=1, ..., N.

53. A method for obtaining a set of N coefficient functions, $R_q$, q=1, ..., N, associated with a radiance function of a three-dimensional scene, comprising the steps of:

(a) performing an orthogonal expansion of said radiance function of said three-dimensional scene to generate said set of N coefficient functions, $R_q$, q=1, ..., N; and, (b) storing said set of N coefficient functions, $R_p$, q=1, ..., N.

* * * * *

UNITED STATES PATENT AND TRADEMARK OFFICE
CERTIFICATE OF CORRECTION

PATENT NO.   : 6,329,963 B1
DATED        : December 11, 2001
INVENTOR(S)  : Chiabrera et al.

It is certified that error appears in the above-identified patent and that said Letters Patent is hereby corrected as shown below:

<u>Claim 49,</u>
Insert "is" before -- planar --.

Signed and Sealed this

Sixteenth Day of April, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.       : 6,329,963 B1
APPLICATION NO. : 09/140912
DATED             : December 11, 2001
INVENTOR(S)      : Alessandro Chiabrera et al.

It is certified that error appears in the above-identified patent and that said Letters Patent is hereby corrected as shown below:

Item (56) under "REFERENCES CITED"

| Insert the following references | | | | |
|---|---|---|---|---|
| 3,894,787 | 07/1975 | Leith et al. | 350/3.5 |
| 3,953,869 | 04/1976 | Wah Lo et al. | 354/115 |
| 4,134,104 | 01/1979 | Karras | 340/780 |
| 4,525,858 | 06/1985 | Cline et al. | 345/139 |
| 4,571,616 | 02/1986 | Haisma et al. | 358/88 |
| 4,841,292 | 06/1989 | Zeno | 345/139 |
| 4,873,651 | 10/1989 | Raviv | 364/513 |
| 5,061,049 | 10/1991 | Hornbeck | 359/224 |
| 5,072,215 | 12/1991 | Brotz | 345/139 |
| 5,214,419 | 05/1993 | DeMond et al. | 345/32 |
| 5,392,151 | 02/1995 | Nelson | 359/223 |
| 5,408,264 | 04/1995 | Kurata et al. | 348/51 |
| 5,408,344 | 04/1995 | Takiguchi et al. | 359/40 |
| 5,430,560 | 07/1995 | Wakai et al. | 359/17 |
| 5,446,479 | 08/1995 | Thompson et al. | 345/139 |
| 5,452,024 | 09/1995 | Sampsell | 348/755 |
| 5,457,574 | 10/1995 | Eichenlaub | 359/619 |
| 5,465,175 | 11/1995 | Woodgate et al. | 359/463 |
| 5,475,419 | 12/1995 | Carbery | 348/59 |
| 5,483,254 | 01/1996 | Powell | 345/87 |
| 5,493,427 | 02/1996 | Nomura et al. | 359/40 |
| 5,497,189 | 03/1996 | Aritake et al. | 348/51 |
| 5,589,980 | 12/1996 | Bass et al. | 345/9 |
| 5,614,941 | 03/1997 | Hines | 348/42 |
| 5,658,719 | 08/1997 | Sawyer | 430/523 |
| 5,790,086 | 08/1998 | Zelitt | 345/32 |

"A MEMS-Based Projection Display" Peter F. VanKessel, Larry J. Hornbeck, Robert E. Meier, and Michael R. Douglass; Proceedings of the IEEE, Vol. 86, No. 8, August 1998, pps. 1687-1704.

Signed and Sealed this

Twenty-first Day of September, 2010

David J. Kappos
*Director of the United States Patent and Trademark Office*

"Optimal Free Parameters in Orthonormal Approximations" Albertus C. den Brinker and Harm J.W. Belt, IEEE Transactions on Signal Processing, Vol. 46, No. 8, August 1998, pps. 2081-2087.

"Present Status of Three-Dimensional Television Research" by Toshio Motoki, Haruo Isono, and Ichiro Yuyama, Proceedings of the IEEE, Vol. 83, No. 7, July 1995, pps. 1009-1020.

'The Flowering of Flat Displays" by Ken Werner, IEEE Spectrum, May 1997, pps. 40-49.--